US011767406B2

(12) United States Patent
Fishman et al.

(10) Patent No.: US 11,767,406 B2
(45) Date of Patent: *Sep. 26, 2023

(54) COMPOSITIONS AND FOAM COMPOSITIONS CONTAINING COMPOSITE PARTICLES, ARTICLES, COMPOSITE PARTICLES, AND METHODS

(71) Applicant: 3M INNOVATIVE PROPERTIES COMPANY, St. Paul, MN (US)

(72) Inventors: Joshua M. Fishman, Minneapolis, MN (US); Jeffrey P. Kalish, St. Paul, MN (US); Caitlin E. Meree, St. Paul, MN (US); Qin Lin, Woodbury, MN (US); Nicholas K. Lee, Minneapolis, MN (US); Li Yao, Woodbury, MN (US); Rajdeep S. Kalgutkar, Woodbury, MN (US); Duy K. Lehuu, Lake Elmo, MN (US); David T. Amos, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/607,144

(22) PCT Filed: Jun. 9, 2020

(86) PCT No.: PCT/IB2020/055405
§ 371 (c)(1),
(2) Date: Oct. 28, 2021

(87) PCT Pub. No.: WO2020/254916
PCT Pub. Date: Dec. 24, 2020

(65) Prior Publication Data
US 2022/0177663 A1     Jun. 9, 2022

Related U.S. Application Data

(60) Provisional application No. 62/862,932, filed on Jun. 18, 2019.

(51) Int. Cl.
*C08J 9/00*   (2006.01)
*B24B 37/24*  (2012.01)
(Continued)

(52) U.S. Cl.
CPC .............. *C08J 9/0061* (2013.01); *B24B 37/24* (2013.01); *B32B 5/20* (2013.01); *B32B 27/065* (2013.01);
(Continued)

(58) Field of Classification Search
CPC . B24B 37/24; B32B 2250/03; B32B 2250/24; B32B 2250/40;
(Continued)

(56) References Cited

U.S. PATENT DOCUMENTS 3,321,413 A   5/1967  Riley
3,340,209 A   9/1967  Riley
(Continued)

FOREIGN PATENT DOCUMENTS

EP   2204428   7/2010
EP   2615130   7/2013
(Continued)

OTHER PUBLICATIONS

Flory, Principles of Polymer Chemistry, 1953, Chapter 9, pp. 347-348.
(Continued)

*Primary Examiner* — Hai Vo
(74) *Attorney, Agent, or Firm* — Adrian L. Pishko

(57) ABSTRACT

Compositions are provided including an uncrosslinked thermoplastic nitrogen-containing matrix material and composite particles distributed in the matrix material. The composite particles each include a chemical blowing agent particle encapsulated within a shell including an uncrosslinked thermoplastic material. The uncrosslinked thermoplastic mate-
(Continued)

500μm rial exhibits at least a certain minimum complex viscosity at a decomposition temperature of the chemical blowing agent particle. Also described are foam compositions and particles including the foam compositions, such as a sheet or multilayer construction. Composite particles are further provided. Methods of making the foam compositions are additionally described herein. Also, polishing pads, polishing systems, and methods of polishing a substrate are provided.

18 Claims, 17 Drawing Sheets

(51) Int. Cl.
| | |
|---|---|
| B32B 5/20 | (2006.01) |
| B32B 27/06 | (2006.01) |
| B32B 27/40 | (2006.01) |
| C08J 9/10 | (2006.01) |
| C08L 23/08 | (2006.01) |
| C08L 3/04 | (2006.01) |
| C08L 53/02 | (2006.01) |
| C08L 75/06 | (2006.01) |
| C08L 75/08 | (2006.01) |
| C08L 79/00 | (2006.01) |
| C08L 31/04 | (2006.01) |

(52) U.S. Cl.
CPC ............... *B32B 27/40* (2013.01); *C08J 9/103* (2013.01); *C08J 9/106* (2013.01); *C08J 9/108* (2013.01); *C08L 23/0853* (2013.01); *C08L 31/04* (2013.01); *C08L 53/02* (2013.01); *C08L 75/06* (2013.01); *C08L 75/08* (2013.01); *C08L 79/00* (2013.01); *B32B 2250/03* (2013.01); *B32B 2250/24* (2013.01); *B32B 2250/40* (2013.01); *B32B 2266/0278* (2013.01); *B32B 2266/08* (2013.01); *B32B 2274/00* (2013.01); *C08J 2201/03* (2013.01); *C08J 2203/04* (2013.01); *C08J 2205/044* (2013.01); *C08J 2205/052* (2013.01); *C08J 2323/08* (2013.01); *C08J 2331/04* (2013.01); *C08J 2353/02* (2013.01); *C08J 2375/06* (2013.01); *C08J 2375/08* (2013.01); *C08J 2377/00* (2013.01); *C08L 2203/14* (2013.01); *C08L 2312/00* (2013.01)

(58) Field of Classification Search
CPC ........ B32B 2266/0278; B32B 2266/08; B32B 2274/00; B32B 27/065; B32B 27/40; B32B 5/20; C08J 2201/026; C08J 2201/03; C08J 2203/04; C08J 2203/22; C08J 2205/044; C08J 2205/052; C08J 2207/00; C08J 2300/106; C08J 2323/08; C08J 2331/04; C08J 2353/02; C08J 2375/04; C08J 2375/06; C08J 2375/08; C08J 2377/00; C08J 9/0061; C08J 9/103; C08J 9/106; C08J 9/108; C08J 9/32; C08L 2203/14; C08L 23/0853; C08L 2312/00; C08L 31/04; C08L 53/02; C08L 75/06; C08L 75/08; C08L 79/00
See application file for complete search history.

(56) References Cited

U.S. PATENT DOCUMENTS

| | | | |
|---|---|---|---|
| 3,377,303 | A | 4/1968 | Peerman |
| 5,234,963 | A | 8/1993 | Garcia |
| 5,252,694 | A | 10/1993 | Willett |
| 5,585,412 | A | 12/1996 | Natoli |
| 5,609,892 | A | 3/1997 | Garcia |
| 5,611,962 | A | 3/1997 | Garcia |
| 5,621,015 | A | 4/1997 | Garcia |
| 6,586,483 | B2 | 7/2003 | Kolb |
| 7,501,184 | B2 | 3/2009 | Leir |
| 8,158,731 | B2 | 4/2012 | Stefanisin |
| 8,377,245 | B2 | 2/2013 | Bauer |
| 8,765,881 | B2 | 7/2014 | Hays |
| 8,875,472 | B2 | 11/2014 | Korwin-Edson |
| 8,916,267 | B2 | 12/2014 | Bauer |
| 11,186,697 | B2* | 11/2021 | Fishman ................ B01J 13/043 |
| 2010/0204349 | A1* | 8/2010 | Inohara .................... B01J 13/20 428/407 |
| 2011/0039997 | A1 | 2/2011 | Papon |
| 2011/0224317 | A1 | 9/2011 | O'Leary |
| 2014/0015157 | A1 | 1/2014 | Endle |
| 2017/0313912 | A1 | 11/2017 | Zhou |

FOREIGN PATENT DOCUMENTS

| | | |
|---|---|---|
| WO | WO2004-045319 | 6/2004 |
| WO | WO 2016-105997 | 6/2016 |
| WO | WO 2017-222891 | 12/2017 |
| WO | WO 2019-064120 | 4/2019 |
| WO | WO 2019-064121 | 4/2019 |
| WO | WO 2019-125931 | 6/2019 |

OTHER PUBLICATIONS

Hu, "Synthesis and Characterization of Thermally Expandable Microcapsules by Suspension Polymerization", Pigment & Resin Technology, 2009, vol. 38, No. 5, pp. 280-284.
Johnson, "Fatty Acids in Industry: Processes, Properties, Derivatives, Applications", Marcel Dekker, Inc., Chapter 7, 1989, pp. 153-175.
Jongh, "Spontaneous Zwitterionic Copolymerisation: An Undervalued and Efficacious Technique for The Synthesis of Functional Degradable Oligomers and Polymers", Progress in Polymer Science, vol. 87, Dec. 2018, pp. 228-246.
Li, "A Highly Expandable and Tough Polyacrylamide-Alginate Microcapsule", RSC Advances, 2016, vol. 6, pp. 44896-44901.
McDonald, "Hollow Latex Particles: Synthesis and Applications", Advances in Colloid and Interface Science, 2002, vol. 99, pp. 181-213.
Stehr, "Chemical Blowing Agents in the Rubber Industry. Past—Present—and Future?", International Polymer Science and Technology, 2016, vol. 43, No. 5, pp. 812-819.
Vericella, "Encapsulated Liquid Sorbents for Carbon Dioxide Capture", Nature Communications, Feb. 2015, vol. 6:6124, pp. 1-7.
Wang, "The Influence of Expandable Graphite on Double-Layers Microcapsules in Intumescent Flame-Retardant Natural Rubber Composites", Journal of Thermal Analysis and Calorimetry, 2016, vol. 123, pp. 1239-1251.
International Search Report for PCT International Application No. PCT/US2018/065613, dated Feb. 27, 2019, 4 pages.
International Search Report for PCT International Application No. PCT/IB2020/055405, dated Oct. 22, 2020, 7 pages.

\* cited by examiner

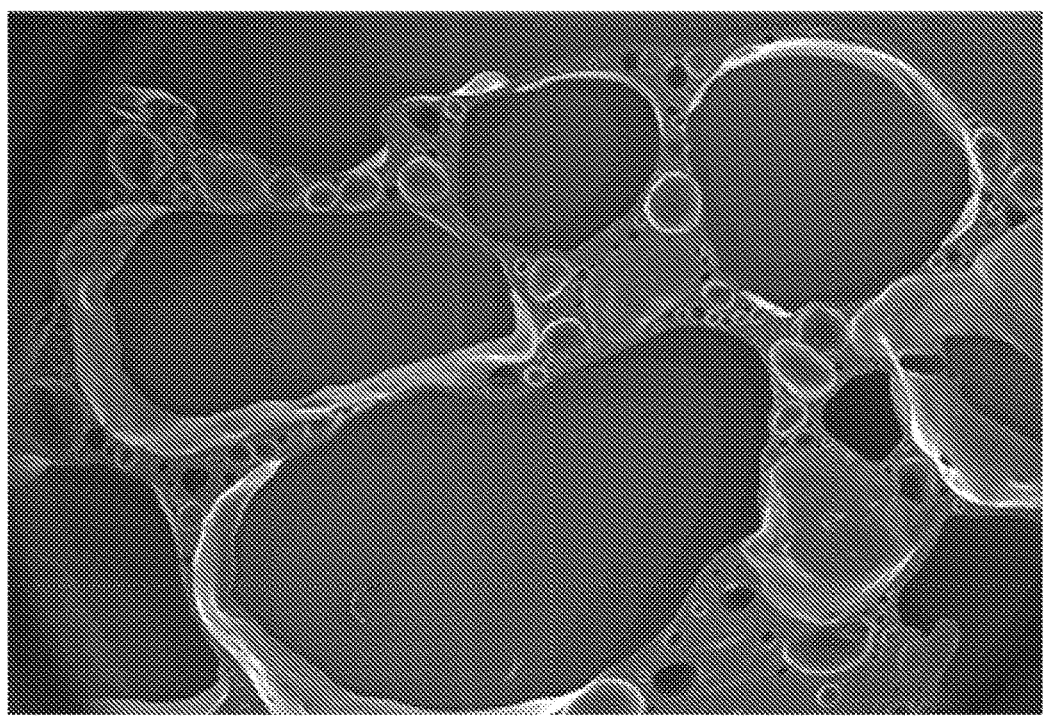
FIG. 2A  500μm
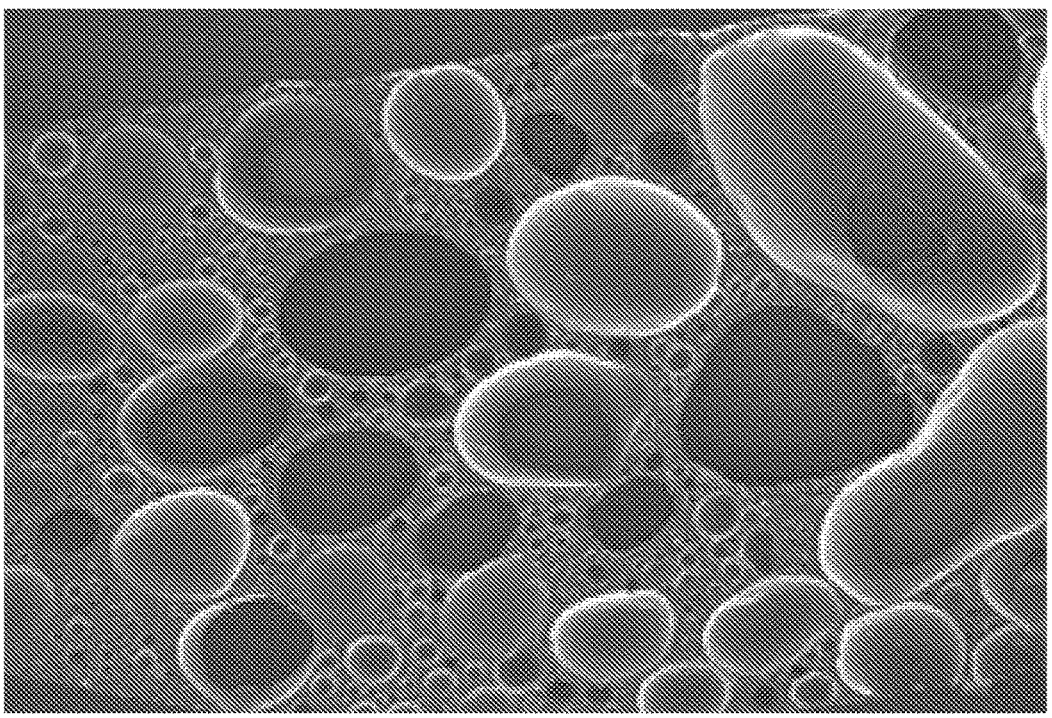
FIG. 2B  500μm

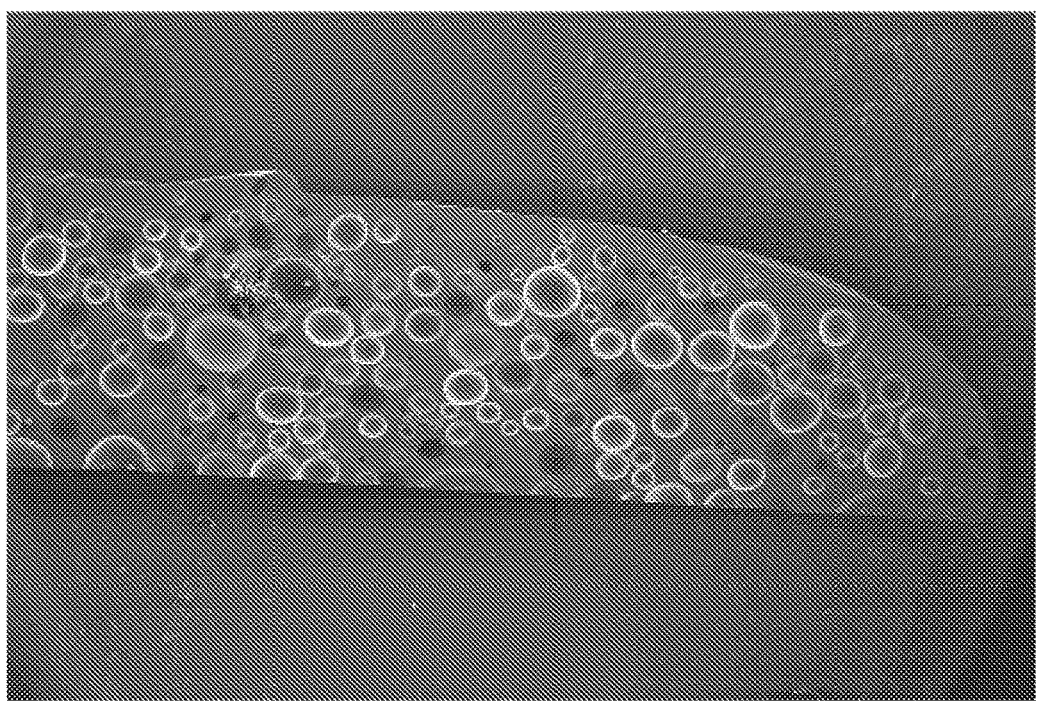
FIG. 2I   500μm
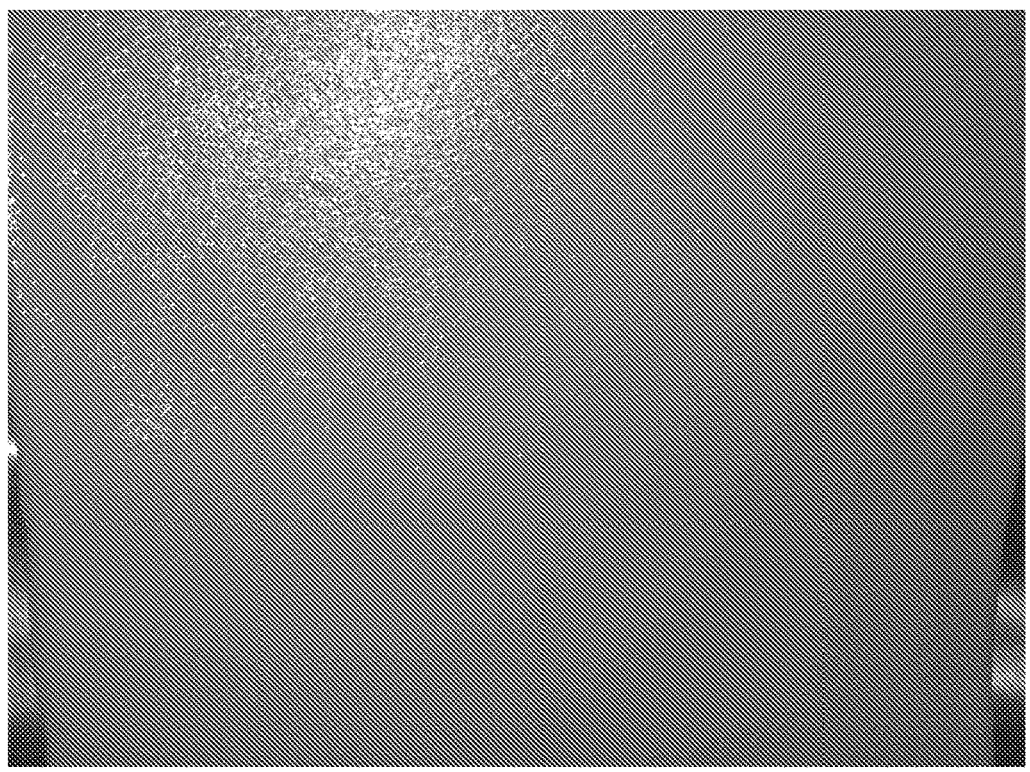
FIG. 3A

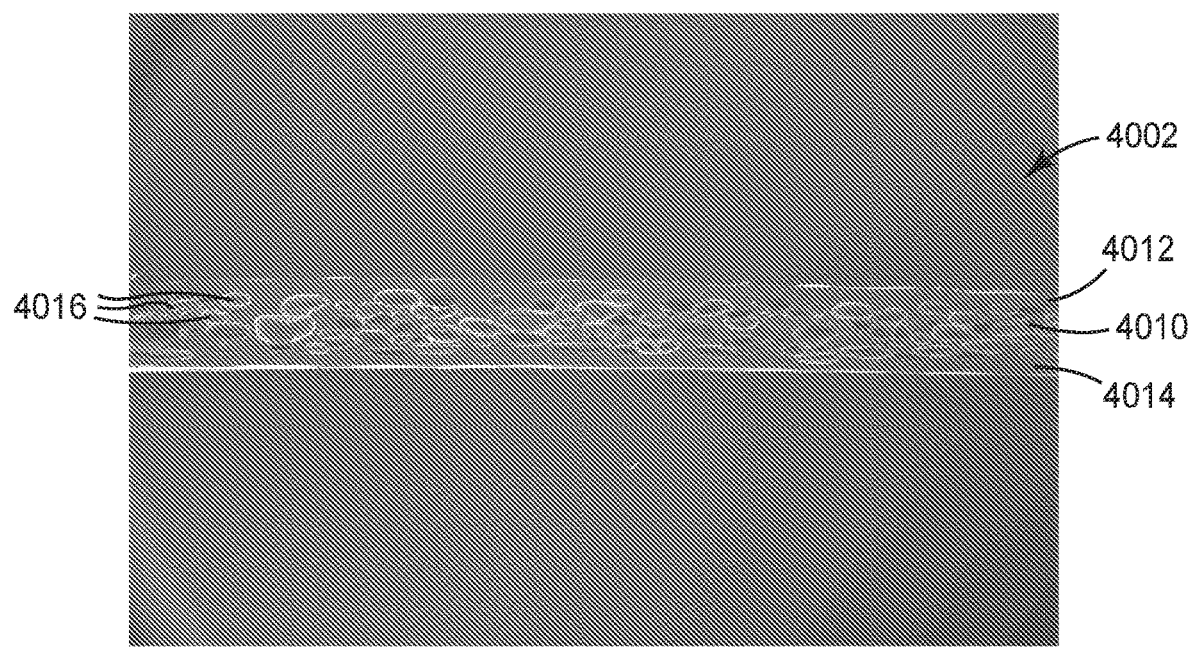
FIG. 4B  500μm
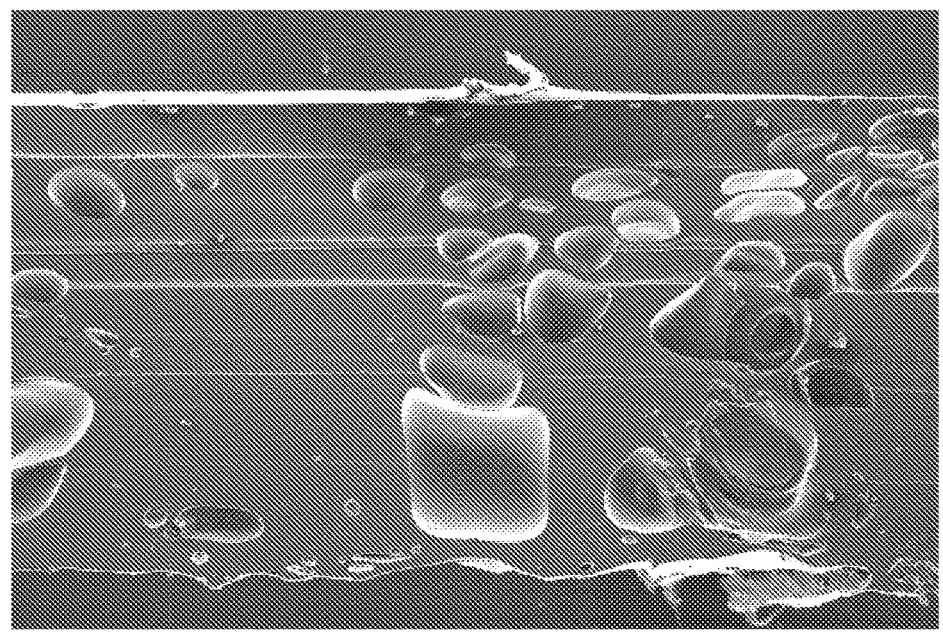
FIG. 5A  500μm

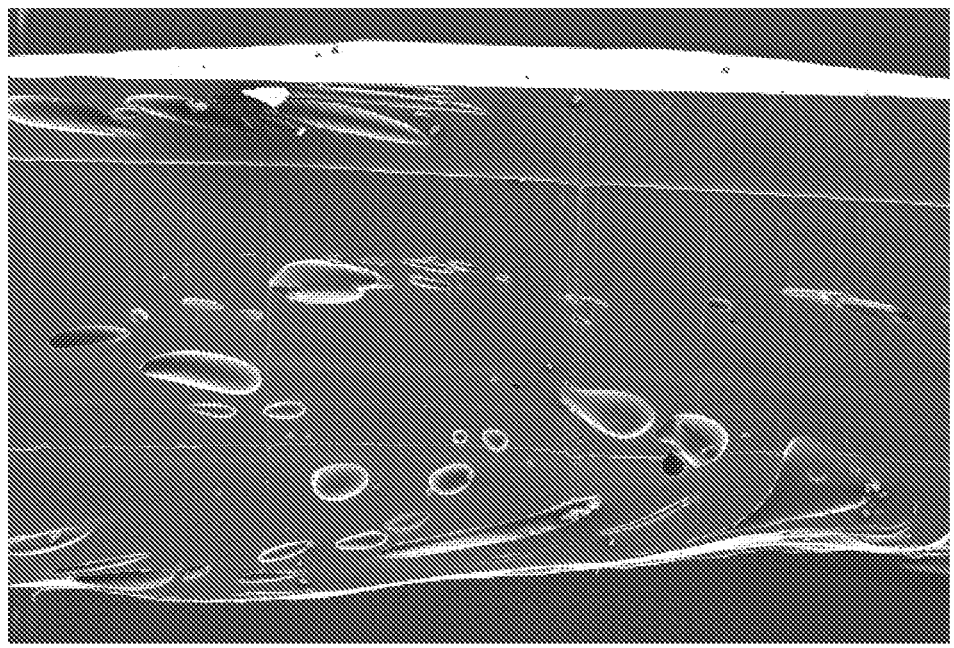
*FIG. 5B*  500μm
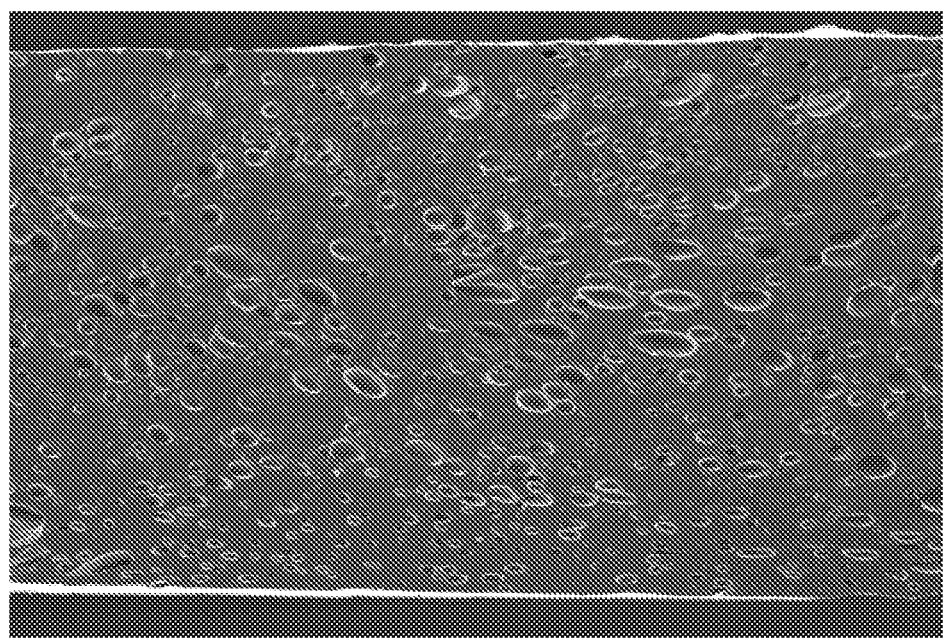
*FIG. 5C*  500μm

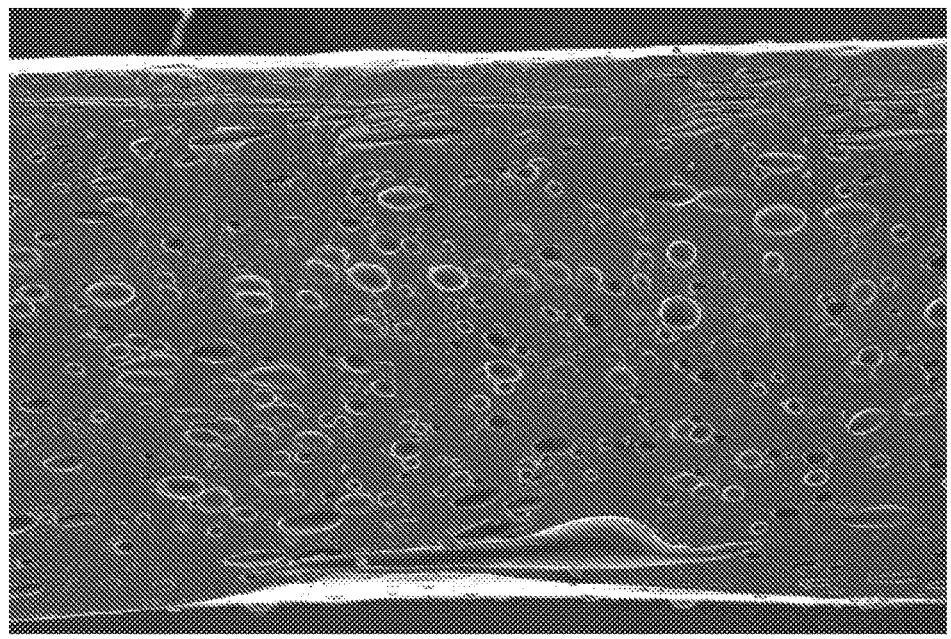
FIG. 5D  500μm
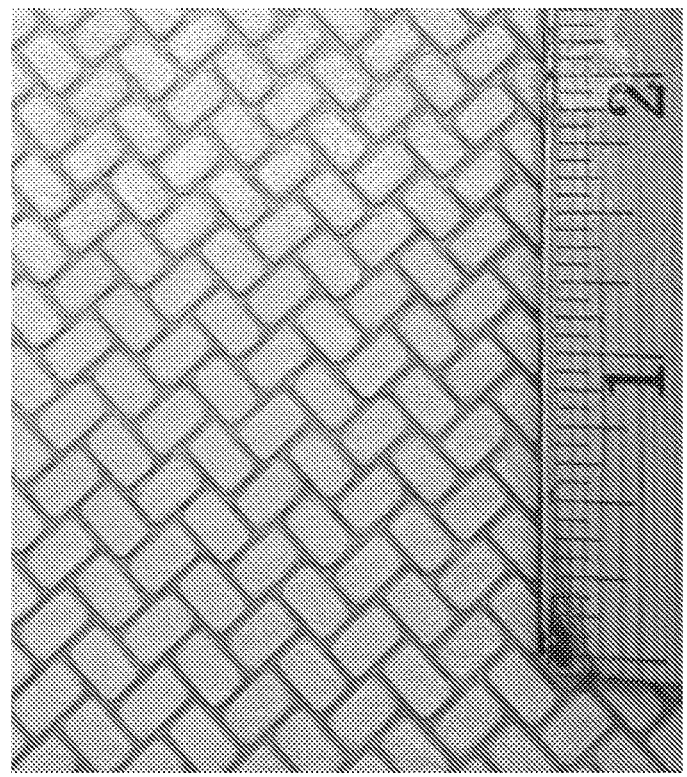
FIG. 6

FIG. 7A  100μm
FIG. 7B  100μm

COMPOSITIONS AND FOAM COMPOSITIONS CONTAINING COMPOSITE PARTICLES, ARTICLES, COMPOSITE PARTICLES, AND METHODS

FIELD

The present disclosure relates to compositions and foam compositions including composite particles containing chemical blowing agents, articles, and methods of forming the foam compositions.

BACKGROUND

Foams are porous materials that are composed of gas filled networks or chambers segmented by a solid matrix. The properties of foamed materials are governed by the composition of the matrix material and the morphology of its cellular structure. Chemical blowing agents, physical blowing agents, and expandable microspheres have all been employed to assist in forming foamed materials.

SUMMARY

Compositions, foam compositions, and articles containing composite particles, methods of making foam compositions, and composite particles are provided. The composite particles include an encapsulated chemical blowing agent particle. Use of the composite particles tends to lead to a decrease in foam cell size and a concomitant increase in foam cell density and homogeneity, as compared to materials foamed with the same chemical blowing agent that is not encapsulated.

In a first aspect, a composition is provided. The composition includes an uncrosslinked thermoplastic nitrogen-containing matrix material and a plurality of composite particles distributed in the uncrosslinked thermoplastic nitrogen-containing matrix material. The composition exhibits an elastic modulus of 0.5 megaPascals (MPa) or greater. The plurality of composite particles each includes a chemical blowing agent particle encapsulated within a shell including an uncrosslinked thermoplastic material. The uncrosslinked thermoplastic material exhibits a complex viscosity of 3,700 Pascal seconds (Pa·s) or greater at a decomposition temperature of the chemical blowing agent particle.

In a second aspect, a foam composition is provided. The foam composition includes a closed cell foam thermoplastic nitrogen-containing matrix material and an uncrosslinked thermoplastic material distributed in the closed cell foam thermoplastic nitrogen-containing matrix material.

In a third aspect, an article is provided. The article includes a foam composition attached to a substrate. The foam composition includes a closed cell foam thermoplastic nitrogen-containing matrix material and an uncrosslinked thermoplastic material distributed in the closed cell foam thermoplastic nitrogen-containing matrix material.

In a fourth aspect, a method of making a foam composition is provided. The method includes a) compressing a mixture; and b) heating the compressed mixture, thereby forming the foam composition. The mixture includes an uncrosslinked thermoplastic nitrogen-containing matrix material and a plurality of composite particles distributed in the uncrosslinked thermoplastic nitrogen-containing matrix material. The mixture exhibits an elastic modulus of 0.5 MPa or greater. The plurality of composite particles each includes a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

In a fifth aspect, a composite particle is provided. The composite particle includes a chemical blowing agent particle encapsulated within a shell including an uncrosslinked thermoplastic material; and a co-encapsulated metal salt. The metal salt is of the form MX or $M(X)_2$, wherein M is zinc, calcium, cadmium, potassium, barium, strontium, magnesium, mercury, titanium, tin, lead, sodium, lithium, or cesium, wherein X is an organic or inorganic ligand containing a nitrate, phosphate, phosphite, sulfate, carbonate, an oxalic acid, a halide, para-toluenesulfonate, tetrafluoroborate, perchlorate, hydroxide, or cyanide moiety and the corresponding hydrates, or mixtures thereof. The uncrosslinked thermoplastic material exhibits a complex viscosity of 3,700 Pa·s or greater at a decomposition temperature of the chemical blowing agent particle.

In a sixth aspect, a composition is provided. The composition includes an uncrosslinked thermoplastic matrix material and a plurality of the composite particles of the fifth aspect distributed in the uncrosslinked thermoplastic matrix material.

In a seventh aspect, another foam composition is provided. The foam composition includes a closed cell foam thermoplastic matrix material and a plurality of the composite particles of the fifth aspect distributed in the closed cell foam thermoplastic matrix material.

In an eighth aspect, a polishing pad is provided. The polishing pad includes a foam composition of the second aspect or the seventh aspect.

In a ninth aspect, a polishing system is provided. The polishing system includes the polishing pad of the eighth aspect and a polishing solution.

In a tenth aspect, a method of polishing a substrate is provided. The method includes providing a polishing pad of the eighth aspect having a working surface; providing a substrate having a first surface; contacting the working surface of the polishing pad with the first substrate surface; and moving the polishing pad and the substrate relative to one another while maintaining contact between the working surface of the polishing pad and the first substrate surface. Polishing is conducted in the presence of a polishing solution.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE DRAWINGS

FIG. 2A is a Scanning Electron Microscopy (SEM) image of the foam composition of Comparative Example A foamed for 5 minutes at 230° C.

FIG. 2B is an SEM image of the foam composition of Comparative Example B foamed for 5 minutes at 230° C.

FIG. 2I is an SEM image of the foam composition of Example 8 foamed for 6.5 minutes at 270° C.

FIG. 3A is a photographic image of the foam composition of Example 9 extruded at a die temperature of 430° F.

FIG. 4B is an SEM image of the multilayer composite of Example 20, wherein the slice was taken in the machine direction.

FIG. 5A is an SEM image of the foam composition of Comparative Example G extruded at a die temperature of 246° C., wherein the slice was taken in the transverse direction.

FIG. 5B is an SEM image of the foam composition of Comparative Example G extruded at a die temperature of 246° C., wherein the slice was taken in the machine direction.

FIG. 5C is an SEM image of the foam composition of Example 23 extruded at a die temperature of 246° C., wherein the slice was taken in the transverse direction.

FIG. 5D is an SEM image of the foam composition of Example 23 extruded at a die temperature of 246° C., wherein the slice was taken in the machine direction.

FIG. 6 is a photographic image of a surface of the foam composition of Example 23.

FIG. 7A is a light microscope image of the foam composition of Example 24 extruded at a die temperature of 285° C.

FIG. 7B is a light microscope image of the foam composition of Example 24 extruded at a die temperature of 302° C.

DETAILED DESCRIPTION

Compositions

Figure 1:
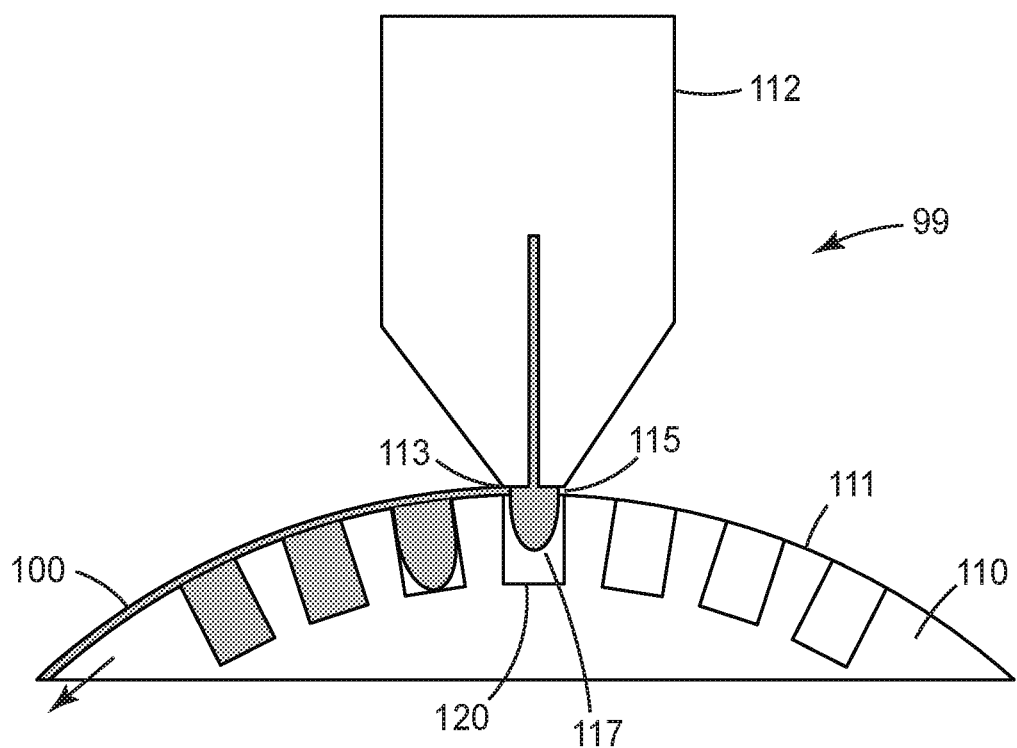
FIG. 1 is a schematic cross-sectional view of an apparatus for making an exemplary foam composition.
Figure 2C:
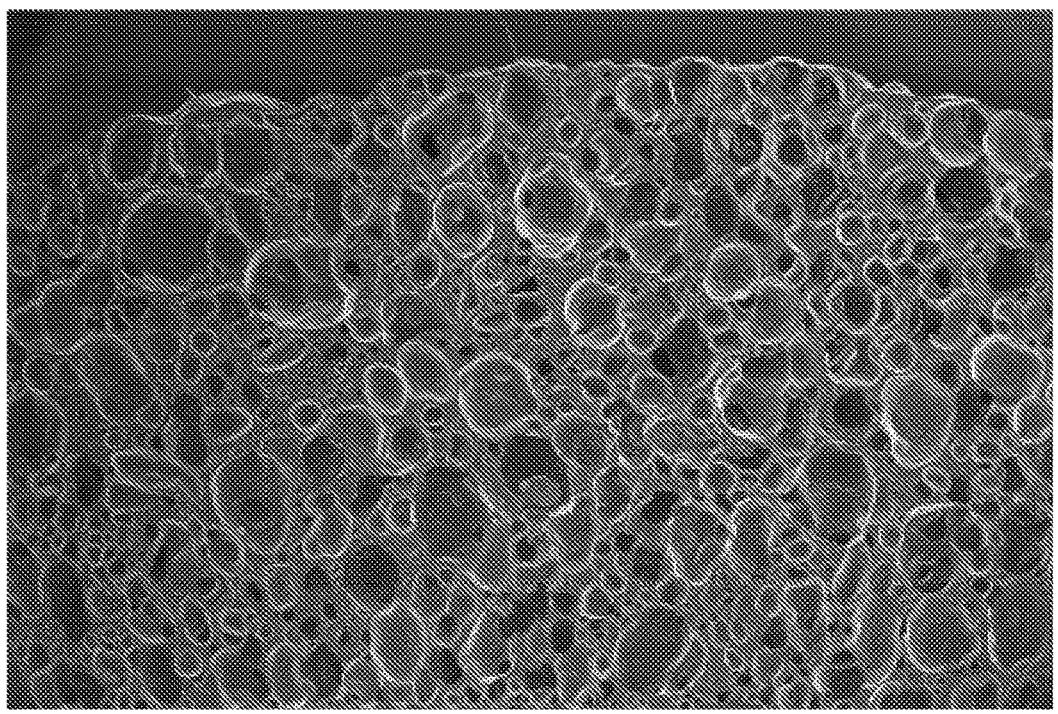
FIG. 2C is an SEM image of the foam composition of Example 1 foamed for 5 minutes at 230° C.
Figure 2D:
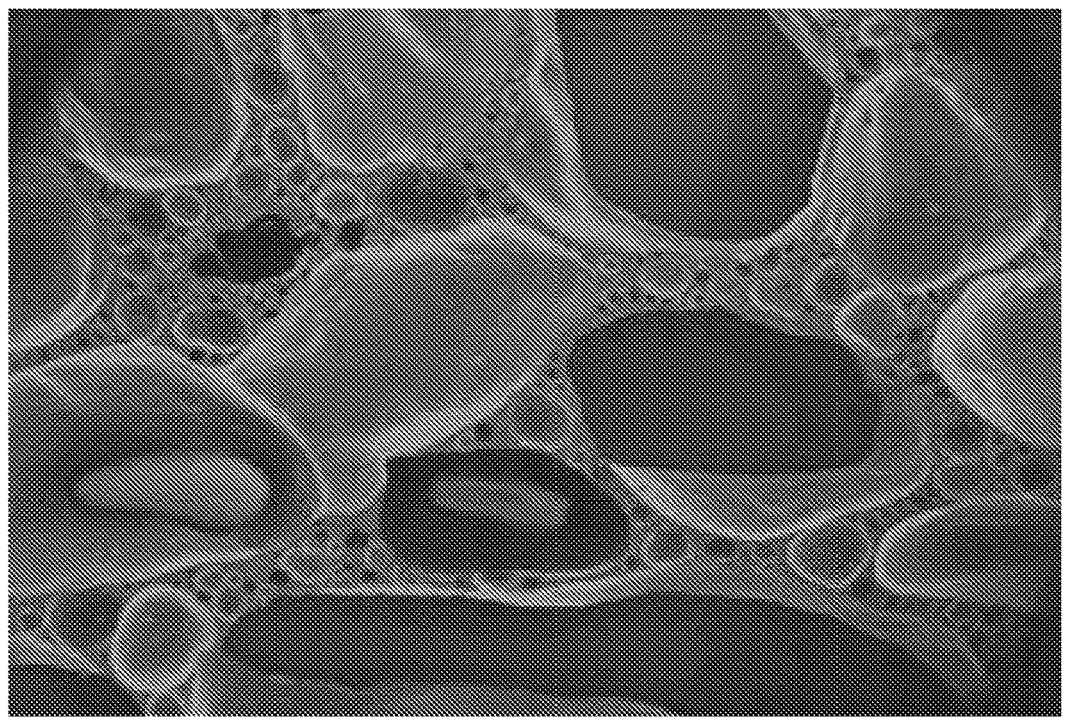
FIG. 2D is an SEM image of the foam composition of Comparative Example C foamed for 4 minutes at 230° C.
Figure 2E:
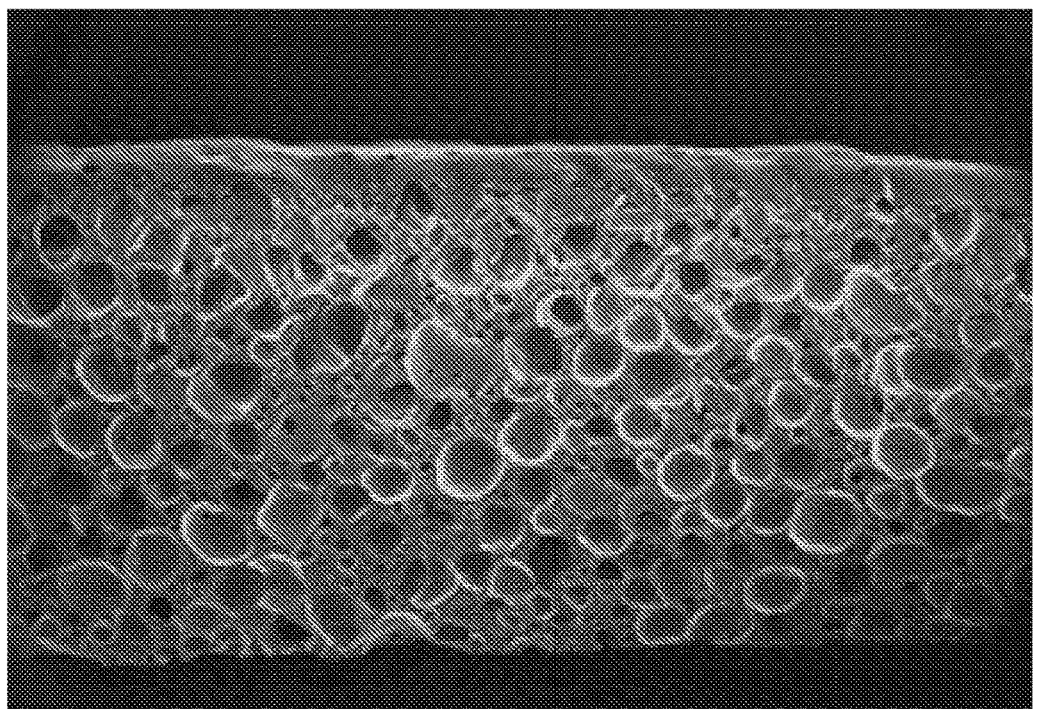
FIG. 2E is an SEM image of the foam composition of Example 2 foamed for 3.9 minutes at 230° C.
Figure 2F:
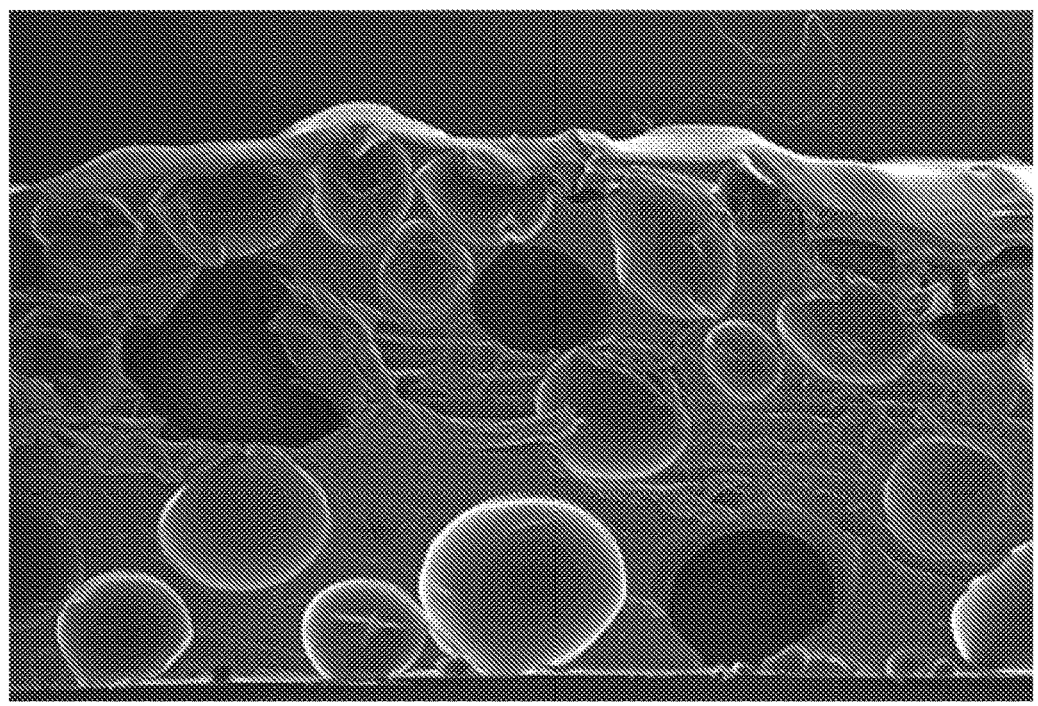
FIG. 2F is an SEM image of the foam composition of Comparative Example D foamed for 6.5 minutes at 270° C.
Figure 2G:
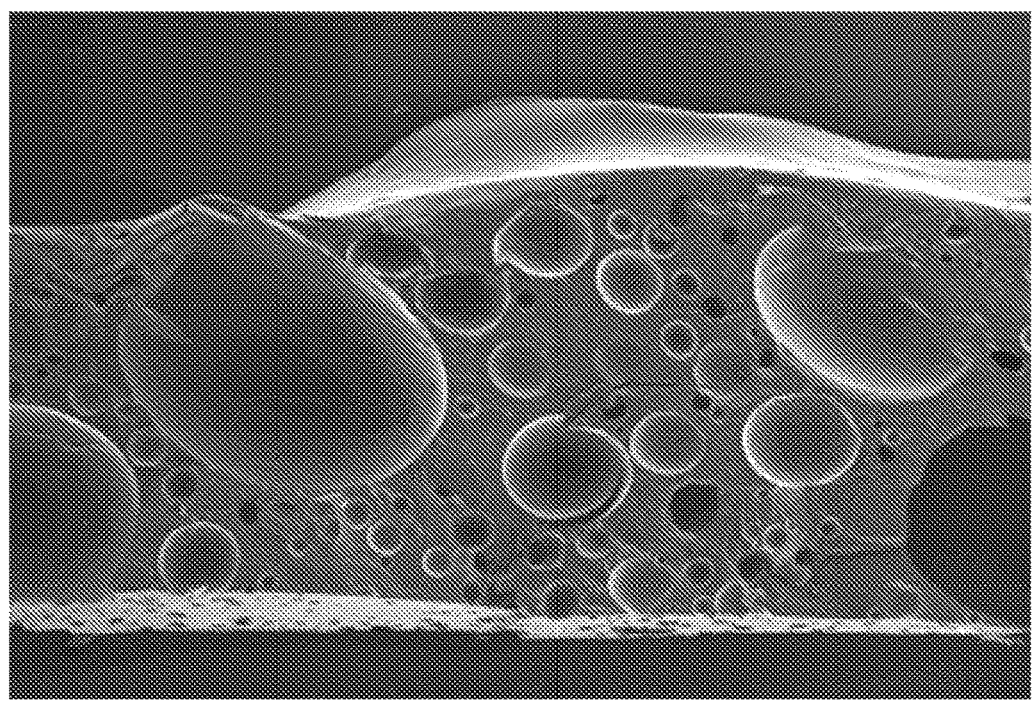
FIG. 2G is an SEM image of the foam composition of Example 7 foamed for 6.5 minutes at 270° C.
Figure 2H:
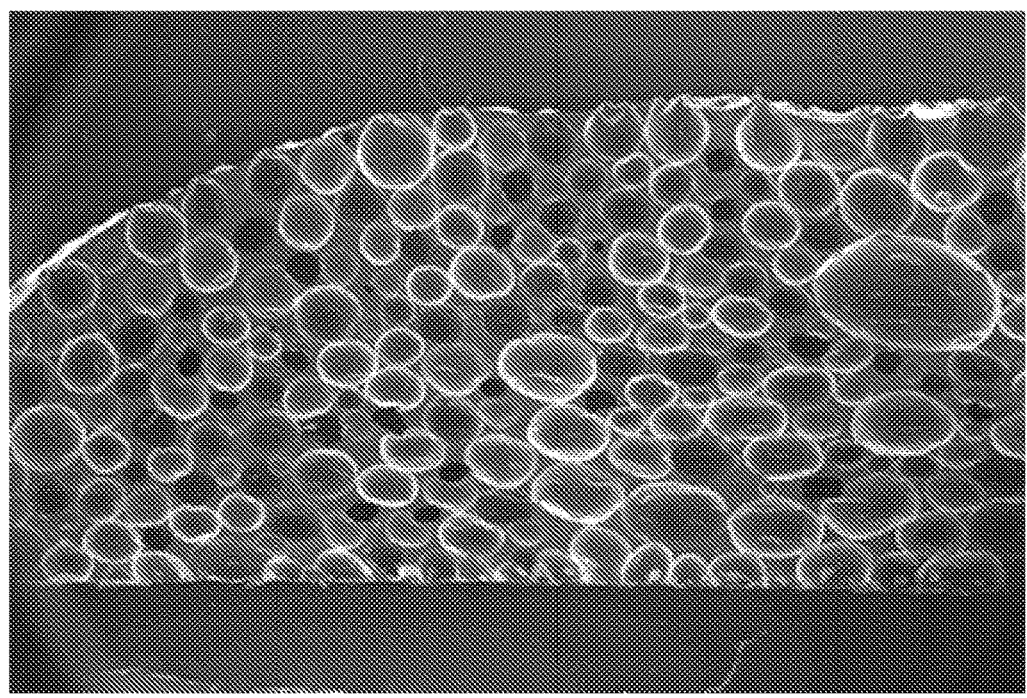
FIG. 2H an SEM image of the foam composition of Comparative Example E foamed for 5 minutes at 270° C.

In a first aspect, a composition is provided. The composition comprises: an uncrosslinked thermoplastic nitrogen-containing matrix material and a plurality of composite particles distributed in the uncrosslinked thermoplastic nitrogen-containing matrix material, wherein the composition exhibits an elastic modulus of 0.5 megaPascals (MPa) or greater, and wherein the plurality of composite particles each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle.

Elastic modulus of the composition can be determined experimentally, such as using dynamic mechanical analysis (DMA). The elastic modulus of the compositions is 0.5 MPa or greater, 0.1 MPa, 0.5 MPa, 0.75 MPa, 1.0 MPa, 1.50 MPa, 2 MPa, 5 MPa, 7 MPa, 10 MPa, 12 MPa, 15 MPa, 20 MPa, 25 MPa, 30 MPa, 40 MPa, 50 MPa, 75 MPa, 100 MPa, 150 MPa, 200 MPa, 250 MPa, 300 MPa, 350 MPa, 400 MPa, or 450 MPa or greater; and 5,000 MPa or less, 4,500 MPa, 4,000 MPa, 3,500 MPa, 3,000 MPa, 2,500 MPa, 2,000 MPa, 1,500 MPa, 1,000 MPa, or 500 MPa or less. At such elastic moduli, the compositions are suitable for casting or compressing in a foaming process, as opposed to spray foaming.

The components of the composition are described in detail below.

Uncrosslinked Thermoplastic Matrix Materials

The uncrosslinked thermoplastic nitrogen-containing matrix material includes materials having at least one nitrogen atom in the backbone of the thermoplastic matrix material. In some embodiments, the uncrosslinked thermoplastic nitrogen-containing matrix material is selected from a polyamide, a poly(ester amide) (PEA), a polyurethane, a polyethyleneimine, a polyimide, a polyetherimide (PEI), a polyurea, a polyoxazoline, a polyiminothioether, a polyaminoamide, a polysulfonamide, a poly(amide-imide), or combinations thereof. In some embodiments, the uncrosslinked thermoplastic nitrogen-containing matrix material can also be blended with uncrosslinked thermoplastic material that does not include a nitrogen atom in the backbone but instead at least one nitrogen atom in a pendent group (e.g., uncrosslinked thermoplastic pendent nitrogen-containing material), such as polyurethane blended with poly(styrene-acrylonitrile) (SAN). In some embodiments, the uncrosslinked thermoplastic nitrogen-containing matrix material can also be blended with uncrosslinked thermoplastic non-nitrogen-containing material, like polyurethane blended with various TPEs, such as styrene-butadiene rubber, styrene-butadienestyrene block copolymer (SBS), styrene-isoprene-styrene (SIS), styrene-butadiene copolymer (ABS), butadiene copolymer (nitrile rubber, NBR), etc.

In some embodiments, the uncrosslinked thermoplastic nitrogen-containing matrix material comprises a polyamide. As used herein, "polyamide" refers to a polymer having multiple amido groups of formula —(CO)NH—. Suitable polyamides include both acid-terminated and amine-terminated polyamides. Amine-terminated polyamides are more reactive with an epoxide-functionalized crosslinker than acid-terminated polyamides. For polyamides that exhibit slower reactivity, a crosslink catalyst may also be employed to increase the rate of crosslinking the uncrosslinked thermoplastic matrix material. Crosslinkers and crosslink catalysts are described further below.

In some embodiments, the polyamides of the polyamide component may include the reaction product (e.g., by condensation polymerization) of a diacid component and a diamine component.

In some embodiments, the diacid component may include any long chain diacid (e.g., diacids that include greater than 15 carbon atoms). The diacid component may further include a short chain diacid (e.g., diacids that include between 2 and 15 carbon atoms). In some embodiments, the long chain diacid may be present in the diacid component in an amount of between 51-100 mol %, 70-100 mol %, 80-100 mol %, 90-100 mol %, 51-99 mol. %, or 51-95 mol. %; or at least 51 mol. %, at least 70 mol. %, or at least 90 mol. %, based on the total moles of the diacid component. In some embodiments, the short chain diacid may not be present in the diacid component, or may be present in the diacid component in an amount of between 1-49 mol %, 1-30 mol %, 1-20 mol %, or 1-10 mol %, based on the total moles of the diacid component.

In some embodiments, the diacid component may include a dicarboxylic acid (e.g., in the form of a dicarboxylic dimer acid). In some embodiments, the dicarboxylic acid may include at least one alkyl or alkenyl group and may contain 3 to 30 carbon atoms and may be characterized by having two carboxylic acid groups. The alkyl or alkenyl group may be branched. The alkyl group may be cyclic. Useful dicarboxylic acids may include propanedioic acid, butanedioic acid, pentanedioic acid, hexanedioic acid, heptanedioic acid, octanedioic acid, nonanedioic acid, decanedioic acid, undecanedioic acid, dodecanedioic acid, hexadecanedioic acid, (Z)-butenedioic acid, (E)-butenedioic acid, pent-2-enedioic acid, dodec-2-enedioic acid, (2Z)-2-methylbut-2-enedioic acid, (2E,4E)-hexa-2,4-dienedioic acid, sebacic acid. Aromatic dicarboxylic acids may be used, such as phthalic acid, isophthalic acid, terephthalic acid and 2,6-naphthalenedicarboxylic acid. Mixtures of two or more dicarboxylic acid may be used, as mixtures of different dicarboxylic acids may aid in disrupting the structural regularity of the polyamide, thereby significantly reducing or eliminating crystallinity in the resulting polyamide component.

In some embodiments, the diacid component may also include a dicarboxylic acid with an anionic group. Useful dicarboxylic acids with an anionic group include 5-sulfoisophthalic acid, sodium salt or its dimethyl ester, 5-sulfoisophthalic acid, lithium salt.

In some embodiments, the dicarboxylic dimer acid may include at least one alkyl or alkenyl group and may contain 12 to 100 carbon atoms, 16 to 100 carbon atoms, or 18 to 100 carbon atoms and is characterized by having two carboxylic acid groups. The dimer acid may be saturated or partially unsaturated. In some embodiments, the dimer acid may be a dimer of a fatty acid. The phrase "fatty acid," as used herein means an organic compound composed of an alkyl or alkenyl group containing 5 to 22 carbon atoms and characterized by a terminal carboxylic acid group. Useful fatty acids are disclosed in "Fatty Acids in Industry: Processes, Properties, Derivatives, Applications", Chapter 7, pp 153-175, Marcel Dekker, Inc., 1989. In some embodiments, the dimer acid may be formed by the dimerization of unsaturated fatty acids having 18 carbon atoms such as oleic acid or tall oil fatty acid. The dimer acids are often at least partially unsaturated and often contain 36 carbon atoms. The dimer acids may be relatively high molecular weight and made up of mixtures comprising various ratios of a variety of large or relatively high molecular weight substituted cyclohexenecarboxylic acids, predominately 36-carbon dicarboxylic dimer acid. Component structures may be acyclic, cyclic (monocyclic or bicyclic) or aromatic.

In some embodiments, the diamine component may include one or more secondary diamines or one or more secondary/primary hybrid diamines and, optionally, one or more primary diamines.

In some embodiments, suitable secondary or secondary/primary hybrid amines may have the formula: $R^1$—NH—$R^2$—NH—$R^1$,
where $R^2$ is an:
   alkylene (e.g. —$CH_2CH_2CH_2$—),
   branched alkylene (—$CH_2CH(Me)CH_2$—),
   cycloalkylene (e.g. -cyclohexyl-$CH_2$-cyclohexyl-),
   substituted or unsubstituted arylene (e.g. -1,4-Phenylene-),
   heteroalkylene (e.g. —$CH_2CH_2$—O—$CH_2CH_2$— or any other "JEFFAMINE"), or
   heterocycloalkylene (e.g. —$CH_2$-furan ring-$CH_2$—);
and each $R^1$, independently, is a:
   linear or branched alkyl (e.g. -Me, -isopropyl),
   cycloalkyl (e.g. -cyclohexyl),
   aryl (e.g. -phenyl),
   heteroalkyl (e.g. —$CH_2CH_2$—O—$CH_3$),
   heteroaryl (e.g., -2-substituted-pyridyl), or
   hydrogen atom,
   with the proviso that both R's are not hydrogen atoms, or the IV groups are alkylene or branched alkylene and form a heterocyclic compound (e.g. piperazine).

Suitable secondary diamines may include, for example, piperazine, 1,3-Di-4-piperidylpropane, cyclohexanamine, 4,4'-methylenebis[N-(1-methylpropyl)]. In some embodiments, suitable secondary/primary hybrid diamines (i.e., diamines having a secondary amine and a primary amine) include, for example, aminoethyl piperazine. In some embodiments, the secondary/primary hybrid diamines may not be present, or may be present in an amount of less than 50 mol. %, 30 mol. %, 10 mol. %, or 5 mol. %, based on the total moles of the secondary or secondary/primary hybrid amines. In some embodiments, the number average molecular weight of suitable secondary diamines or secondary/primary hybrid diamines may be from 30 g/mol to 5000 g/mol, 30 g/mol to 500 g/mol, or 50 g/mol to 100 g/mol.

In some embodiments, the diamine component may, in addition to the secondary or secondary/primary hybrid amine, include a primary diamine, such as an aliphatic or aromatic primary amine. Suitable primary amines include, for example, ethylenediamine, m-xylylenediamine, 1,6-hexanediamine, 1,10-decanediamine, 1,12-dodecanediamine, 2,2,4(2,4,4)-trimethyl-1,6-hexanediamine, o-toluidine, or 1,3-Benzenedimethanamine. In some embodiments, the number average molecular weight of suitable primary diamines may be from 30 g/mol to 5000 g/mol, 30 g/mol to 500 g/mol, or 50 g/mol to 100 g/mol.

In some embodiments, the secondary or secondary/primary hybrid diamines, alone or in combination, may be present in the diamine component in an amount of from 1-100 mol %, 50-100 mol %, 90-100 mol %, 1-99 mol %, 50-99 mol %, 70-99 mol %, 90-99 mol %, 95-100 mol %, or 95-99 mol %, or 99-100 mol %, based on the total moles of the diamine component. In some embodiments, the secondary or secondary/primary hybrid diamines, alone or in combination, may be present in the diamine component in an amount of in an amount of at least 1 mol %, 50 mol %, 90 mol %, 95 mol %, or at least 99 mol %, based on the total moles of the diamine component.

In some embodiments, primary amines may not be present in the diamine component, or may be present in the diamine component in an amount of between 1-10 mol % or 1-5 mol %, based on the total moles of the diamine component. In some embodiments, the mole ratio of diamine to diacid in the polyamide component may be between 1 and 5, 1 and 4, 1.1 and 4, or 1.2 and 3.

In some embodiments, it may be beneficial to substitute a portion of the diacid or diamine components with corresponding components functionality greater than 2. The presence of higher functionality components can result in the formation of a crosslinked polymer with infinite molecular weight if that component is present at sufficient concentration in the composition. The appropriate level of the higher functionality component can be determined using empirical methods or by using Equation 7, Chapter 9 of "Principles of Polymer Chemistry" by Paul Flory (1953). Useful examples of acid components with functionality greater than 2 are 1,2,4-benzenetricarboxylic acid, 1,3,5-benzenetricarbonyl trichloride, citric acid, ethylenediamine tetraacetic acid, Pripol 1017 (available from Croda, Inc., Edison, NJ), Pripol 1025 (available from Croda, Inc., Edison, NJ), Pripol 1040 (available from Croda, Inc., Edison, NJ). Useful examples of diamine components with functionality greater than 2 are diethylenetriamine, triethylenetetraamine, 1,2,4-benzenetriamine.

The diacid component can be a diacid (—COOH) or in the form of carboxylic acid derivatives such as the corresponding alkyl diester (—COOR, where R=linear or branched C1-C4) or the corresponding diacid chloride (—COCO. In the case of the diacid, the reaction by-product will be water. In the case of the alkyl diester, the by-reaction product will be the corresponding linear or branched C1-C4 alcohol. In the acid of the diacid chloride, the by-product will be hydrogen chloride, which must be removed from the reaction to enable formation of the polyamide at high yield. Typical methods for removal of the hydrogen chloride include the use of tertiary amine co-solvents such as pyridine or 4-(N,N'-dimethyl)aminopyridine.

In some embodiments, the polyamide component may be formed following a conventional condensation reaction between at least one of the above described diacids and at least one of the above described diamines. Mixtures of at least two diacid types with at least one diamine, mixtures of at least two diamine types with at least one diacid type, or mixtures of at least two diacid types with at least two diamine types may be used. The polyamide component may be amine terminated or include amine end-groups. Amine termination can be obtained by using the appropriate stoichiometric ratio of amine groups to acid groups, e.g. the appropriate stoichiometric ratio of diamine and diacid during the synthesis of the polyamide. Useful ranges for the amine number are 1 mg KOH/g, to 250 mg KOH/g, preferably 2 mg KOH/g to 100 mg KOH/g, more preferably 3 mg KOH/g to 50 mg KOH/g.

In some embodiments, the polyamide component may be formed following a conventional condensation reaction between at least one of the above described diacids and at least one of the above described diamines. Mixtures of at least two diacid types with at least one diamine, mixtures of at least two diamine types with at least one diacid type, or mixtures of at least two diacid types with at least two diamine types may be used. The polyamides may be acid terminated or include acid end-groups. Acid termination can be obtained by using the appropriate stoichiometric ratio of acid groups to amine groups, e.g. the appropriate stoichiometric ratio of diacid and diamine during the synthesis of the polyamide. Useful ranges for the acid number are 1 mg KOH/g, to 250 mg KOH/g, preferably 2 mg KOH/g to 100 mg KOH/g, more preferably 3 mg KOH/g to 50 mg KOH/g.

In some embodiments, the polyamide component may include a multifunctional polyamidoamine or a hotmelt dimer acid based polyamide such as those described in U.S. Pat. No. 3,377,303 (Peerman et al.).

In some embodiments, the polyamide component comprises a polypeptide or a polypeptoid. Polypeptides include a chain of amino acids linked together by peptide bonds, and have the structure of $-[C(=O)-[CH_2]_m-N(R)]_n-$. Polypeptoids are similar, and have the structure $-[C(=O)-[C(R)]_m-NH]_n-$.

Poly(ester amide)s (PEAs) are prominent polymers, which can combine the stiffness and the excellent thermal and mechanical properties of polyamides with the biocompatibility and biodegradability of polyesters. They have been investigated and applied as biodegradable plastics for consumables (e.g., by Bayer, under the trade designation "BAK"). The first PEAs were synthesized in 1932 by Carothers from diacids, diols and diamines.

Polyamide-imides display a combination of properties from both polyamides and polyimides, such as high strength, melt processibility, exceptional high heat capability, and broad chemical resistance. They are prepared from isocyanates and TMA (trimellic acid-anhydride) in N-methyl-2-pyrrolidone (NMP). A prominent distributor of polyamide-imides is Solvay Specialty Polymers, which uses the trade designation "TORLON".

In some embodiments, the uncrosslinked thermoplastic nitrogen-containing matrix material comprises a polyurethane, such as a polyether-based thermoplastic polyurethane, a polyester-based thermoplastic polyurethane, or both. A polyurethane includes one or more carbamate functionalities in the backbone of the material. Urethanes are prepared by the reaction of an isocyanate with an alcohol to form carbamate linkages. Moreover, the term "polyurethane" has been used more generically to refer to the reaction products of polyisocyanates with polyactive hydrogen compounds including polyfunctional alcohols, and mercaptans (e.g., a polythiourethane).

In some embodiments, in addition to the urethane functionality, the polyurethane further comprises one or more pendent functional groups selected from carboxyl groups and siloxane groups. The polyurethane may further comprise a linking group selected from alkyl, polyalkylene, polyalkylene oxide, aryl, polycarbonate, polyester, polyamide, and combinations thereof. As used herein, "linking group" refers to a functional group that connects two or more urethane groups. The linking group may be divalent, trivalent, or tetravalent.

Suitable commercially available polyurethanes include for instance and without limitation, polyurethanes from Lubrizol Corporation (Brecksville, OH), under the trade designations "ESTANE", "ISOPLAST", AND "PEL- LETHANE". A few examples of such polyurethanes include a polyether-based polyurethane of the trade designation "ESTANE 58144"; a polyester-based polyurethane of the trade designation "ESTANE 58277"; a polyurethane of the trade designation "ISOPLAST 101 EPT"; and an aromatic polyether-based polyurethane of the trade designation "PEL-LETHANE 5862-85A".

In some embodiments, the uncrosslinked thermoplastic nitrogen-containing matrix material comprises a polyethyleneimine. Polyethyleneimines are polycationic polymers and may be linear or branched. One suitable polyethyleneimine is commercially available from Sigma Aldrich (St. Louis, MO) as a branched polyethyleneimine having an average weight average molecular weight (Mw) of about 25,000 grams per mole, and having a linear formula of $H(NHCH_2CH_2)_nNH_2$. Additional suitable polethyleneimine polymers include those from BASF Corporation, (Florham Park, NJ) under the trade designation "LUPASOL", such as "FG", "PR 8515", "P", and "PS".

In some embodiments, the uncrosslinked thermoplastic nitrogen-containing matrix material comprises a polyimide. Polyimides are polymers having an imide group (i.e., two acyl groups bound to a nitrogen atom), and have high resistance to elevated temperatures and to chemicals. Suitable commercially available polyimides include for instance and without limitation, those available from DuPont under the trade designation of "AURUM" thermoplastic polyimide resins, such as "J-1548", "J-2556", "JCL3010", "JCN3030", "PL500M", "JCF3030", "JCL3030", "JGM3030", and "PL450C".

In some embodiments, the uncrosslinked thermoplastic nitrogen-containing matrix material comprises a polyetherimide (PEI). Polyetherimides have been developed to overcome challenges associated with polyimides which are not readily melt processable. Incorporating the proper ether linkages into the polyimide molecular chain provides sufficient flexibility to allow good melt processability yet retains aromatic imide characteristics of excellent mechanical and thermal properties. Imides impart high temperature performance. Ether groups allow melt processing. Polyetherimide was first developed in 1982 by General Electric Company (now known as SABIC) under the trade name ULTEM resin, and is available from several suppliers such as: SABIC, RTP Company, Lehmann & Voss, Quadrant, PolyOne, etc.

In some embodiments, the uncrosslinked thermoplastic nitrogen-containing matrix material comprises a polyurea. Suitable polyureas may include polymers of polyisocyanates and polyamines. Any suitable polyisocyanates and polyamines may be used. Suitable polyisocyanates may include aromatic isocyanates, aliphatic isocyanates, polyisocyanates, or combinations thereof. Suitable aromatic isocyanates may include methylene diphenyl diisocyanate, 1,4-phenylene diisocyanate, 1,3-phenylene diisocyanate, 3,3'-dimethyl diphenylmethane-4,4'-diisocyanate, diphenylmethane-2,2'-diisocyanate, naphthalene diisocyanate, 4,4'-biphenyldiisocyanate, 1,5-naphthalene diisocyanate, 2-methyl-1,5-naphthalene diisocyanate, 2,4-toluene diisocyanate and 2,6-toluene diisocyanate and mixtures of the two isomers, diphenylmethane-2,4'-diisocyanate, 4-ethyl-m-phenylenediisocyanate, or mixtures thereof. Suitable aliphatic isocyanates may include 2,4,4-trimethylhexamethylene diisocyanate, 2,2,4-trimethylhexamethylene diisocyanate, 1,4-cyclohexane diisocyanate, 1,3-cyclohexyl diisocyanate, trimethylhexamethylene diisocyanate, isophorone diisocyanate (IPDI), decamethylene diisocyanate, methylene diisocyanate, methylene-bis(4-cyclohexylisocyanate) (H12MDI), dimeryl diisocyanate, trans-1,4-cyclohexane diisocyanate, hexamethylene diisocyanate, or mixtures thereof. Other suitable isocyanates may include polyisocyanates, including those based on any of the above. Suitable polyamines may include "JEFFAMINE" polyetheramines from Huntsman Corporation (The Woodlands, TX), or mixtures thereof. In addition, chain extenders may be included, which are typically monomeric or low molecular weight difunctional compounds. Suitable amino chain extenders may include 1,4 diaminobutane, ethylenediamine, 1,2 diaminopropane, 1,3 diaminopropane, 1,2 diaminocyclohexane, isophorone diamine, secondary cycloaliphatic diamines, diethyltoluenediamine, or mixtures thereof.

In some embodiments, the uncrosslinked thermoplastic nitrogen-containing matrix material comprises a polyoxazoline. Polyoxazolines are prepared by the cationic ring opening polymerization of oxazolines or oxazines. One suitable polyoxazoline is poly-2-ethyl-2-oxalozine, which is commercially available from Sigma Aldrich in a variety of number average molecular weights. Another way to polymerize oxazolines and oxazines is via spontaneous zwitterionic copolymerization (SZP) with electrophilic monomers such as acrylic acid, acrylamide, acrylates, malonates, or ethylenesulfonamide. SZP leads to alternating N-acylated polyamines, N-acylated poly(amino ethers), N-acylated poly (amino ethers), N-acylated poly(amino sulphonamides), poly(ester imino thioethers), and N-acylated poly(amino amido esters). These polymers are detailed in de Jongh, et. al. Prog. Polym. Sci. 2018, 87, 228.

In some embodiments, the uncrosslinked thermoplastic nitrogen-containing matrix material comprises a polyaminoamide. Polyaminoamides are cationic polymers that may be prepared by step growth polymerization. Suitable commercially available polyaminoamides include those available from Evonik Industries (Allentown, PA) under the trade designation "ANQUAMINE", such as "360", "401", "419", "456", and "701".

In some embodiments, the uncrosslinked thermoplastic nitrogen-containing matrix material comprises a polysulfonamide. Polysulfonamides include sulfone groups and amide groups along the backbone. Polysulfonamide pulp is sold by DuPont and is generated from the polycondensation of di-meta-aminodiphenylsulfone with para-phenylene diformyl chloride. Polysulfonamide pulp is also sold under the trade name TANLON by Shanghai Tanlon Fiber Co. (Shanghai, China) and is generated by the polycondensation of para-phenylene diformyl chloride with di-meta-aminodiphenylsulfone and di-para-aminodiphenylsulfone.

In certain embodiments, the uncrosslinked thermoplastic nitrogen-containing matrix material exhibits a (e.g., Vicat) softening point of 40° C. or greater, 50° C., 60° C., 70° C., 80° C., 90° C., 100° C., 110° C., 120° C., 130° C., 140° C., or 150° C. or greater; and 220° C. or less, 210° C., 200° C., 190° C., 180° C., 170° C., or 160° C. or less. The softening point is for materials that have no definite melting point, such as plastics. It is taken as the temperature at which the specimen is penetrated to a depth of 1 millimeter by a flat-ended needle with a 1 $mm^2$ circular or square cross-section at a load of 10 Newtons (N) or 50 N. A standard test method to determine Vicat softening point includes ASTM D 1525.

Additional Uncrosslinked Thermoplastic Materials

As noted above, in some embodiments, the uncrosslinked thermoplastic nitrogen-containing matrix material is blended with an uncrosslinked thermoplastic non-nitrogen-containing material and/or an uncrosslinked thermoplastic pendent nitrogen-containing material. Moreover, in some embodiments, a composite particle according to the fifth aspect may be used with an uncrosslinked thermoplastic non-nitrogen-containing matrix material and/or an uncrosslinked thermoplastic pendent nitrogen-containing matrix material to make a foam composition. These materials may be selected from a polyorganosiloxane, a styrenic block copolymer, a polystyrene, a polyolefin, a polyolefin copolymer, polyvinyl chloride (PVC), ethylene vinyl acetate, polyacrylate, polymethacrylate, an acrylate copolymer, an acrylic block copolymer, or a polylactic acid (PLA). When PLA is employed, the composition further comprises: a polymer having a $T_g$ of 25 degrees Celsius or greater; a crosslinking agent; and a crosslink catalyst. The polymer having a $T_g$ of 25 degrees Celsius or greater is often polyvinyl acetate. In some embodiments, the crosslink catalyst comprises an alkyl or alkenyl ammonium, phosphonium, or imidazolium salt. The composition usually also comprises a plasticizer. One or more additional components can be included, such as a crystallization nucleating agent, an antiblock additive, a cell stabilizer, a surfactant, or any combination thereof.

Suitable polyorganosiloxanes are described, for instance, in co-owned U.S. Pat. No. 7,501,184 (Leir et al.) and U.S. Pat. No. 8,765,881 (Hays et al.), incorporated herein by reference in their entireties. Polyvinyl chloride (PVC) is a polymer made up of a majority (e.g., at least 50%) vinyl chloride, and has been used as a matrix for foam products for years. A suitable PVC includes a PVC compound (e.g., suitable for extrusion processing) available under the trade designation GE FE1456CPF from Mexichem Specialty Compounds (Leominster, MA).

Suitable ethylene vinyl acetates (EVAs—copolymers of ethylene with vinyl acetate) include, for example, resins from DuPont (Wilmington, DE) available under the trade designation ELVAX. ELVAX resins are copolymers of ethylene and vinyl acetate. Typical grades range in vinyl acetate content from 9 to 40 weight percent and in melt index from 0.3 to 500 dg/min. (per ASTM D1238). Suitable ELVAX resins include grades 770, 760, 750, 670, 660, 650, 565, 560, 550, 470, 460, 450, 360, 350, 310, 265, 260, 250, 240, 220, 210, 205, 150, 140 and 40. Suitable EVAs also include high vinyl acetate ethylene copolymers from LyondellBasell (Houston, TX) available under the trade designation ULTRATHENE. ULTRATHENE materials are copolymers of ethylene and vinyl acetate. Typical grades range in vinyl acetate content from 7 to 29 weight percent. Suitable ULTRATHENE grades include UE 630, 632, 634, 635, 637, 646-04, 648, 652, 655, 656, 657, 662, 685-009, 688, 672, and 757-026. Suitable EVAs also include EVA copolymers from Celanese EVA (Dallas, TX) available under the trade designation ATEVA. Typical grades range in vinyl acetate content from 7 to 23 weight percent. Suitable ATEVA grades include 1030, 1081, 1070, 1211, 1221, 1231, 1240A, 1609, 1615, 1641, 1645, 1711, 1807, 1815, 1821, 1825A, 1841, 1941C, 2306E, 2911M, and 3211.

As used herein, polyacrylates refer to polymeric materials generally prepared by polymerizing acrylate monomers, and polymethacrylates refer to polymeric materials generally prepared by polymerizing methacrylate monomers. Acrylate and methacrylate monomers are referred to collectively herein as "(meth)acrylate" monomers. Polymers prepared from one or more of acrylate monomers, will be referred to collectively as "polyacrylates", while polymers prepared from one or more of methacrylate monomers, will be referred to collectively as "polymethacrylates". The polymers can be homopolymers or copolymers, optionally in combination with other, non-acrylate, e.g., vinyl-unsaturated, monomers. The copolymers of polyacrylates are acrylate copolymers, useful as uncrosslinked thermoplastic matrix material. Example suitable non-acrylate functional groups in acrylate copolymers include for instance, ethylene, acrylamides, acrylonitriles, methacrylonitriles, vinyl esters, vinyl ethers, vinyl pyrrolidinone, vinyl caprolactam, vinyl aromatic, dioxepines. Hence, the polyacrylate or polymethacrylate is polymerized prior to being combined with monomer having functional groups that copolymerize with the polyacrylate or polymethacrylate component. Specific examples of polyacrylate and polymethacrylate polymers include those prepared from free-radically polymerizable (meth)acrylate monomers or oligomers, such as described in U.S. Pat. No. 5,252,694 (Willett et al.) at col. 5, lines 35-68.

As used herein, "block copolymers" refer to elastomeric components in which chemically different blocks or sequences are covalently bonded to each other. Block copolymers include at least two different polymeric blocks that are referred to as the A block and the B block. The A block and the B block may have different chemical compositions and different glass transition temperatures. Block copolymers of the present disclosure can be divided into four main classes: di-block ((A-B) structure), tri-block ((A-B-A) structure), multi-block (-(A-B)$_n$-structure), and star block copolymers ((A-B)$_n$-structure). Di-block, tri-block, and multi-block structures may also be classified as linear block copolymers. Star block copolymers fall into a general class of block copolymer structures having a branched structure. Star block copolymers are also referred to as radial or palmtree copolymers, as they have a central point from which branches extend. Block copolymers herein are to be distinguished from comb-type polymer structure and other branched copolymers. These other branched structures do not have a central point from which branches extend.

Suitable acrylic block copolymers comprise at least one acrylic monomer. Exemplary acrylic block copolymer may comprise monomer units including: alkyl ester methacrylates such as, e.g., methyl methacrylate, ethyl methacrylate, n-propyl methacrylate, isopropyl methacrylate, n-butyl methacrylate, isobutyl methacrylate, s-butyl methacrylate, t-butyl methacrylate, n-hexyl methacrylate, cyclohexyl methacrylate, 2-ethyl hexyl methacrylate, n-octyl methacrylate, lauryl methacrylate, tridecyl methacrylate, stearyl methacrylate, isobornyl methacrylate, benzyl methacrylate, or phenyl methacrylate; alkyl ester acrylate such as, e.g., n-hexyl acrylate, cyclo hexyl acrylate, 2-ethyl hexyl acrylate, n-octyl acrylate, lauryl acrylate, tridecyl acrylate, stearyl acrylate, n-butyl acrylate, isobutyl acrylate, sec-butyl acrylate, tert-butyl acrylate, or 2-octylacrylate; (meth)acrylate esters such as, e.g., those having the following ester groups: methoxy ethyl(meth)acrylate, ethoxy ethyl(meth) acrylate, diethyl amino ethyl meth)acrylate, 2-hydroxy ethyl (meth)acrylate, 2-amino ethyl(meth)acrylate, glycidyl (meth)acrylate, tetrahydro furfuryl(meth)acrylate; isobornyl (meth)acrylate, and combinations thereof. The acrylic block copolymer may comprise additional monomer units, for example, vinyl group monomers having carboxyl groups such as, e.g., (meth)acrylic acid, crotonic acid, maleic acid, maleic acid anhydride, fumaric acid, or (meth)acryl amide; aromatic vinyl group monomers such as, e.g., styrene, α-methyl styrene, or p-methyl styrene; conjugated diene group monomers such as, e.g., butadiene or isoprene; olefin group monomers such as, e.g., ethylene, or propylene; or lactone group monomers such as, e.g., ε-caprolactone or valero lactone; and combinations thereof. One representative acrylic block copolymer is available from Kuraray (Tokyo, Japan), as the trade designation KURARITY LA2330.

Suitable styrenic block copolymers include for instance, styrene-isoprene-styrene copolymers, acrylonitrile-butadiene-styrene copolymers, styrene-butadiene-styrene copolymers, styrene-diene block copolymers, and styrene-ethylene-butylene-styrene copolymers. Example styrenic block copolymers may include linear, radial, star and tapered styrene-isoprene block copolymers such as KRATON D1107P, available from Kraton Polymers (Houston, TX), and EUROPRENE SOL TE 9110, available from EniChem Elastomers Americas, Inc. (Houston, TX), linear styrene-(ethylene/butylene) block copolymers such as KRATON G1657 available from Kraton Polymers, linear styrene-(ethylene/propylene) block copolymers such as KRATON G1657X available from Kraton Polymers, styrene-isoprene-styrene block copolymers such as KRATON D1119P available from Kraton Polymers, acrylonitrile-butadiene-styrene copolymers such as LUSTRAN ABS 348 available from INEOS (London, UK), linear, radial, and star styrene-butadiene block copolymers such as KRATON D1118X, available from Kraton Polymers, and EUROPRENE SOL TE 6205 available from EniChem Elastomers Americas, Inc., or styrene-ethylene-butylene-styrene copolymers, such as, for example the polymer KRATON G4609H, commercially available from Kraton Polymers.

Styrene acrylonitrile resin is a copolymer plastic consisting of styrene and acrylonitrile. It is also known as SAN, and is widely used in place of polystyrene owing to its greater thermal resistance. The relative composition is typically between 70 to 80% by weight styrene and 20 to 30% acrylonitrile.

ABS is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of poly (styrene-co-acrylonitrile). The nitrile groups from neighboring chains, being polar, attract each other and bind the chains together, making ABS stronger than pure polystyrene. The styrene gives the plastic a shiny, impervious surface. The polybutadiene, a rubbery substance, provides toughness even at low temperatures. For the majority of applications, ABS can be used between −20 and 80° C. (−4 and 176° F.) as its mechanical properties vary with temperature.

Nitrile rubber, also known as NBR, Buna-N, and acrylonitrile butadiene rubber, is a synthetic rubber copolymer of acrylonitrile (ACN) and butadiene. Trade designation include "PERBUNAN", "NIPOL", "KRYNAC", and "EUROPRENE". This material is a family of unsaturated copolymers of 2-propenenitrile and various butadiene monomers (1,2-butadiene and 1,3-butadiene).

Suitable polyolefin polymers include for instance and without limitation, semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate and combinations thereof.

Suitable polylactic acid ("PLA") polymers are described, for instance, in co-owned U.S. Application Publication No. 2017/0313912 (Zhou et al.), incorporated herein by reference. When PLA is included, the PLA can comprise an amorphous PLA polymer alone, a semicrystalline PLA polymer alone, or both in combination. Suitable examples of semicrystalline PLA include NATUREWORKS INGEO 4042D and 4032D. These polymers have been described in the literature as having molecular weight Mw of about 200,000 g/mole; Mn of about 100,000 g/mole; and a polydispersity of about 2.0. Another suitable semicrystalline PLA is available as "SYNTERRA PDLA". A suitable amorphous PLA includes NATUREWORKS INGEO 4060D grade. This polymer has been described in the literature to have a molecular weight Mw of about 180,000 g/mole.

When the uncrosslinked thermoplastic matrix comprises PLA, the composition further comprises a second polymer, such as polyvinyl acetate polymer. The second polymer can improve the compatibility of the PLA with a plasticizer such that the plasticizer concentration can be increased without plasticizer migration. The second (e.g., polyvinyl acetate) polymer has a $T_g$ of at least 25° C., 30° C., 35° C. or 40° C. The $T_g$ of the second (e.g., polyvinyl acetate) polymer is typically no greater than 80° C., 75° C., 70° C., 65° C., 60° C., 55° C., 50° C. or 45° C. Polyvinyl acetate polymers are commercially available from various suppliers including Wacker Chemie AG (Munich, Germany) under the trade designation VINNAPAS and from Vinavil Americas Corporation (West Chicago, IL) under the trade designation VINAVIL. A single second (e.g., polyvinyl acetate) polymer may be utilized or a combination of two or more second (e.g., polyvinyl acetate) polymers. The total amount of second (e.g., polyvinyl acetate) polymer present in the composition described herein is at least about 10 wt. % and typically no greater than about 50, 45, or 40 wt. %, based on the total weight of the foam composition. In some embodiments, the concentration of second (e.g., polyvinyl acetate) polymer is present in an amount of at least 15 or 20 wt. %.

Typically, the composition further comprises a plasticizer. The total amount of plasticizer in the composition typically ranges from about 5 wt. % to about 35, 40, 45 or 50 wt. %, based on the total weight of the composition. Various plasticizers that are capable of plasticizing PLA have been described in the art. The plasticizers are generally a liquid at 25° C. and typically have a molecular weight ranging from about 200 g/mol to 10,000 g/mol. Various combinations of plasticizers may be utilized.

The plasticizer preferably comprises one or more alkyl or aliphatic esters or ether groups. Multi-functional esters and/or ethers are typically preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable. Such plasticizers commonly further comprise linear or branched alkyl terminal group groups having a carbon chain length of $C_2$ to $C_{10}$.

Representative citrate-based plasticizers include for example, triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate.

In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate 18midazoli from Hallstar, Chicago, IL under the trade designation "TEGMER 809" ("TegMeR™ 809") and tetraethylene glycol di-ethylhexonate available from Hallstar, Chicago, IL under the trade designation "TEGMER 804" ("TegMeR™ 804").

In another embodiment, the plasticizer is a substituted or unsubstituted aliphatic polyester, such as described in U.S. Pat. No. 8,158,731 (Stefanisin et al.); incorporated herein by reference. In some embodiments, the aliphatic polyester plasticizer comprises repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof. One representative aliphatic polyester plasticizer is available from Hallstar, Chicago, IL, as the trade designation HALLGREEN R-8010. In some embodiments, the plasticizer compound typically has little or no hydroxyl groups. In some embodiments, the wt. % percent of hydroxyl groups relative to the total weight of the plasticizer compound is no greater than 10, 9, 6, 7, 6, 5, 4, 3, 2, 1 wt. %. In some embodiments, the plasticizer compound contains no hydroxyl groups. Thus, in this embodiment, the plasticizer is not glycerol or water.

The properties of foam compositions can be further controlled through the addition of one or more of crosslinking agents, crosslink catalysts, antiblock additives, surfactants, and/or cell stabilizers, which assist in forming a foam composition using a low melt viscosity material as the uncrosslinked thermoplastic matrix material in a composition. In some embodiments, the crosslink catalyst comprises an alkyl or alkenyl ammonium, phosphonium, or imidazolium salt. Once modified, at least some of these foam systems can be extruded or molded into parts with desired properties.

Suitable crosslinking agents (e.g., crosslinkers) are often low molecular weight polymers that contain multiple acid, amine or alcohol reactive functionality, such as reactive polymers selected from a multifunctional epoxide, a glycidyl epoxy resin, an isocyanate, a bismaleimide, a multifunctional acrylate, a cycloaliphatic epoxy resin, a polyfunctional aziridine, a polycarbodiimide, or combinations thereof. When used, the crosslinking agent is present in an amount of at least 0.005 wt. %, 0.01 wt. %, 0.025 wt. %, 0.05 wt. %, 0.1 wt. %, 0.25 wt. %, 0.5 wt. %, 1.0 wt. %, or at least 2.0 wt. %, based on the total weight of the composition; and up to 10 wt. %, 5.0 wt. %, 4.5 wt. %, 4.0 wt. %, 3.5 wt. %, 3.0 wt. %, 2.5 wt. %, 1.0 wt. %, or up to 0.5 wt. %, based on the total weight of the composition. Useful crosslinking agents (e.g., crosslinkers) include for instance and without limitation the "JONCRYL" chain extenders available from BASF Corporation (Sturtevant, WI), for example under the trade designations "JONCRYL 4370-F", "JONCRYL 4368-C", "JONCRYL ADR 4300", "JONCRYL ADR 4370", "JONCRYL ADR 4380", "JONCRYL ADR 4385", and "JONCRYL ADR 4368"; and an oxazoline functionalized polymer available from Nippon Shokubai (Osaka, Japan) under the trade designation "EPOCROS RPS-1005". Useful polyfunctional aziridines include for instance and without limitation the aziridines available under the trade designation "PZ-28", "PZ-33" "PZP-1000", "PZE-1000", or "PZBI-25" from PolyAziridin LLC (Medford, NJ)

In certain embodiments, the foam composition further comprises a crosslink catalyst to increase the rate of crosslinking as compared to the rate of crosslinking in the absence of the crosslink catalyst. In some embodiments, the crosslink catalyst is present in an amount of at least 0.005 wt. %, 0.01 wt. %, 0.025 wt. %, 0.05 wt. %, 0.1 wt. %, 0.25 wt. %, 0.5 wt. %, or at least 0.75 wt. %, based on the total weight of the composition; and up to 4 wt. %, 2.50 wt. %, 2.25 wt. %, 2.0 wt. %, 1.75 wt. %, 1.5 wt. %, 1.25 wt. %, or up to 1.0 wt. %, based on the total weight of the composition.

In certain embodiments, the crosslink catalyst comprises an alkyl or alkenyl ammonium, phosphonium, or imidizolium salt. Useful crosslink catalysts include for instance and without limitation crosslink catalysts of formula (I), (II), (III), or (IV):

$$Q(R^3)_4 X \quad (I);$$

$$QR^3(R^4)_3 X \quad (II);$$

$$QR^5(R^4)_3 X \quad (II);$$

$$Q(R^5)_3 R^3 X \quad (IV);$$

wherein Q is nitrogen or phosphorous; $R^3$ is a $C_1$-$C_{20}$ alkyl or alkenyl group; $R^4$ is a $C_1$-$C_8$ alkyl or alkenyl group; $R^5$ is a phenyl group, a benzyl group, or a polycyclic aromatic hydrocarbon group; and X is an anion selected from bromide, iodide, chloride, acetate, sulfate, carbonate, phosphate, tosylate, or hexafluorophosphase. In certain embodiments, Q is N; $R^3$ is a $C_1$-$C_{12}$ alkyl group; $R^4$ is a $C_1$-$C_8$ alkyl group; $R^5$ is a phenyl group; and X is an anion selected from bromide, iodide, or chloride. Some suitable crosslink catalysts include, for example, dodecyltrimethylammonium bromide, tetrabutylammonium bromide, tetrabutylammonium iodide, tetraoctylammonium bromide, tetrabutylammonium chloride, and triphenyl monoalkyl phosphonium salts.

Composite Particles

The plurality of composite particles of the composition each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle. The composite particles are as described in detail above with respect to the first aspect. Typically, the composite particles are present in an amount of 0.1 wt. % or greater of the total composition, 0.25 wt. %, 0.5 wt. %, 1 wt. %, 2 wt. %, 3 wt. %, 4 wt. %, 5 wt. %, 6 wt. %, 7 wt. %, 8 wt. %, 9 wt. %, or 10 wt. % or greater; and 20 wt. % or less, 19 wt. %, 18 wt. %, 17 wt. %, 16 wt. %, 15 wt. %, 14 wt. %, 13 wt. %, 12 wt. %, or 11 wt. % or less of the total composition. Stated another way, in some embodiments the composite particles are present in an amount of 0.5 wt. % to 20 wt. %, inclusive; 0.5 to 15 wt. %, 0.5 wt. % to 10 wt. %, 1 to 8 wt. %, or 10 wt. % to 17 wt. %, inclusive, of the total composition. In embodiments in which a composition is foamed in an oven, the composite particles are often present in an amount of 5 wt. % to 15 wt. %, such as 10 wt. %. In embodiments in which a composition is foamed in an extruder, the composite particles are often present in an amount of 0.1 wt. % to 10 wt. %, such as 5 wt. %.

The composite particle may be useful in forming a polymeric foam. Foams are porous materials that are composed of gas filled networks or chambers segmented by a solid matrix. The properties of foamed materials are governed by the composition of the matrix material and the morphology of its cellular structure. For certain applications, the properties of foamed materials improve as the cells in the matrix decrease in size and increase in density and homogeneity. Therefore, optimization of the foam structure can be desirable when designing foam articles.

Control over the morphology of a foam's cell structure is often governed by the foaming method to which the matrix material is subjected. Historically, foaming has been achieved using either physical blowing agents (PBAs), which take advantage of the change in volume that occurs during first order phase transitions such as evaporation and sublimation or when a gas experiences a decrease in pressure; or chemical blowing agents (CBAs), which are molecules that decompose to gaseous species when heated. One's choice in PBAs and CBAs has remained relatively unchanged since the 1950's; however, some disadvantages are associated with each. For instance, hydrocarbon PBAs are considered volatile organic chemicals (VOCs) while chlorofluorocarbons and hydrochlorofluorocarbons are ozone depletants; these designations are becoming increasingly undesirable for many applications. Further, when gases such as nitrogen or carbon dioxide are used as PBAs, specialty high pressure rated reaction vessels and extruders are needed to create the pressure drop necessary to foam the matrix resin. On the other hand, CBAs often face compatibility issues and/or undesirable side reactivity with the matrix materials. Therefore, new blowing agent innovations would be desirable.

An advance in blowing agent technology has been the expandable microsphere (EMS), sold by Nouryon and Chase Corporation. These materials are composed of gas or liquid hydrocarbon PBAs inside a polymer shell. When heated past the glass transition temperature ($T_g$) of the shell, the shell becomes malleable and expands due to the internal pressure of the heated PBA inside. The thickness of the shell and the quantity of PBA encapsulated is tuned to enable isotropic expansion rather than shell rupture, leading to an increase in volume. This process leads to a syntactic foam filled with polymer shells. EMSs lead to foams with very uniform cell sizes. However, the use of hydrocarbons and their residuals after use can still be an issue for applications that have stringent low VOC requirements. Additionally, the remnant hard shells tend to act as tougheners in soft matrix resins and also decrease tack if used in foamed adhesives, effects which can be undesirable for tape or damping applications. Finally, the hydrocarbon in the core of the microsphere can diffuse out of the particle over time, which limits this product's shelf life. Moreover, the leftover hard shell may scratch or cause other defects if the foam is used for polishing application.

The materials described herein aim to address at least certain disadvantages of one or more of the classic physical and chemical blowing agents and expandable microspheres. It has been discovered that encapsulation of CBAs in uncrosslinked (e.g., thermoplastic) polymer shells can lead to foam structures, after the CBA core decomposes and the composite particles rupture to release the formed gas, with decreased cell size and increased cell density and homogeneity as compared to unencapsulated CBAs. Encapsulation of a chemical blowing agent by a polymer shell provides a composite particle, in which the coating layer surrounds the core particle as a shell layer. Stated differently, such composite particles are core-shell particles. Additional benefits of these composite particles include that many CBAs do not give off VOCs during use, the shell material can be selected to be compatible with the foam matrix, and CBA particles will not diffuse through the shell wall or degrade at room temperature and pressure thus enabling a long shelf life for the composite particles.

The chemical blowing agent is a solid particulate blowing agent and is typically selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isotaoic anhydride, or any combination thereof. Examples of suitable chemical blowing agents include for instance and without limitation, 1,1-azodicarboxamide (AZO), p-toluene sulfonyl hydrazide (Hydrazine), p-toluenesulfonyl semicarbazide (PTSC), and 5H-phenyl tetrazole (5PT). AZO is one of the most common CBAs due to its high gas yield upon degradation and low cost. AZO decomposes when heated at or above 190° C. (with optimal temperatures between 190° C. and 230° C.), and gives off 220 mL/g nitrogen and carbon monoxide in the process. Hydrazine is another common CBA, and decomposes when heated at or above 150° C. (with optimal temperatures between 165° C. and 180° C.), and gives off 120 to 130 mL/g of ammonia, hydrogen, and nitrogen in the process. 5H-phenyl tetrazole is also a suitable CBA, and decomposes when heated at or above 215° C. (with optimal temperatures between 240° C. and 250° C.), and gives off 195 to 215 mL/g of nitrogen in the process. An additional suitable CBA is isatoic anhydride, which decomposes when heated at or above 210° C. (with optimal temperatures between 230° C. and 250° C.), and gives off 115 mL/g of carbon dioxide in the process.

Optionally, one or more additional materials may be co-encapsulated with the CBA. In some embodiments, the additional material comprises a metal oxide or metal salt, or combinations thereof. The metal oxide can be zinc oxide, calcium oxide, or a barium-cadmium complex, for example. In some embodiments, the metal salt can be of the form MX or $M(X)_2$, wherein M is zinc, calcium, cadmium, potassium, barium, strontium, magnesium, mercury, titanium, tin, lead, sodium, lithium, or cesium, and wherein X is an organic ligand or an inorganic ligand containing a nitrate, phosphate, phosphite, sulfate, carbonate, oxalic acid, halide, para-toluenesulfonate, tetrafluoroborate, perchlorate, hydroxide, or cyanide moiety and the corresponding hydrates. Examples of suitable metal salts include for instance, zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, zinc malonate, calcium malonate, zinc benzoate, calcium benzoate, zinc salicylate, calcium salicylate, zinc nitrate, zinc sulfate, zinc phosphate, zinc chloride, zinc bromide, zinc iodide, zinc fluoride, zinc carbonate, zinc p-toluenesulfonate hydrate, zinc tetrafluoroborate hydrate, zinc perchlorate, zinc hydroxide, zinc cyanide, calcium nitrate, calcium sulfate, calcium phosphate, calcium carbonate, barium phosphate, barium nitrate, barium sulfate, cadmium phosphate, cadmium nitrate, cadmium bromide, cadmium carbonate, cadmium chloride, cadmium iodide, cadmium perchlorate, or cadmium sulfate. Typically, the metal oxide and/or metal salt is present in the composite particle in an amount of 500 wt. % or less of the amount of the chemical blowing agent, 400 wt. %, 300 wt. %, 200 wt. %, 100 wt. %, or 50 wt. % or less of the amount of the chemical blowing agent. In select embodiments, a metal oxide or metal salt is co-encapsulated in the composite particle when the chemical blowing agent is 1,1-azodicarboxamide or p-toluene sulfonyl hydrazide. The metal salt may also be present in the shell of the composite particle. It has been discovered that the metal oxide or metal salt can alter the decomposition temperature of the CBA.

In a fifth aspect, a composite particle is provided. The composite particle includes a chemical blowing agent particle encapsulated within a shell including an uncrosslinked thermoplastic material; and a co-encapsulated metal salt. In some embodiments, the metal salt is also present in the shell. The metal salt is of the form MX or $M(X)_2$, wherein M is zinc, calcium, cadmium, potassium, barium, strontium, magnesium, mercury, titanium, tin, lead, sodium, lithium, or cesium, and wherein X is an organic ligand or an inorganic ligand containing a nitrate, phosphate, phosphite, sulfate, carbonate, oxalic acid, halide, para-toluenesulfonate, tetrafluoroborate, perchlorate, hydroxide, or cyanide moiety, or the corresponding hydrates. The uncrosslinked thermoplastic material exhibits a complex viscosity of 3,700 Pa·s or greater at a decomposition temperature of the chemical blowing agent particle. In some embodiments, the metal salt comprises zinc nitrate, zinc sulfate, zinc phosphate, zinc chloride, zinc carbonate, zinc p-toluenesulfonate hydrate, zinc tetrafluoroborate hydrate, zinc perchlorate, zinc hydroxide, zinc cyanide, calcium nitrate, calcium sulfate, calcium phosphate, calcium carbonate, cadmium nitrate, cadmium chloride, cadmium carbonate, or combinations thereof. In select embodiments, the metal salt comprises zinc nitrate, zinc sulfate, or zinc chloride. The use of various metal oxides and metal salts is discussed, for instance, in International Polymer Science and Technology, Vol. 43, No. 5, 2016, 812-819, and in U.S. Pat. Nos. 3,321,413 and 3,340,209 (both to Riley et al.) and. The uncrosslinked thermoplastic material exhibits a complex viscosity of 3,700 Pa·s or greater at a decomposition temperature of the chemical blowing agent particle.

Similarly, in some embodiments, the one or more additional materials co-encapsulated with the CBA comprises a polyhydroxyl compound, an amine containing compound, or a carboxylic acid containing compound. Examples of suitable polyhydroxyl compounds include for instance, glycerol, ethylene glycol, diethylene glycol, triethylene glycol, and combinations thereof. Examples of suitable carboxylic acid containing compounds include for instance, stearic acid, 2-ethylhexanoic acid, acetic acid, palmitic acid, and combinations thereof. Examples of suitable amine containing compounds include primary amines, for instance, monoethanolamine, diglycolamine, urea, biurea, cyanuric acid, guanidine, or combinations thereof. In select embodiments, an amine containing compound is co-encapsulated in the composite particle when the chemical blowing agent is p-toluene sulfonyl hydrazide.

The composite particle further includes a shell encapsulating the chemical blowing agent. It has been discovered that the use of an uncrosslinked thermoplastic material that has at least a certain minimum complex viscosity at the degradation temperature of the CBA alters the foaming process, as compared to the same CBA that is either not encapsulated or is encapsulated in an uncrosslinked thermoplastic material having a complex viscosity below the minimum amount at the degradation temperature of the CBA. Accordingly, the specific shell material selected will depend on the decomposition temperature of the CBA to be used. In many embodiments, the uncrosslinked thermoplastic material is selected from a starch, polyvinyl pyrrolidinone (PVP), a copolymer of vinylpyrrolidone and vinyl acetate, a polypropylene-based elastomer, a styrene-isoprene-styrene copolymer, a $(C_1-C_3)$alkyl cellulose, a hydroxyl $(C_1-C_3)$ alkylcellulose; carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Water soluble starches are typically prepared by partial acid hydrolysis of starch. Examples of water soluble starches include those, for example, that are commercially available under the trade designation LYCOAT from Roquette (Lestrem, France). Examples of water soluble celluloses include, but are not limited to, alkyl cellulose (e.g., methyl cellulose, ethyl cellulose, ethyl methyl cellulose), hydroxylalkyl cellulose (e.g., hydroxymethyl cellulose, hydroxyethyl cellulose, hydroxypropyl cellulose, hydroxypropyl methyl cellulose, hydroxyethyl methyl cellulose, and hydroxyethyl ethyl cellulose), and carboxylalkyl cellulose (e.g., carboxymethyl cellulose).

Examples of suitable uncrosslinked thermoplastic materials include for instance and without limitation, hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof. In certain embodiments, the uncrosslinked thermoplastic material is selected from hydroxypropyl starch, PVP, a polyamide, a styrenic copolymer, or a combination thereof, preferably hydroxypropyl starch or PVP.

The weight average molecular weight of the uncrosslinked thermoplastic material is often at least 1,000 Daltons, at least 2,000 Daltons, at least 5,000 Daltons, or at least 10,000 Daltons. The weight average molecular weight can be up to 500,000 Daltons or higher. For example, the weight average molecular weight can be up to 300,000 Daltons, up to 200,000 Daltons, up to 100,000 Daltons, up to 50,000 Daltons, up to 20,000 Daltons. Some such uncrosslinked thermoplastic polymers can be obtained, for example, from Polysciences, Inc. (Warrington, PA, USA).

Figure 10:
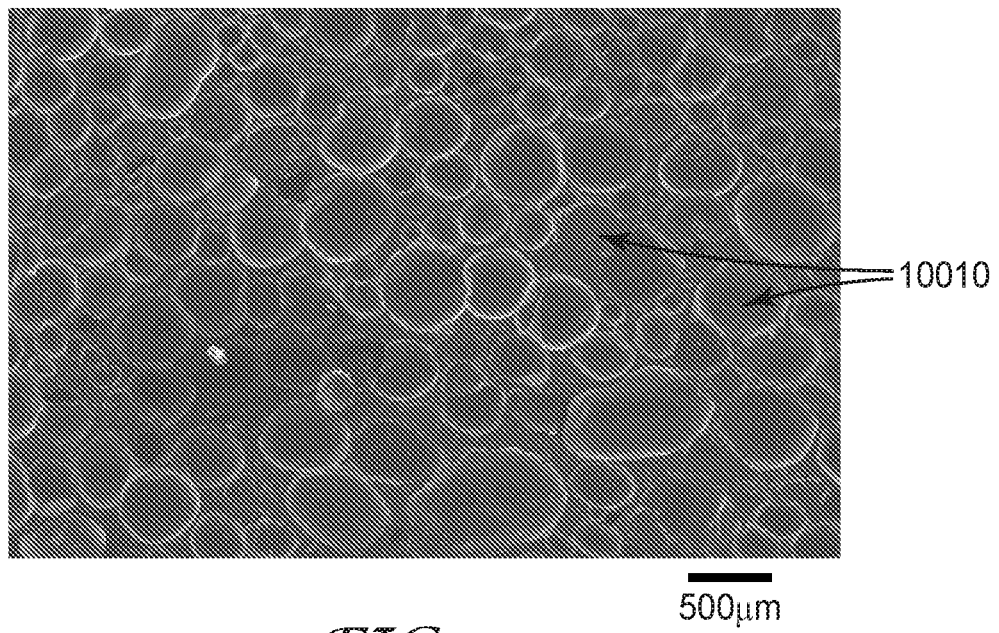
FIG. 10 is an SEM image of the foam composition of Example 29 foamed for 9 minutes at a temperature of 150° C.
Figure 11:
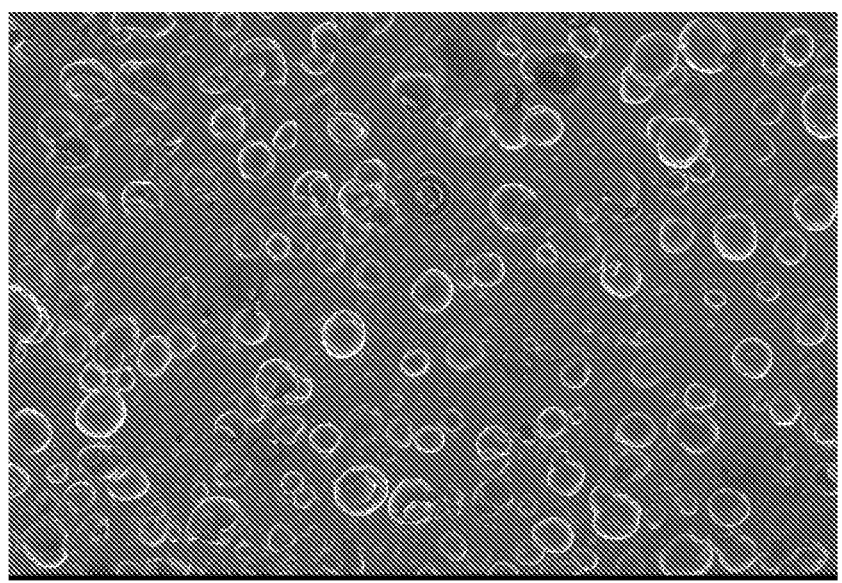
FIG. 11 is an SEM image of the foam composition of Example 30 foamed for 5 minutes at a temperature of 190° C.
Figure 12A:
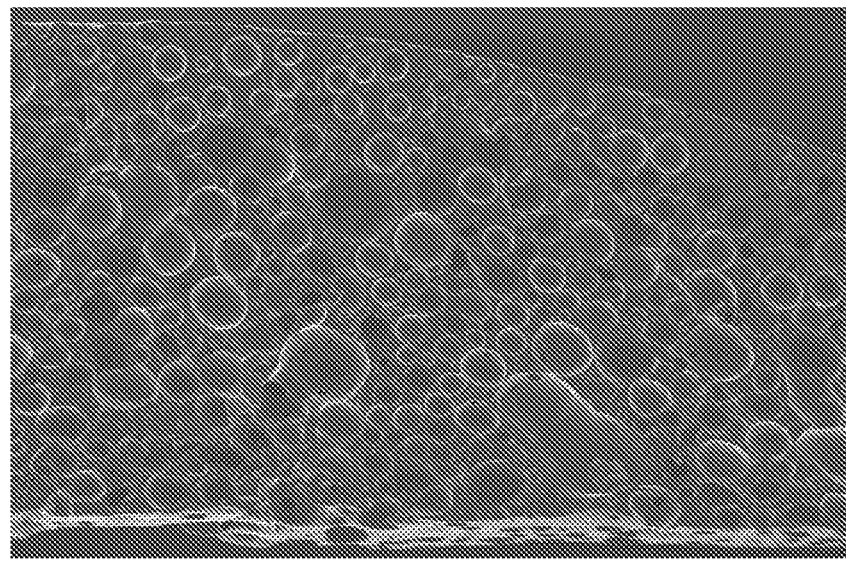
FIG. 12A is an SEM image of the foam composition of Example 31 foamed for 12 minutes at a temperature of 150° C.
Figure 12B:
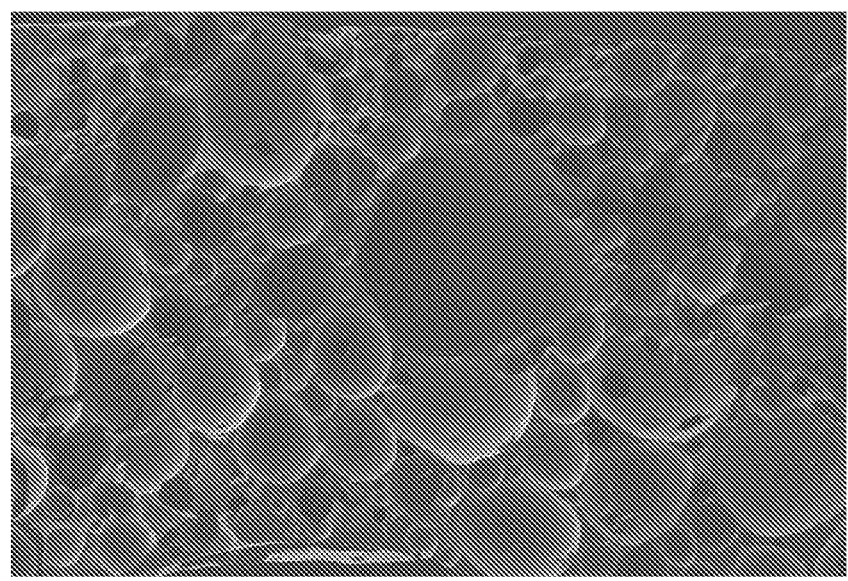
FIG. 12B is an SEM image of the foam composition of Comparative Example I foamed for 12 minutes at a temperature of 150° C.
Figure 13:
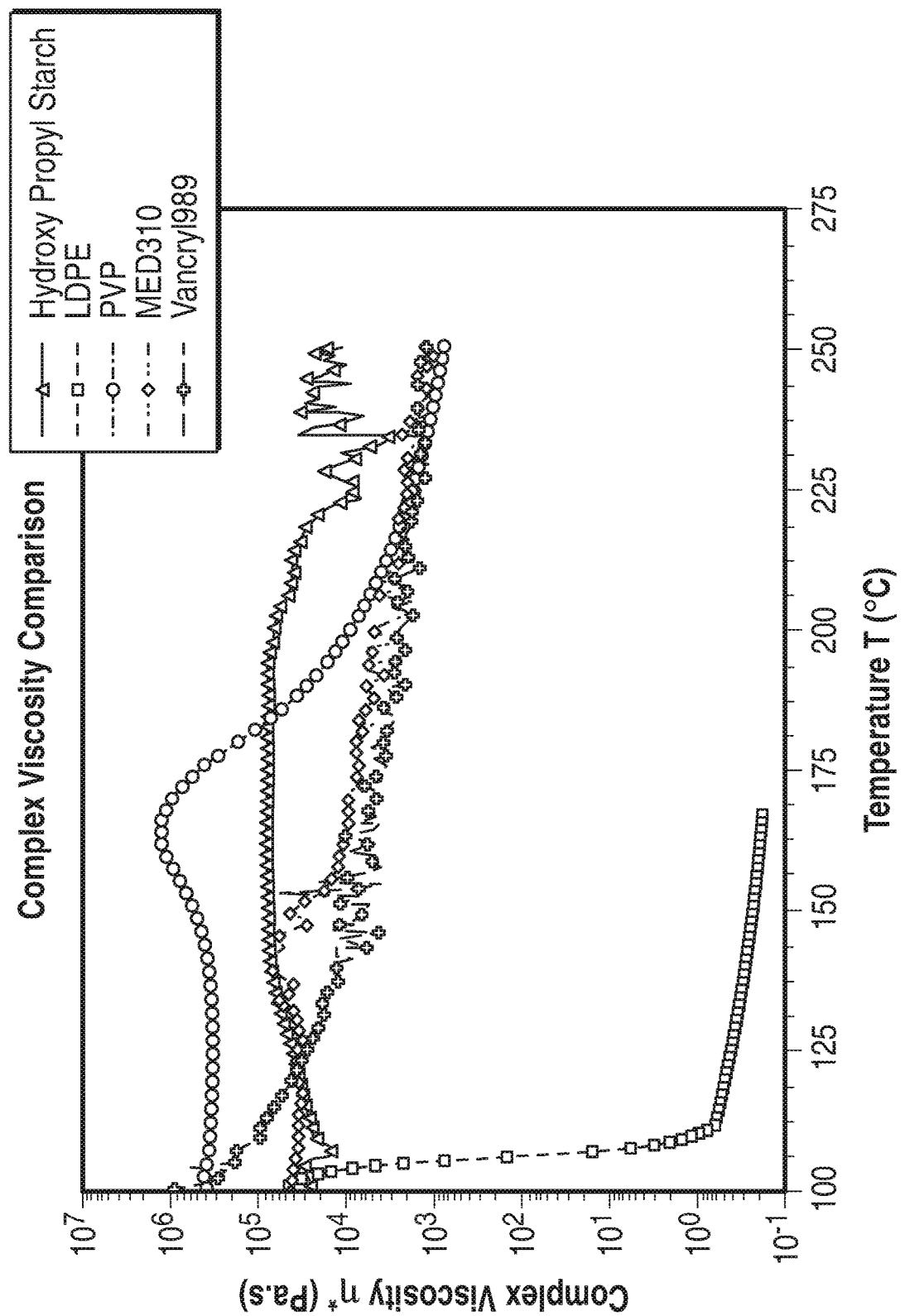
FIG. 13 is a graph of complex viscosity versus temperature for uncrosslinked thermoplastic materials.

The uncrosslinked thermoplastic material can have a higher complex viscosity than 3,700 Pa·s, for instance exhibiting a complex viscosity of 4,000 Pa·s or greater, 4,500 Pa·s or greater, 5,000 Pa·s or greater, 5,500 Pa·s or greater, or 6,000 Pa·s or greater at a decomposition temperature of the chemical blowing agent particle. Unexpectedly, although the uncrosslinked thermoplastic materials may have glass transition temperatures below the decomposition temperature of the CBA, the shell can decrease diffusion of the gaseous CBA, affecting the foam formation. Without wishing to be bound by theory, it is believed that the viscous uncrosslinked thermoplastic material assists in preventing cell ripening, by minimizing the amount of gas that diffuses preferentially into a previously nucleated cell. When enough pressure is built up inside the particle, the shell ruptures and a new cell is nucleated. After shell rupture and cell nucleation, the remnant uncrosslinked shell material remains dispersed in the foam matrix. This is based on the observed decreased cell size and increased cell density and homogeneity upon foaming with composite particles according to at least certain embodiments of the present disclosure, as compared to the cell size, density, and homogeneity upon foaming with unencapsulated CBAs. Additionally, in some cases, when a cross-section of the foam or pre-foam resin is imaged (e.g. by scanning electron microscopy (SEM)), unactivated particles, particles that were in the process rupturing as the foam was cooling, and/or remnant shell material from fully ruptured particles, can be seen dispersed through the article. When foams are imaged this gives the interfacial surface between the foam matrix and the closed foam cells a textured or bumpy look; as opposed to a smooth look when unencapsulated CBAs are used. For instance, FIG. 10 is an SEM image of the foam composition of Example 29 foamed for 9 minutes at a temperature of 150° C., and 10010 indicates just two of a plurality of bumps on the interfacial surface between the foam matrix and the closed foam cells.

Any suitable method can be used to deposit a coating of uncrosslinked thermoplastic material (i.e., shell) around the chemical blowing agent (e.g., core particle). Typically, an aqueous coating composition (e.g., coating solution or coating dispersion) is mixed with the CBA particles. Such mixture (i.e., a slurry) is then subjected to conditions effective to form dried composite particles as described herein.

In many techniques, the slurry can be formed into particles (e.g., by atomization), and then the particles can be dried (e.g., in a spray chamber). A suitable method for forming composite particles of the present disclosure is via spray drying. For instance, a slurry of chemical blowing agent solid particles and uncrosslinked thermoplastic material can be prepared, followed by spray drying using commercially available spray drying systems. Preparation of several (e.g., representative) composite particles using spray drying techniques are described in the Examples below.

For many embodiments of the composite particles, the coating layer surrounds the core particle as a shell layer. Stated differently, such composite particles are core-shell particles. Prior to release of the chemical blowing agent, the composite particles have a core-shell structure with the core particles fully containing the chemical blowing agent. In some embodiments, the shell layer (coating layer) surrounds a single core particle (plus optional co-encapsulant(s), if present). In other embodiments, however, the shell surrounds multiple core particles (i.e., an agglomerate of core particles). That is, the particle contains multiple core particles within a common shell layer (coating layer). The core particles are not tacky. This increases the likelihood that multiple core particles will not adhere together before or during application of the coating layer. That is, the lack of tackiness of the core particles increases the likelihood that the coating layer will be positioned around a single core particle rather than around multiple core particles.

The coating layer is typically formed by mixing an aqueous coating composition (e.g., coating solution or coating dispersion) with the core particle. The coating composition can have any desired percent solids that allow good mixing with the core particles. In many embodiments, the maximum percent solids often correspond to the coating composition (e.g., solution or dispersion) having the highest viscosity that can be pumped. High solids can be desirable because less water needs to be removed during the process of forming the coating layer. If the percent solids value is too high, however, it is more likely that the coating layer will surround multiple core particles. In many embodiments, dilute coating compositions are used to increase the likelihood of forming particles containing a single core particle.

The coating composition often contains at least 5 wt. %, 10 wt. %, 15 wt. %, 20 wt. %, 33 wt. %, or at least 50 wt. % solids. The weight percent solids corresponds to the weight percent thermoplastic material and chemical blowing agent and any co-encapsulant in the coating composition. The weight percent solids can be up to 70 wt. % or even higher, 60 wt. %, 50 wt. %, 40 wt. %, or up to 30 wt. %.

Spray drying (spray coating and drying) or similar processes such as fluidized bed coating and drying that can result in the formation of a coating layer with relatively uniform thickness around the core particles is often considered to be preferable. If conditions are selected appropriately, these processes can be used to provide particles having a single rather than multiple core particles. That is, the composite particles have a core-shell arrangement with a coating layer around a single core particle.

With spray drying, the core particles are mixed with the coating composition (e.g., coating solution or coating dispersion) to form a slurry. This slurry is then pumped to a drying chamber that contains an atomizer (to form droplets) and a drying gas. Some common types of atomizers include a rotary wheel (centrifugal) atomizer, a single-fluid/pressure nozzle (hydraulic) atomizer, a two-fluid nozzle (pneumatic) atomizer, and an ultrasonic atomizer. The product, which is the dried composite particles, can be collected by various means such as by gravity or by using a cyclone, filter and bag, electrostatic separation, or the like.

Although a variety of suitable atomization processes can be used, two-fluid nozzle atomizers are often used. With these atomizers, a primary fluid (e.g., the slurry) is pumped through a small orifice and a second fluid, which is typically air or nitrogen but could be any suitable gas, is supplied near the small orifice to further atomize the primary fluid. Increasing the ratio of the secondary fluid to the primary fluid usually decreases the slurry droplet size and increases the likelihood of having a single core particle within the coating layer. The two-fluid system may have either internal mixing (the second fluid is introduced into the primary fluid before exiting the final orifice) or external mixing (the second fluid is introduced after the primary fluid exits the final orifice). Multiple different configurations can be used for introducing the second fluid relative to the primary fluid. For example, the configuration can be a round spray (concentric ring of the second fluid surrounding the primary fluid orifice), conical/hollow spray, angle/flat spray, swirl spray, or the like. Atomizers with these different configurations are available from various suppliers such as Spraying Systems Co. (Wheaton, IL).

Numerous options can be used for the flow of the bulk drying gas into and out of the drying chamber. To maintain sufficient thermal energy and to provide a drying gas with sufficient drying capacity (e.g., low dew point), the drying gas is usually continuously cycled through the drying chamber. The main classes of flow patterns of the drying gas relative to the atomized droplets (input material) are co-current flow, counter-current flow, and mixed flow. Co-current flow involves the input material travelling in the same direction as the bulk drying gas; this is often embodied as input material travelling downward immediately after atomization (e.g., being sprayed downward) along with the downward-travelling bulk drying gas. Co-current is usually good for temperature-sensitive systems because the hot drying gas is cooled by the drying droplets, so the solid materials never experience the temperature of the hot incoming drying gas. Counter-current flow involves the input material travelling in the opposite direction to the bulk drying gas; this is often embodied as input material travelling downward immediately after atomization (e.g., being sprayed downward) while the bulk drying gas is travelling upward. This flow is often used for the most efficient drying. Mixed flow is a combination of co- and counter-current flow, where the input material is travelling in the same direction as the bulk drying gas in some regions, but in the opposite direction in other regions. Most often this flow pattern is seen when the input material is being atomized in an upward direction, where the input material initially travels upward from the energy imparted on it by atomization, but is subsequently pulled downward by gravity. Because the input material travels in two directions, the bulk drying gas will travel with the input material in some places and against the input material in others, regardless of whether the bulk drying gas is traveling downward or upward. Mixed flow can be advantageous because of the higher residence times in the drying chamber it provides to the drying solids.

The drying temperature is usually selected based on the composition of the core particles and the aqueous coating composition. In many embodiments, the bulk drying gas at the outlet of the drying chamber has a temperature near the boiling point of the dispersion medium (i.e., water) used in the slurry (in the coating composition) to ensure that adequate drying occurs. This does result, however, in the dried solids reaching a temperature that is near the boiling point of the water. In most instances, this can be beneficial because it minimizes residual liquids, which can lead to improved flowability, and reduction of unnecessary mass. For some particles, however, it may be undesirable to use such a high drying temperature. This can be the situation, for example, where any component of the particles has a decomposition temperature near the boiling point of the water contained in the slurry. In particular, care must be taken to prevent or minimize release of the chemical blowing agent from the particle. In such a situation, the drying temperature is typically reduced below that where any undesirable alteration of the chemical blowing agent particle can occur. Drying can be accomplished at lower temperatures, for example, by increasing the residence time in the drying chamber, increasing the flow rate of the drying gas, decreasing the evaporative load, or modifying the various flow patterns.

Multiple coating layers can be positioned around the core particle. Often, multiple layers are added to provide a thicker coating layer or to alter the release characteristics of the chemical blowing agent from the composite particle. If multiple coating layers are used, they are usually selected to be compatible with each other. In many embodiments, the same uncrosslinked thermoplastic material is used to form the multiple coating layers.

Typically, the composite particle comprises a diameter of 1 micrometer or greater, 2 micrometers, 4 micrometers, 6 micrometers, 8 micrometers, 10 micrometers, 14 micrometers, 17 micrometers, or 20 micrometers or greater; and 60 micrometers or less, 55 micrometers, 50 micrometers, 45 micrometers, 40 micrometers, 37 micrometers, 33 micrometers, 30 micrometers, 27 micrometers, or 23 micrometers or less. Stated another way, the composite particle can comprise a diameter of 1 to 60 micrometers, inclusive. An (e.g., average) diameter of the composite particles can be determined using scanning electron microscopy (SEM).

In certain embodiments, the chemical blowing agent is present in a composite particle in an amount of at least 1 wt. %, 5 wt. %, 10 wt. %, 20 wt. %, 30 wt. %, 40 wt. %, 50 wt. %, or at least 60 wt. %, based on total weight of the composite particle. In certain embodiments, the chemical blowing agent is present in a composite particle in an amount of up to 80 wt. %, 75 wt. %, 70 wt. %, or up to 65 wt. %, based on the total weight of the composite particle.

In certain embodiments, the shell is present in a composite particle in an amount of at least 20 wt. %, 30 wt. %, 40 wt. %, 50 wt. %, or at least 60 wt. %, based on the total weight of the composite particle. In certain embodiments, the shell is present in a composite particle in an amount of up to 99 wt. %, 90 wt. %, 80 wt. %, or up to 70 wt. %, based on the total weight of the composite particle.

Additives

In certain embodiments, the composition further comprises a blowing agent comprising a plurality of expandable microspheres. The blowing agent is present in an amount ranging from 0.1 to 10 weight percent, inclusive, based on the total weight of the composition. An "expandable microsphere" refers to a microsphere that includes a polymer shell and a core material in the form of a gas, liquid, or combination thereof, which expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature. Hence, during the formation of the foam composition, at least some of the expandable microspheres will expand and form cells in the foam. Suitable expandable microspheres include for instance and without limitation, those available from Pierce Stevens (Buffalo, N.Y.) under the designations "F30D", "F80SD", and "F100D"; and from Akzo-Nobel (Sundsvall, Sweden) under the designations "Expancel 551", "Expancel 461", "Expancel 091", and "Expancel 930". Each of these microspheres features an acrylonitrile-containing shell. Optionally, one or more unencapsulated chemical blowing agents are also included in the composition. As described above, suitable chemical blowing agents include solid particulate blowing agents such as an azo compound, a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or any combination thereof.

To facilitate the rate of crystallization, a crystallization nucleating agent may also be present in the composition. A crystallization nucleating agent generally enhances the initiation of crystallization sites and induces crystallization of the polymeric material, thereby increasing the rate of crystallization. Additionally, when an unencapsulated chemical blowing agent is present, a cell nucleating agent generally provides initiating sites at which a blowing agent forms voids in a foam composition. By selection of the cell nucleating agent, void sizes in the foam are better controlled (e.g., made smaller or larger), as compared to without including the nucleating agent. Typically, when used, the one or more nucleating agents (e.g., crystallization and/or cell nucleating agents) are present in an amount ranging from 0.1 to 15 weight percent, inclusive, based on the total weight of the composition.

Suitable nucleating agent(s) include for example inorganic minerals, organic compounds, salts of organic acids and imides, finely divided crystalline polymers with a melting point above the processing temperature of the uncrosslinked thermoplastic matrix material, and combinations of two or more of the foregoing. Combinations of two or more different nucleating agents may also be used.

Examples of useful crystallization nucleating agents include, for example, talc (hydrated magnesium silicate —$H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic crystallization nucleating agent is present, the nucleating agent is typically at a concentration of at least 0.01, 0.02, 0.03, 0.04, 0.05, 0.1, 0.15 or at least 0.2 wt. %, and ranging up to about 1, 2, 3, 4 or 5 wt. % based on the total weight of the composition. When the nucleating agent is an inorganic oxide filler such as silica, alumina, zinc oxide, and talc, the concentration can be higher.

In one embodiment, the crystallization nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored crystallization nucleating agent is zinc phenylphosphonate having the following chemical formula:

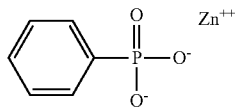

available from Nissan Chemical Industries, Ltd under the trade designation "Ecopromote".

Examples of useful cell nucleating agents include, for example, talc, silica, silica particles functionalized with organic groups (e.g., an octyl silane, a polyethylene glycol silane), glass beads, polymer particles (e.g., starch (such as hydroxypropyl starch), polystyrene, polyvinyl pyrollidone (PVP)), mica, alumina, clay, calcium silicate, calcium titanate, calcium carbonate, and titania.

The compositions and articles may optionally contain one or more conventional additives. Additives include, for example, antiblock additives, cell stabilizers, surfactants, antioxidants, ultraviolet absorbers, lubricants, processing aids, antistatic agents, colorants, impact resistance aids, fillers, matting agents, flame retardants (e.g. zinc borate), pigments, and the like. Additional additives include, but are not limited to, carbon black, inorganic filler from micrometer size to nanosized, glass fibers, polymer fibers, or carbon fibers, etc. Suitable cell stabilizers include for instance and without limitation erucamide (i.e., (Z)-13-Docosenamide), and surface modified silica nanoparticles. Surface modified silica nanoparticles may be functionalized with an octyl silane or a polyethylene glycol silane, for example. In certain embodiments, additional suitable surface modified silica nanoparticles include those described in U.S. Pat. No. 6,586,483 (Kolb et al.).

In some embodiments, inorganic fillers may be used as antiblock additives to prevent blocking or sticking of layers or rolls of foam compositions during storage and transport. Inorganic fillers include clays and minerals, either surface modified or not. Examples include talc, diatomaceous earth, silica, mica, kaolin, titanium dioxide, perlite, and wollastonite.

Hence, certain materials may potentially act as more than one of a crystallization nucleating agent, a cell nucleating agent, an antiblock additive, a cell stabilizer, etc., in a composition.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, glutelins. In typical embodiments, the composition comprises little or no organic biomaterial fillers such a flour. Thus, the concentration of organic biomaterial filler (e.g. flour) is typically less than 10, 9, 8, 7, 6, 5, 4, 3, 2, or less than 1 wt. % of the total foam composition.

Foam Compositions

In a second aspect, a foam composition is provided. The foam composition comprises: a closed cell foam thermoplastic nitrogen-containing matrix material and an uncrosslinked thermoplastic material distributed in the closed cell foam thermoplastic nitrogen-containing matrix material. The closed cell foam thermoplastic matrix material is formed by foaming the uncrosslinked thermoplastic matrix material described above with respect to the first aspect.

In some embodiments, the uncrosslinked thermoplastic material is present as a plurality of particulates distributed (e.g., dispersed) in the foam. The particulates are typically remnants of shells of the composite particles after they rupture during the foaming process. In certain embodiments, the uncrosslinked thermoplastic material is present as a blend with the closed cell foam thermoplastic nitrogen-containing matrix material.

In some embodiments, the foam composition further comprises a plurality of composite particles distributed in the closed cell foam thermoplastic nitrogen-containing matrix material (e.g., which did not rupture during foaming), wherein the composite particles each comprise: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle. The composite particle is as described in detail above with respect to the first aspect. In certain embodiments, 0.05 wt. % or more, 0.1 wt. %, 0.15 wt. %, 0.25 wt. %, 0.5 wt. %, 0.75 wt. %, 1 wt. %, 1.5 wt. %, or 2 wt. % or more of the composite particles remain (e.g., intact) following foaming of the composition to form the foam composition; and 20 wt. % or less, 10 wt. %, 9.5 wt. %, 9 wt. %, 8.5 wt. %, 8 wt. %, 7.5 wt. %, 7 wt. %, 6.5 wt. %, 6 wt. %, 5.5 wt. %, 5 wt. %, 4.5 wt. %, 4 wt. %, 3.5 wt. %, 3 wt. %, or 2.5 wt. % or less of the composite particles remain in the foam composition. Stated another way, the amount of composite particles remaining in the foam composition following foaming can range from 0.05 to 20 wt. % or 0.05 to 2.5 wt. %, of the total foam composition.

The foam composition comprises a closed cell foam, which means that the foam contains substantially no connected cell pathways that extend from one outer surface through the material to another outer surface. A closed cell foam can include up to about 10% open cells, within the meaning of "substantially" no connected cell pathways. Stated another way, the foam composition comprises 90% or greater closed cells, 92% or greater closed cells, 95% or greater closed cells, or 98% or greater closed cells.

As mentioned above, it has been discovered that the preparation of foam compositions including composite particles according to at least certain embodiments of the present disclosure resulted in decreased cell size and increased cell density and homogeneity upon foaming, as compared to the cell size, density, and homogeneity upon foaming with unencapsulated CBAs. Foam cells can be characterized by image analysis of a cross-section using scanning electron microscopy (SEM). Various properties of the foam compositions, as determined by the test methods set forth in the examples, can include cell size, cell density, cell aspect ratio, and elastic modulus.

In certain embodiments, the foam composition comprises an average cell size of 350 micrometers or less, 300, 250, 200, 150, 100, 80, 70, or 60 micrometers or less; and 25 micrometers or greater, 30, 35, 40, 45, or 50 micrometers or greater. In an embodiment, the foam composition has an average cell size of 30 to 65 micrometers. Further, in some embodiments, the foam composition comprises an average cell density of 1 cell per square millimeter (cell/mm$^2$) or greater, 2, 3, 4, 6, 8, 10, 12, 15, 20, 25, 50, 75, 100, 125, 150, 200, 250, 300, 350, or 400 cells/mm$^2$ or greater; and 1,000 cells/mm$^2$ or less, 950, 900, 850, 800, 750, 700, 650, 600, 550, or 500 cells/mm$^2$ or less. Stated another way, the foam composition can have an average cell density of 1 to 1,000 cells/mm$^2$ or 4 to 500 cells/mm$^2$.

For certain applications, a large average cell size is desirable, and the foam composition can have an average cell size of 250 micrometers or greater, 300, 350, 400, 450, 500, 550, or 600 micrometers or greater; and 1 millimeter (mm) or less, 950 micrometers, 900, 850, 800, 750, or 700 micrometers or less. Stated another way, in certain embodiments the foam composition can have an average cell size of 250 micrometers to 1 mm.

When the foam composition is a monolithic sheet, the thickness of the sheet is typically at least 25, 50, or 100 micrometers (μm) (4 mils) to 500 μm (20 mils) thickness. In some embodiments, the thickness of the foam sheet is no greater than 10 mm, 5 mm, 2 mm, 400 μm, 300 μm, or no greater than 200 μm. The foam may be in the form of individual sheets, particularly for a thickness of greater than 20 mils. The (e.g., thinner) foam may be in the form of a roll-good.

Figure 3B:
FIG. 3B is a photographic image of the foam composition of Comparative Example G extruded at a die temperature of 390° F.

Advantageously, foam compositions according to at least certain embodiments of the present disclosure provide a foam with a continuous surface, whereas the same foam compositions prepared using unencapsulated chemical blowing agents at equivalent weight percent of blowing agent have a discontinuous surface. For instance, FIG. 3A shows an exterior surface of the foam sheet of Example 9, which does not have holes visible on the surface (i.e., is continuous). In contrast, FIG. 3B shows an exterior surface of the foam sheet of Comparative Example G, which does have visible holes 3010 on the surface (i.e., is discontinuous).

Foam compositions according to at least certain embodiments of the present disclosure provide a major surface having (e.g., a plurality of) replicated features. In select embodiments, the foam composition comprises a smooth major surface and an opposing major surface comprising replicated features. The replicated features can be raised or indented relative to the plane of the major surface, and have structures such as grooves, ridges, and various geometrical shapes. For instance, FIG. 6 shows a replicated surface of the foam composition of Example 23, having a raised tile pattern. Methods and apparatuses for forming a replicated surface on a major surface of a foam composition are described in detail in co-owned PCT Publication Nos. WO 2019/064121 (Slama et al.) and WO 2019/064120 (Meree et al.).

As used herein, a "smooth" surface is a surface that is free of protrusions and depressions that deviate from the plane of the surface at an angle of 25 degrees or greater and/or have a difference in height of an average of 175 micrometers or greater. The foam composition can be bisected through the replicated structure and imaged (e.g., by scanning electron microscopy (SEM)), and measurements taken on the image to determine whether or not the opposing surface is smooth. First, an ideal line is added along the surface to be analyzed, then angle and height deviations are measured from the ideal line and the actual line of protrusion and/or depression.

Figure 8A:
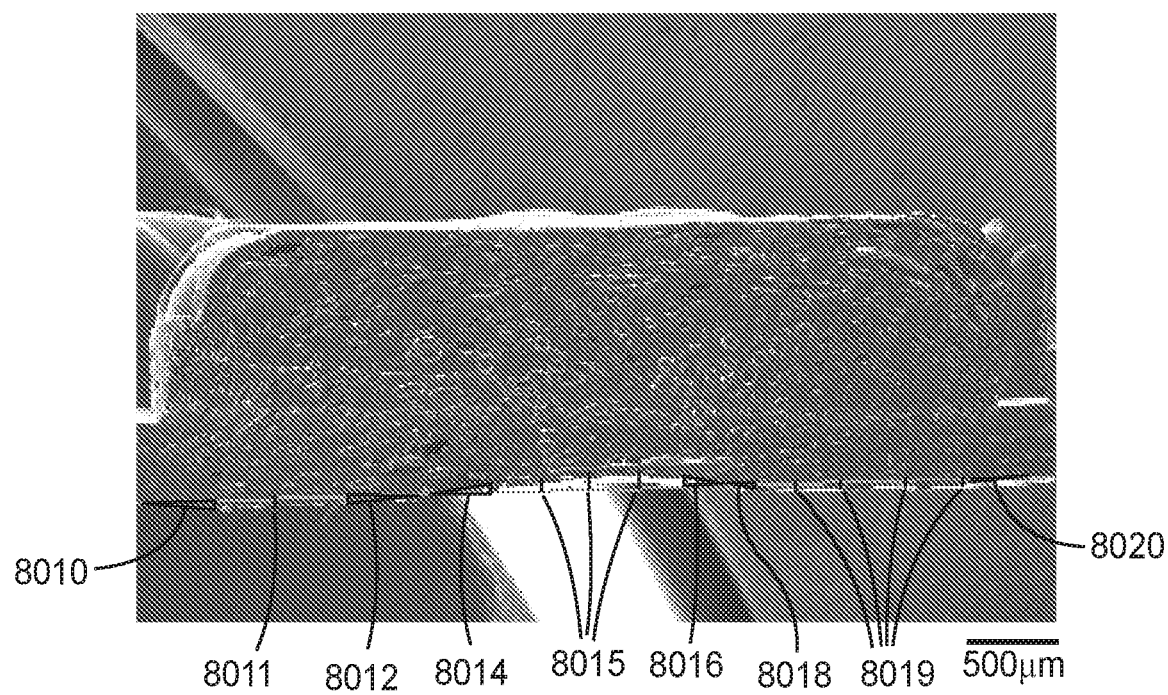
FIG. 8A is an SEM image of the foam composition of Example 23 extruded at a die temperature of 246° C., having a smooth major surface.

For instance, FIG. 8A shows a cross-section of the foam composition 8002 of Example 23 having a replicated major surface 8004, which was determined to have a smooth opposing major surface 8006. This is due to measuring an angle of 6 degrees at a first deviation 8010 (from ideal), an angle of 3.9 degrees at a second deviation 8012, and an average height of 18 micrometers over the length 8011 from the first deviation 8010 through the second deviation 8012; an angle of 6.3 degrees at a third deviation 8014, an angle of 11.6 degrees at a fourth deviation 8016, and an average height of 52 micrometers over the length 8015 from the third deviation 8014 through the fourth deviation 8016; an angle of 9.1 degrees at a fifth deviation 8018, an angle of 2.6 degrees at a sixth deviation 8020, and an average height of 21 micrometers over the length 8019 from the fifth deviation 8018 through the sixth deviation 8020. The three shallow, relatively flat deviations allow the opposing major surface 8006 to be considered smooth.

Figure 8B:
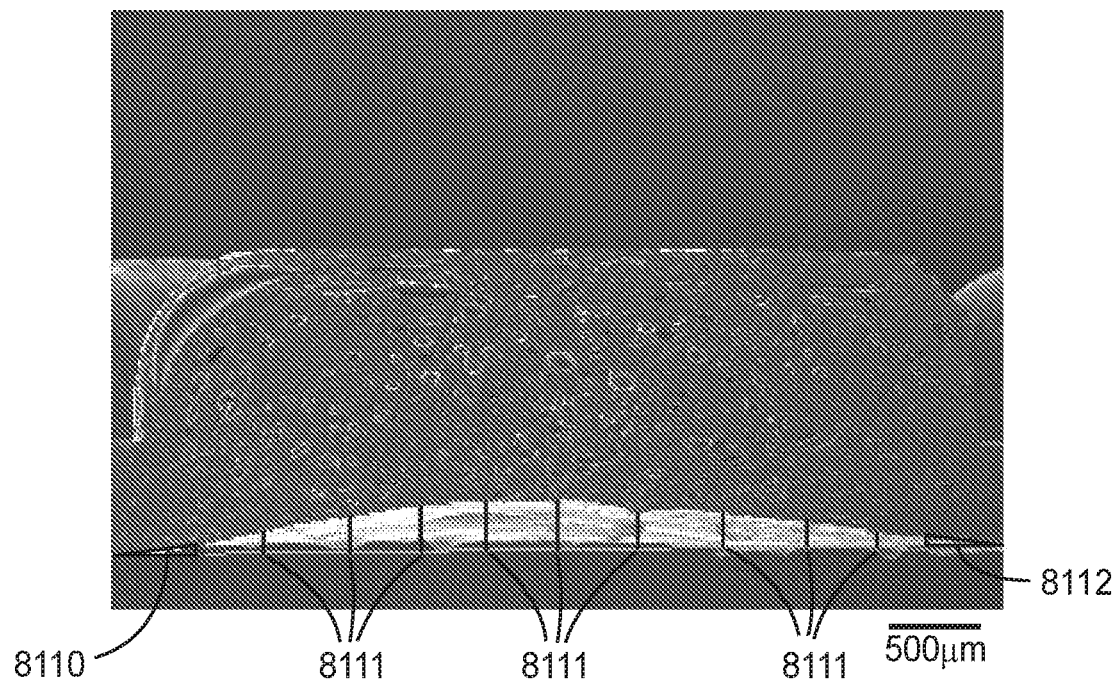
FIG. 8B is an SEM image of the foam composition of Example 22 extruded at a die temperature of 229° C., having a smooth major surface.
Figure 8C:
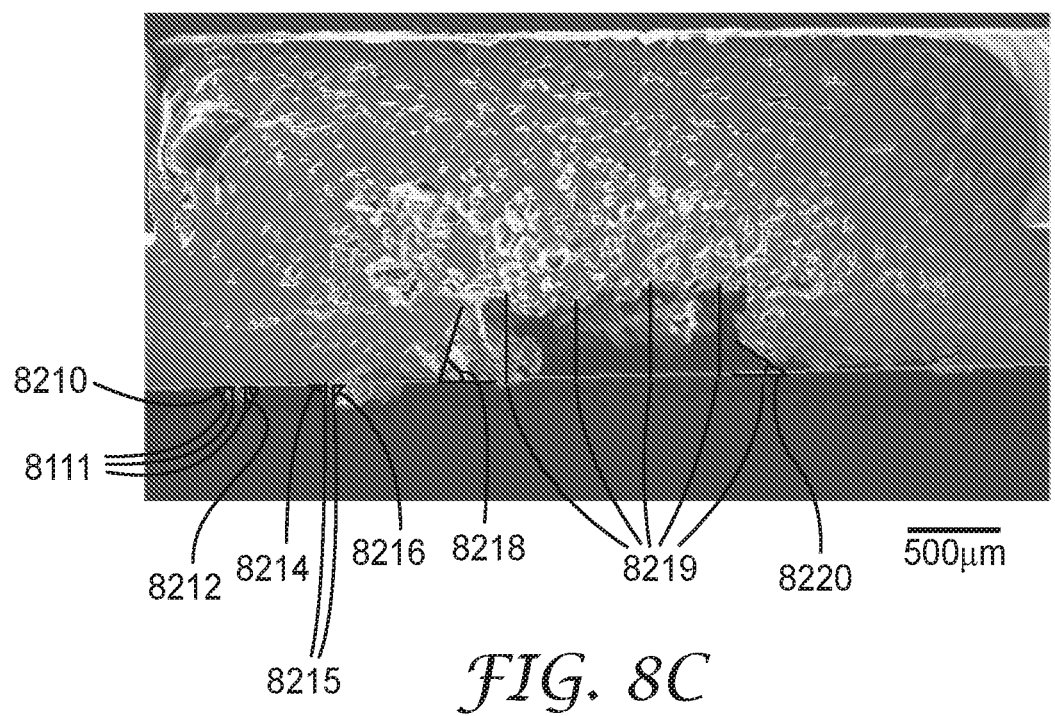
FIG. 8C is an SEM image of the foam composition of Comparative Example G extruded at a die temperature of 218° C., having a rough major surface.
Figure 9A:
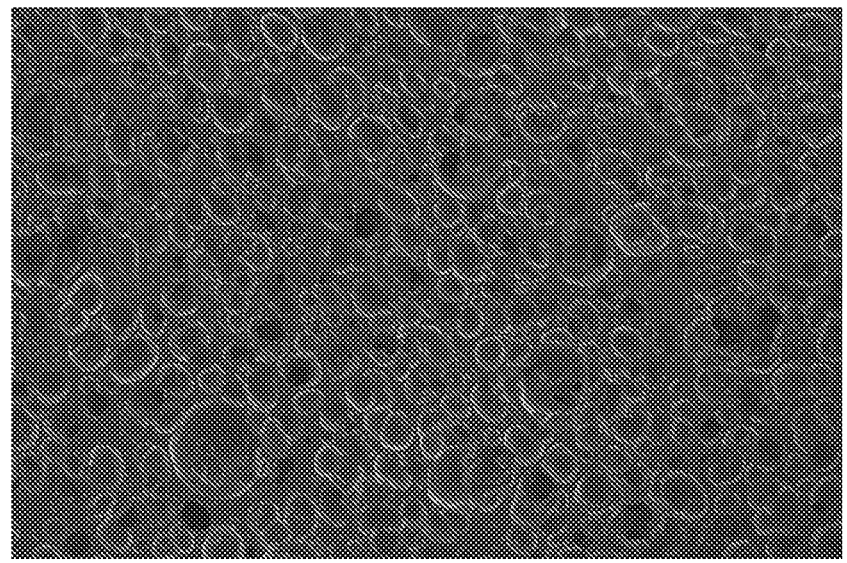
FIG. 9A is an SEM image of the foam composition of Example 25 foamed for 8 minutes at a temperature of 150° C.
Figure 9B:
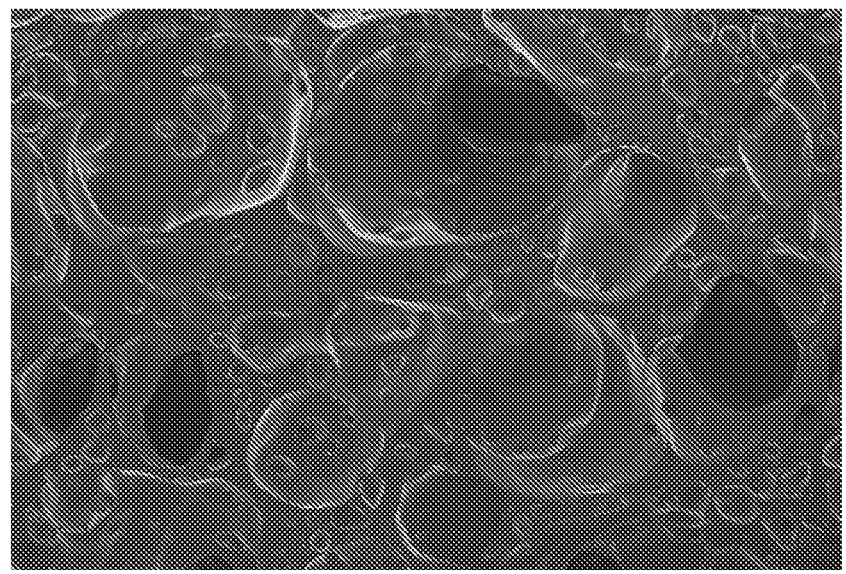
FIG. 9B is an SEM image of the foam composition of Comparative Example H foamed for 8 minutes at a temperature of 150° C.

Similarly, FIG. 8B shows a cross-section of the foam composition 8102 of Example 22 having a replicated major surface 8104, which was determined to have a smooth opposing major surface 8106. This is due to measuring an angle of 7.3 degrees at a first deviation 8110 (from ideal), an angle of 6.7 degrees at a second deviation 8112, and an average height of 145 micrometers over the length 8111 from the first deviation 8110 through the second deviation 8112. Although the foam composition 8102 has a deep depression, the topology changes gradually and allows the opposing major surface 8106 to be considered smooth. In contrast, FIG. 8C shows a cross-section of the foam composition 8202 of Comparative Example G having a replicated major surface 8204, which was determined to have a rough (e.g., not smooth) opposing major surface 8206. This is due to measuring an angle of 57.3 degrees at a first deviation 8210 (from ideal), an angle of 66.3 degrees at a second deviation 8212, and an average height of 73 micrometers over the length 8211 from the first deviation 8210 through the second deviation 8212; an angle of 17.4 degrees at a third deviation 8214, an angle of 66.3 degrees at a fourth deviation 8216, and an average height of 52 micrometers over the length 8215 from the third deviation 8214 through the fourth deviation 8216; and an angle of 33.3 degrees at a fifth deviation 8218, an angle of 72.2 degrees at a sixth deviation 8220, and an average height of 479 micrometers over the length 8219 from the fifth deviation 8218 through the sixth deviation 8220. The opposing major surface 8206 of the foam composition of Comparative Example G has a deep depression with jagged edges and as well as small jagged protrusions, and is not smooth.

Process of Making a Foam Composition

In a fourth aspect, a method of making a foam composition is provided. The method comprises a) compressing a mixture comprising: an uncrosslinked thermoplastic nitrogen-containing matrix material and a plurality of composite particles distributed in the uncrosslinked thermoplastic nitrogen-containing matrix material; and b) heating the compressed mixture, thereby forming the foam composition. The mixture exhibits an elastic modulus of 0.5 megaPascals (MPa) or greater. The plurality of composite particles each comprises a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle.

Optionally, the method further comprises casting the mixture into a replication mold while the heated mixture is forming the foam composition, thereby imparting a plurality of replicated features on a major surface of the foam composition.

In preparing a composition as described herein, the components (e.g., uncrosslinked thermoplastic matrix material, composite particles, and other optional components) are heated (e.g., subjected to a temperature ranging from 90° C.-220° C., inclusive) and thoroughly mixed using any suitable means known by those of ordinary skill in the art. For example, the composition may be mixed by use of a (e.g., Brabender) mixer, extruder, kneader or the like.

In certain embodiments, the mixture may be prepared into the form of pellets, such as by extruding and pelletizing at least a portion of the mixture. One advantage to the mixture comprising a plurality of pellets is a greater ease of handling the mixture than certain alternate forms of mixtures.

Upon heating the mixture, the chemical blowing agent of the composite particle assists in generating voids to form the foam composition. In some embodiments, more than one blowing agent may be used in certain foam compositions, and in addition to the composite particles, the blowing agent may comprise an unencapsulated chemical blowing agent, an unencapsulated physical blowing agent, expandable microspheres, or a combination thereof. Useful categories of blowing agents include, for instance, a volatile liquid, a gas, a chemical compound, and a plurality of expandable microspheres. Volatile liquid and gas blowing agents expand when heated and then tend to escape from the mixture, leaving voids behind, to form the foam composition. Chemical compound blowing agents decompose and at least a portion of the decomposition product(s) expand and then escape from the mixture, leaving voids behind. In some embodiments, the blowing agent comprises a plurality of expandable microspheres, which are described above.

Suitable unencapsulated chemical blowing agents include for instance and without limitation, an azo compound, a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isotaoic anhydride, or any combination thereof. Examples of suitable unencapsulated chemical blowing agents include for instance and without limitation, 1,1-azodicarboxamide, p-toluene sulfonyl hydrazide, p-toluenesulfonyl semicarbazide, and 5H-phenyl tetrazole. In some embodiments, preferred compounds include, for example, 1,1-azodicarbonamide, azodiisobutyro-nitrile, benzenesulfonhydrazide, and hydrazo dicarbonamide.

Various methods for preparing foam compositions are suitable for at least certain embodiments of the method. More particularly, the method may include compressing the mixture in a melt press and/or an extruder, and may include heating the compressed mixture in a mold, an oven, and/or an extruder. In certain embodiments, the mixture is compressed in an extruder, heated in an extruder, or both compressed and heated in an extruder. Typically, an extruder comprises at least a barrel, a neck tube, and a die. Some suitable single screw and twin screw extruders are described in the examples below. In select embodiments, the extruder is a multilayer extruder, through which one or more foam layers may be formed, e.g., using a multilayer die. In certain embodiments, the compressed mixture is heated at ambient pressure. The compressed mixture is heated, typically by subjection to a temperature of 40° C. or greater, 50° C., 60° C., 75° C., 90° C., 100° C., 120° C., 130° C., 140° C., 150° C., 160° C., 170° C., or 180° C. or greater; and 500° C. or less, 475° C., 450° C., 425° C., 400° C., 375° C., 350° C., 325° C., 300° C., 275° C., 250° C., 230° C., 210° C., 200° C., 190° C., 180° C.; such as ranging from 40° C. to 475° C., 40° C. to 350° C., 140° C. to 310° C., or 180° C. to 300° C., inclusive.

Optionally, the mixture further comprises at least one physical blowing agent, such as a volatile liquid and/or expandable microspheres.

Articles

Figure 4A:
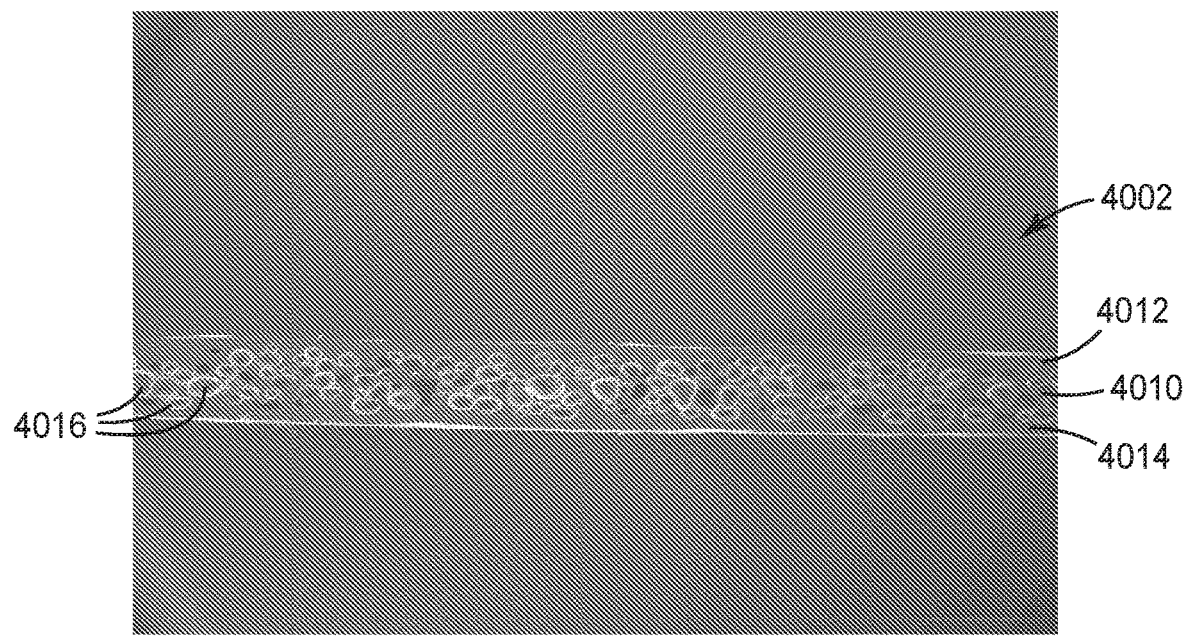
FIG. 4A is an SEM image of the multilayer composite of Example 20, wherein the slice was taken in the transverse direction.

In a third aspect, an article is provided. The article includes the foam composition according to the second aspect (e.g., closed cell foam) described in detail above. In some embodiments, the article is a multilayer article and the foam composition is a layer of foam disposed in between a layer of a second material and a layer of a third material. For instance, FIG. 4A shows an SEM image of a three-layer article 4002 according to Example 20, sliced in the transverse direction, the article having a core foam layer 4010, a top (non-foam) layer 4012 and a bottom (non-foam) layer 4014. Similarly, FIG. 4B shows an SEM image of the three-layer article 4002 according to Example 20, sliced in the machine direction, the article having a core foam layer 4010, a top (non-foam) layer 4012 and a bottom (non-foam) layer 4014. In this example, the closed foam cells 4016 are a little more elongated when viewed from the machine direction than from the transverse direction. Optionally, one or more of the second material or third material in a multilayer article is also a foam material.

An article including a foam composition attached to a substrate provides for use of the foam composition in cushioning or polishing applications, for instance.

When the article is a monolithic sheet, the thickness of the sheet is typically at least 25, 50, 100 micrometers (μm) (4 mils), or at least 500 μm (20 mils) in thickness. In some embodiments, the thickness of the article is no greater than 10 mm, 5 mm, 2 mm, 400 μm, 300 μm, or 200 μm.

Exemplary uses of foam compositions (e.g., polymeric foam layers) described herein include vibration damping and polishing applications (e.g., polishing pads useful in chemical mechanical planarization (CMP)). In an eighth aspect, a polishing pad is provided.

Further to CMP polishing applications, the polishing pad thickness may coincide with the required thickness to enable polishing on the appropriate polishing tool. In some embodiments, the polishing pad thickness is greater than 125 (in some embodiments, greater than 150, 200 or even greater than 500; in some, less than 40,000, 30,000, 20,000, 15,000, 10,000, 5,000 or even less than 2,500) micrometers. The polishing pad may be in any of a variety of shapes (e.g., circular, square, or hexagonal). The pads may be fabricated such that the pad shape coincides with the shape of the corresponding platen of the polishing tool the pad will be attached to during use. The maximum dimension of the pad (e.g., the diameter for a circular shaped pad) can be as desired for a particular application. In some embodiments, the maximum dimension of a pad is at least 10 cm (in some embodiments, at least 20 cm, 25 cm, 30 cm, 40 cm, 50 cm, or even, at least 60 cm; in some embodiments, less than 2 meters, 1.5 meter, or even less than 1 meter).

In some polishing pad embodiments, the foam features extend from or into the first major surface by at least 100 micrometers (in some embodiments, at least 200 micrometers or even by at least 300 micrometers; in some embodiments, up to 20,000 micrometers, 15,000 micrometers, 10,000 micrometers or even up to 5,000 micrometers).

A foam composition layer of the polishing pad may further include at least one channel, wherein the channel has a depth greater than the distance the foam features extend from or into the first major surface. In some embodiments, the foam composition of the polishing pad may further include at least a plurality of channels, wherein at least a portion of the plurality of channels has a depth greater than the distance the foam features extend from or into the first major surface. The at least one channel may provide improved polishing solution distribution, foam composition flexibility, as well as facilitate swarf removal from the polishing pad. In some embodiments, the channels do not allow fluid to be contained indefinitely within the channel (i.e., fluid can flow out of the channel during use of the pad).

In some embodiment, the width of the at least one channel is at least 10 (in some embodiments, at least 25, 50, 75, or even at least 100; in some embodiments less than 20,000, 10,000, 5,000, 2,000, 1,000, 500, or even less than 200) micrometers. In some embodiments, the depth of the at least one channel is at least 125 (in some embodiments, at least 200, 300, 400, 500, 600, 700, 800, 900, 1,000, 1500, or even at least 2,000; in some embodiments, less than 25,000, 20,000, 15,000, 10,000, 8,000, 5,000, 3,000, or even less than 1,000) micrometers.

The channels may be formed into the polishing layer by any known techniques in the art including, but not limited to, machining, embossing and molding. The channels may be formed during the formation of the foam composition and/or by the same process used to form the foam composition layer. Due to improved surface finish on the first major surface of the polishing foam layer (which helps minimize substrate defects (e.g., scratches during use)), embossing and molding may be preferred. In some embodiments, the channels extending from or into the first major surface of the foam composition layer are fabricated in the molding process used to form the foam features. This is achieved by forming their negative (i.e., raised regions) in the tool roll, with the channels themselves then being formed in the foam composition during molding. This is of particular advantage, as the foam features extending from or into the first major surface of the foam composition layer and the at least one channel may be fabricated into the polishing foam layer in a single process step, leading to cost and time savings. The channels can be fabricated to form various patterns known in the art (e.g., concentric rings, parallel lines, radial lines, a series of lines forming a grid array, herring bone, and spiral). Combinations of differing patterns may be used.

In yet another embodiment, the polishing pad of the present disclosure may include a subpad, wherein the subpad is adjacent to the second major surface of the foam composition layer. The polishing pad layers (e.g., polymeric foam layer and subpad, may be adhered together by any techniques known in the art (including using adhesives (e.g., pressure sensitive adhesives (PSAs), hot melt adhesives and cure in place adhesives)). In some embodiments, the polishing pad includes an adhesive layer adjacent to the second major surface of the foam composition layer. Use of a lamination process in conjunction with PSAs (e.g., PSA transfer tapes) is one particular process for adhering the polishing pad and subpad. The subpad may be any of those known in the art. The subpad may be a single layer of a substantially rigid material (e.g., polycarbonate) or a single layer of a substantially compressible material (e.g., an elastomeric foam). The subpad may also have at least two layers, and may include a substantially rigid layer (e.g., a stiff material or high modulus material (e.g., polycarbonate or polyester)) and a substantially compliant layer (e.g., an elastomer or an elastomeric foam material). If the subpad includes a substantially compliant layer (e.g., an elastomeric foam layer, the compliant layer may have a durometer in a range from 20 Shore D to 90 Shore D). In some embodiments, the compliant layer has a thickness in a range from 125 to 5,000 (in some embodiments, in a range from 125 to 1000) micrometers.

In some embodiments of polishing pads that include a subpad having at least one opaque layer, a small (e.g., 1 cm to 5 cm) hole may be cut into the subpad creating a "window". The hole may be cut through the entire subpad or only through at least one opaque layer. The cut portion of the subpad or at least one opaque layer is removed from the subpad, allowing light to be transmitted through this region. The hole is pre-positioned to align with the endpoint window of the polishing tool platen and facilitates the use of the wafer endpoint detection system of the polishing tool, by enabling light from the tool's endpoint detection system to travel through the polishing pad and contact the wafer. Light-based endpoint polishing detection systems are known in the art and are available, for example, under the trade designations "MIRRA" and "REFLEXION LK CMP" from Applied Materials, Inc., Santa Clara, CA Polishing pads described herein can be fabricated to run on such tools and endpoint detection windows, which are configured to function with the polishing tool's endpoint detection system, can be included in the polishing pad.

In some embodiments, a polishing pad described herein includes subpad laminated thereto. The subpad can include at least one rigid layer (e.g., polycarbonate) and at least one compliant layer (e.g., an elastomeric foam, the elastic modulus of the rigid layer being greater than the elastic modulus of the compliant layer). The rigid layer may be laminated to the second major surface of the foam composition layer, typically through the use of a PSA (e.g., transfer adhesive or tape). The compliant layer may be opaque and prevent light transmission required for endpoint detection. Prior to, or after lamination, a hole (e.g., up to 5 cm wide by 20 cm long) may be die cut, for example, by a standard kiss cutting method or cut by hand, in the opaque compliant layer of the subpad. The cut region of the compliant layer is removed creating a "window" in the polishing pad. If adhesive residue is present in the hole, it can be removed, for example, through the use, for example, of an appropriate solvent and/or wiping with a cloth. The "window" in the polishing pad is configured such that, when the polishing pad is mounted to the polishing tool platen, the window of the polishing pad aligns with the endpoint detection window of the polishing tool platen. The dimensions of the hole are generally the same or similar in dimension to the dimensions of the endpoint detection window of the platen.

The polishing pad, including any one of foam composition layers, the subpad and any combination thereof, may include a window (i.e., a region allowing light to pass through) to enable standard endpoint detection techniques used in polishing processes (e.g. wafer endpoint detection).

In a ninth aspect, the present disclosure also describes a polishing system comprising at least one polishing pad and at least one polishing solution. Suitable polishing solutions are known in the art. The polishing solutions may be aqueous or non-aqueous. An aqueous polishing solution has at least 50% by weight water. A non-aqueous solution has less than 50% by weight water. In some embodiments, the polishing solution is a slurry (i.e., a liquid that contains organic and/or inorganic abrasive particles). The concentration of organic and/or inorganic abrasive particles in the polishing solution is as desired. In some embodiments, the concentration of organic and/or inorganic abrasive particles in the polishing solution is at least 0.5% (in some embodiments, at least 1%, 2%, 3%, 4%, or even at least 5%; in some embodiments, less than 30%, 20%, 15%, or even less than 10%) by weight. In some embodiments, the polishing solution is substantially free of organic and/or inorganic abrasive particles. By "substantially free of organic or inorganic abrasive particles," it is meant that the polishing solution contains not greater than 0.5% (in some embodiments, not greater than 0.25%, 0.1%, or even not greater than 0.05%) by weight of organic and/or inorganic abrasive particles. In some embodiments, the polishing solution contain no organic and no inorganic abrasive particles. The polishing system may include polishing solutions (e.g., slurries, used for silicon oxide CMP (e.g., shallow trench isolation CMP), metal CMP (e.g., tungsten CMP, copper CMP, and aluminum CMP), barrier CMP (e.g., tantalum and tantalum nitride CMP), and hard substrates (e.g., sapphire). In some embodiments, the polishing system further comprises a substrate to be polished or abraded.

In a tenth aspect, the present disclosure also describes a method of polishing a substrate, the method comprising:
  providing a polishing pad described herein having a working surface;
  providing a substrate having a first surface;
  contacting the first working surface of the polishing pad with the first substrate surface; and
  moving the polishing pad and the substrate relative to one another while maintaining contact between the working surface of the polishing pad and the first substrate surface, wherein polishing is conducted in the presence of a polishing solution.

In some embodiments, the polishing solution is a slurry as previously described herein. In some embodiments, the substrate is a semiconductor wafer. Exemplary semiconductor wafers comprise at least one of a dielectric material, an electrically conductive material, a barrier and/or adhesion material or a cap material. Exemplary dielectric materials include an inorganic dielectric material (e.g., glass (e.g., silica glasses)) or an organic dielectric material. Exemplary electrically conductive materials include metals (e.g., at least one of copper, tungsten, aluminum, or silver). Exemplary cap materials include at least one of silicon carbide or silicon nitride. Exemplary barrier and/or adhesion materials include at least one of tantalum or tantalum nitride. The method of polishing may also include a pad conditioning or cleaning step, which may be conducted in-situ (i.e., during polishing). Pad conditioning may use any pad conditioner (e.g., a diamond pad conditioner), or brush known in the art and is available, for example, under the trade designations "3M CMP PAD CONDITIONER BRUSH PB33A" from the 3M Company, St. Paul, MN, and/or a water or solvent rinse of the polishing pad.

Various embodiments are provided that include foam compositions, articles, composite particles, polishing pads, polishing systems, and methods of making and using same.

Embodiment 1 is a composition. The composition includes an uncrosslinked thermoplastic nitrogen-containing matrix material and a plurality of composite particles distributed in the uncrosslinked thermoplastic nitrogen-containing matrix material. The composition exhibits an elastic modulus of 0.5 MPa or greater. The plurality of composite particles each includes a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 2 is the composition of embodiment 1, wherein the uncrosslinked thermoplastic nitrogen-containing matrix material comprises a polyamide, a polyurethane, a polyethyleneimine, a polyimide, a polyurea, a polyoxazoline, a polyiminothioether, a polyaminoamide, a polysulfonamide, or combinations thereof.

Embodiment 3 is the composition of embodiment 1 or embodiment 2, wherein the uncrosslinked thermoplastic nitrogen-containing matrix material includes a polyurethane.

Embodiment 4 is the composition of any of embodiments 1 to 3, where the uncrosslinked thermoplastic nitrogen-containing matrix materials includes a polyether-based thermoplastic polyurethane.

Embodiment 5 is the composition of any of embodiments 1 to 4, where the uncrosslinked thermoplastic nitrogen-containing matrix material includes a polyester-based thermoplastic polyurethane.

Embodiment 6 is the composition of any of embodiments 1 to 3, wherein the uncrosslinked thermoplastic nitrogen-containing matrix material includes a polyamide.

Embodiment 7 is the composition of any of embodiments 1 to 6, wherein the polyamide is acid-terminated.

Embodiment 8 is the composition of any of embodiments 1 to 6, wherein the polyamide is amine-terminated.

Embodiment 9 is the composition of any of embodiments 1 to 8, wherein the uncrosslinked thermoplastic nitrogen-containing matrix material exhibits a softening point of 40° C. to 220° C.

Embodiment 10 is the composition of any of embodiments 1 to 9, further including a crosslinking agent, a crosslink catalyst, or both.

Embodiment 11 is the composition of embodiment 10, wherein the crosslinking agent includes a multifunctional epoxide, a polyfunctional aziridine, a glycidyl epoxy resin, an isocyanate, a bismaleimide, a multifunctional acrylate, a cycloaliphatic epoxy resin, or a polycarbodiimide.

Embodiment 12 is the composition of embodiment 10 or embodiment 11, wherein the crosslink catalyst includes an alkyl or alkenyl ammonium, phosphonium, or imidazolium salt.

Embodiment 13 is the composition of any of embodiments 1 to 12, wherein the uncrosslinked thermoplastic nitrogen-containing matrix material exhibits a modulus of 0.5 megapascals (MPa) to 5,000 MPa or 0.05 to 2,000 MPa.

Embodiment 14 is the composition of any of embodiments 1 to 13, further including a crystallization nucleating agent, an antiblock additive, a cell stabilizer, a surfactant, or a combination thereof.

Embodiment 15 is the composition of any of embodiments 1 to 14, wherein the plurality of composite particles is present in an amount of 0.1 to 20 wt. %, 0.5 to 15 wt. %, 0.5 wt. % to 10 wt. %, 1 to 8 wt. %, or 10 to 17 wt. %, inclusive, of the total composition.

Embodiment 16 is the composition of any of embodiments 1 to 15, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

Embodiment 17 is the composition of any of embodiments 1 to 16, wherein the chemical blowing agent is 1,1-azodicarboxamide, a hydrazide-based chemical blowing agent-, p-toluenesulfonyl semicarbazide or 5H-phenyl tetrazole.

Embodiment 18 is the composition of any of embodiments 1 to 17, wherein the chemical blowing agent is 1,1-azodicarboxamide.

Embodiment 19 is the composition of any of embodiments 1 to 18, wherein the chemical blowing agent is p-toluene sulfonyl hydrazide.

Embodiment 20 is the composition of any of embodiments 1 to 19, wherein the chemical blowing agent is 5H-phenyl tetrazole.

Embodiment 21 is the composition of any of embodiments 1 to 20, wherein the chemical blowing agent is p-toluenesulfonyl semicarbazide.

Embodiment 22 is the composition of any of embodiments 1 to 21, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a ($C_1$-$C_3$)alkyl cellulose, a hydroxyl ($C_1$-$C_3$)alkylcellulose, carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 23 is the composition of any of embodiments 1 to 22, wherein the uncrosslinked thermoplastic material is selected from hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof.

Embodiment 24 is the composition of any of embodiments 1 to 23, wherein the uncrosslinked thermoplastic material is selected from hydroxypropyl starch, PVP, a polyamide, a styrenic copolymer, or a combination thereof.

Embodiment 25 is the composition of any of embodiments 1 to 24, wherein the uncrosslinked thermoplastic material includes hydroxypropyl starch.

Embodiment 26 is the composition of any of embodiments 1 to 25, wherein the uncrosslinked thermoplastic material exhibits a complex viscosity of 5,000 Pa·s or greater or 6,000 Pa·s or greater at a decomposition temperature of the chemical blowing agent particle.

Embodiment 27 is the composition of any of embodiments 1 to 26, wherein the plurality of composite particles has an average diameter of 1 to 60 micrometers, inclusive.

Embodiment 28 is the composition of any of embodiments 1 to 27, wherein the plurality of composite particles further includes a co-encapsulated metal oxide or metal salt, or mixtures thereof.

Embodiment 29 is the composition of embodiment 28, wherein the metal oxide is selected from zinc oxide, calcium oxide, and barium-cadmium complex; and the metal salts are of the form MX or M(X)$_2$, wherein M is selected from zinc, calcium, cadmium, potassium, barium, strontium, magnesium, mercury, titanium, tin, lead, sodium, lithium, or cesium, and wherein X is an organic ligand or an inorganic ligand containing a nitrate, phosphate, phosphite, sulfate, carbonate, oxalic acid, halide, para-toluenesulfonate, tetrafluoroborate, perchlorate, hydroxide, or cyanide moiety, or the corresponding hydrates.

Embodiment 30 is the composition of embodiment 28 or embodiment 29, wherein the metal salt is zinc stearate, zinc nitrate, zinc sulfate, zinc phosphate, zinc chloride, zinc bromide, zinc iodide, zinc fluoride, zinc carbonate, zinc p-toluenesulfonate hydrate, zinc tetrafluoroborate hydrate, zinc perchlorate, zinc hydroxide, zinc cyanide, calcium nitrate, calcium sulfate, calcium phosphate, calcium carbonate, barium phosphate, barium nitrate, barium sulfate, cadmium phosphate, cadmium nitrate, cadmium sulfate, calcium stearate, barium-cadmium stearate, zinc 2-ethyl hexanoate, calcium 2-ethyl hexanoate, barium-cadmium 2-ethyl hexanoate, zinc acetate, calcium acetate, zinc malonate, calcium malonate, zinc benzoate, calcium benzoate, zinc salicylate, calcium salicylate, cadmium bromide, cadmium carbonate, cadmium chloride, cadmium iodide, or cadmium perchlorate.

Embodiment 31 is the composition of any of embodiments 28 to 30, wherein the metal oxide, the metal salt, or combinations thereof, is present in an amount of 500 wt. % or less of the amount of the chemical blowing agent, 300 wt. % or less, 100 wt. % or less, or 25 wt. % or less of the amount of the chemical blowing agent.

Embodiment 32 is the composition of any of embodiments 28 to 31, wherein the chemical blowing agent is 1,1-azodicarboxamide or p-toluene sulfonyl hydrazide.

Embodiment 33 is the composition of any of embodiments 28 to 32, wherein the plurality of composite particles further includes a co-encapsulated polyhydroxyl compound, an amine containing compound, or a carboxylic acid containing compound.

Embodiment 34 is the composition of embodiment 33, wherein the polyhydroxyl compound is selected from glycerol, ethylene glycol, diethylene glycol, triethylene glycol, or combinations thereof.

Embodiment 35 is the composition of embodiment 33 or embodiment 34, wherein the carboxylic acid containing compound is selected from stearic acid, 2-ethylhexanoic acid, acetic acid, palmitic acid, or combinations thereof.

Embodiment 36 is the composition of any of embodiments 33 to 35, wherein the amine containing compound is a primary amine.

Embodiment 37 is the composition of any of embodiments 33 to 36, wherein the chemical blowing agent is p-toluene sulfonyl hydrazide.

Embodiment 38 is a foam composition. The foam composition includes a closed cell foam thermoplastic nitrogen-containing matrix material and an uncrosslinked thermoplastic material distributed in the closed cell foam thermoplastic nitrogen-containing matrix material.

Embodiment 39 is the foam composition of embodiment 38, wherein the uncrosslinked thermoplastic material is present as a plurality of particulates.

Embodiment 40 is the foam composition of embodiment 38 or embodiment 39, further including a plurality of composite particles distributed in the closed cell foam thermoplastic nitrogen-containing matrix material. The plurality of composite particles each includes a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 41 is the foam composition of embodiment 38 or embodiment 40, wherein the uncrosslinked thermoplastic material is present as a blend with the closed cell foam thermoplastic nitrogen-containing matrix material.

Embodiment 42 is the foam composition of any of embodiments 38 to 41, wherein an outer major surface of the foam composition has a continuous surface.

Embodiment 43 is the foam composition of any of embodiments 38 to 42, wherein the foam composition comprises a smooth major surface and an opposing major surface comprising replicated features.

Embodiment 44 is the foam composition of any of embodiments 38 to 43, having 90% or greater closed cells, 95% or greater, or 98% or greater closed cells.

Embodiment 45 is the foam composition of any of embodiments 38 to 44, having an average cell size of 250 micrometers or less, 150 micrometers or less, 120 micrometers or less, 100 micrometers or less, 80 micrometers or less, or 60 micrometers or less.

Embodiment 46 is the foam composition of any of embodiments 38 to 45, having an average cell size of 30 micrometers to 65 micrometers.

Embodiment 47 is the foam composition of any of embodiments 38 to 44, having an average cell size of 250 micrometers to 1 millimeter.

Embodiment 48 is the foam composition of any of embodiments 38 to 47, wherein the thermoplastic nitrogen-containing matrix material includes a polyamide, a polyurethane, a polyetherimine, a polyimide, a poly(ester)amide, a polyetherimide, a polyurea, a polyoxazoline, a polyiminothioether, a polyaminoamide, a polysulfonamide, a poly(amide-imide), or combinations thereof.

Embodiment 49 is the foam composition of any of embodiments 38 to 48, wherein the thermoplastic nitrogen-containing matrix material includes a polyurethane.

Embodiment 50 is the foam composition of any of embodiments 38 to 49, wherein the thermoplastic nitrogen-containing matrix material includes a polyamide.

Embodiment 51 is the foam composition of any of embodiments 38 to 50, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a ($C_1$-$C_3$) alkyl cellulose, a hydroxyl ($C_1$-$C_3$)alkylcellulose, carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 52 is the foam composition of any of embodiments 38 to 51, wherein the uncrosslinked thermoplastic material is selected from hydroxypropyl starch and PVP.

Embodiment 53 is the foam composition of any of embodiments 38 to 52, wherein the foam composition has a cell density of 1 to 1,000 cells per square millimeter (cells/mm$^2$) or 4 to 500 cells/mm$^2$.

Embodiment 54 is an article. The article includes the foam composition of any of claims 38 to 53 attached to a substrate.

Embodiment 55 is the article of embodiment 54, wherein the article is a multilayer article and the foam composition is a layer of foam disposed in between a layer of a second material and a layer of a third material.

Embodiment 56 is the article of embodiment 55, wherein at least one of the second material and the third material includes a foam material.

Embodiment 57 is the article of any of embodiments 54 to 56, wherein at least one major surface includes a plurality of replicated features.

Embodiment 58 is a method of making a foam composition of any of embodiments 38 to 52. The method includes a) compressing a mixture; and b) heating the compressed mixture, thereby forming the foam composition. The mixture includes an uncrosslinked thermoplastic nitrogen-containing matrix material and a plurality of composite particles distributed in the uncrosslinked thermoplastic nitrogen-containing matrix material. The mixture exhibits an elastic modulus of 0.5 MPa or greater. The plurality of composite particles each includes a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 59 is the method of embodiment 58, wherein the mixture is compressed in a melt press.

Embodiment 60 is the method of embodiment 58 or embodiment 59, wherein the compressed mixture is heated in a mold.

Embodiment 61 is the method of any of embodiments 58 to 60, wherein the compressed mixture is heated in an oven.

Embodiment 62 is the method of any of embodiments 58 to 61, wherein the compressed mixture is heated at ambient pressure.

Embodiment 63 is the method of any of embodiments 58 to 62, wherein the mixture is compressed in an extruder.

Embodiment 64 is the method of any of embodiments 58 or 63, wherein the compressed mixture is heated in an extruder.

Embodiment 65 is the method of embodiment 63 or embodiment 64, wherein the extruder is a multilayer extruder.

Embodiment 66 is the method of any of embodiments 63 to 65, further including casting the mixture into a replication mold while the heated mixture is forming the foam composition, thereby imparting a plurality of replicated features on a major surface of the foam composition.

Embodiment 67 is the method of any of embodiments 58 to 66, wherein the compressed mixture is heated at a temperature ranging from 40° C. to 350° C.

Embodiment 68 is the method of any of embodiments 58 to 67, wherein the compressed mixture is heated at a temperature ranging from 140° C. to 310° C.

Embodiment 69 is the method of any of embodiments 58 to 68, wherein the compressed mixture is heated at a temperature ranging from 140° C. to 305° C.

Embodiment 70 is a composite particle. The composite particle includes a chemical blowing agent particle encapsulated within a shell including an uncrosslinked thermoplastic material; and a co-encapsulated metal salt. The metal salt is of the form MX or M(X)$_2$, wherein M is zinc, calcium, cadmium, potassium, barium, strontium, magnesium, mercury, titanium, tin, lead, sodium, lithium, or cesium, and wherein X is an organic ligand or an inorganic ligand containing a nitrate, phosphate, phosphite, sulfate carbonate, oxalic acid, halide, para-toluenesulfonate, tetrafluoroborate, perchlorate, hydroxide, or cyanide moiety, or the corresponding hydrates. The uncrosslinked thermoplastic material exhibits a complex viscosity of 3,700 Pascal seconds (Pa·s) or greater at a decomposition temperature of the chemical blowing agent particle.

Embodiment 71 is the composite particle of embodiment 70, wherein the metal salt includes zinc nitrate, zinc sulfate, zinc phosphate, zinc chloride, zinc carbonate, zinc p-toluenesulfonate hydrate, zinc tetrafluoroborate hydrate, zinc perchlorate, zinc hydroxide, zinc cyanide, calcium nitrate, calcium sulfate, calcium phosphate, calcium carbonate, barium phosphate, barium nitrate, barium sulfate, cadmium phosphate, cadmium nitrate, cadmium sulfate, or combinations thereof.

Embodiment 72 is the composite particle of embodiment 70 or embodiment 71, wherein the metal salt includes zinc nitrate, zinc sulfate, or zinc chloride.

Embodiment 73 is a composition. The composition includes an uncrosslinked thermoplastic matrix material and a plurality of the composite particles of any embodiments 70 to 72 distributed in the uncrosslinked thermoplastic matrix material.

Embodiment 74 is the composition of claim 73, wherein the uncrosslinked thermoplastic matrix material is selected from a polyorganosiloxane, a styrenic block copolymer, a styrenic polymer, a polystyrene, a polyolefin, a polyolefin copolymer, polyvinyl chloride (PVC), ethylene vinyl acetate, polyacrylate, polymethacrylate, an acrylate copolymer, and an acrylic block copolymer.

Embodiment 75 is the composition of embodiment 73, wherein the uncrosslinked thermoplastic matrix material includes a polylactic acid (PLA). The composition further includes a polymer having a $T_g$ of 25 degrees Celsius or greater; a crosslinking agent; and a crosslink catalyst.

Embodiment 76 is a foam composition. The foam composition includes a closed cell foam thermoplastic matrix material and a plurality of the composite particles of any embodiments 70 to 72 distributed in the closed cell foam thermoplastic matrix material.

Embodiment 77 is the foam composition of embodiment 76, wherein the uncrosslinked thermoplastic matrix material is selected from a polyorganosiloxane, a styrenic block copolymer, a polystyrene, a polyolefin, a polyolefin copolymer, polyvinyl chloride (PVC), ethylene vinyl acetate, polyacrylate, polymethacrylate, an acrylate copolymer, and an acrylic block copolymer.

Embodiment 78 is the foam composition of embodiment 76, wherein the uncrosslinked thermoplastic matrix material includes a polylactic acid (PLA). The foam composition further includes a polymer having a $T_g$ of 25 degrees Celsius or greater; a crosslinking agent; and a crosslink catalyst.

Embodiment 79 is a polishing pad. The polishing pad includes a foam composition of any embodiments 38 to 53 or 76 to 78.

Embodiment 80 is the polishing pad of embodiment 79, wherein the foam composition further includes at least one channel, wherein the channel has a depth greater than the distance the foam features extend from or into the first major surface.

Embodiment 81 is the polishing pad of embodiment 79 or 80, further including a subpad, wherein the subpad is adjacent to the second major surface of the foam composition.

Embodiment 82 is the polishing pad of any of embodiments 79 to 81, having foam features extending at least one of from or into the first major surface (in some embodiments, in a range from 100 micrometers to 20,000 micrometers).

Embodiment 83 is the polishing pad of embodiment 82, wherein the foam composition includes foam features extending from the first major surface.

Embodiment 84 is a polishing system. The polishing system includes the polishing pad of any of embodiments 79 to 83 and a polishing solution.

Embodiment 85 is the polishing system of embodiment 84, wherein the polishing solution is a slurry.

Embodiment 86 is a method of polishing a substrate. The method includes providing a polishing pad of any of embodiments 79 to 83 having a working surface; providing a substrate having a first surface; contacting the working surface of the polishing pad with the first substrate surface; and moving the polishing pad and the substrate relative to one another while maintaining contact between the working surface of the polishing pad and the first substrate surface. Polishing is conducted in the presence of a polishing solution.

Embodiment 87 is the method of polishing a substrate of embodiment 86, wherein the substrate is a semiconductor wafer.

The following Examples are set forth to describe additional features and embodiments of the invention. All parts are by weight unless otherwise indicated.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise noted or readily apparent from the context, all parts, percentages, ratios, etc. in the Examples and the rest of the specification are by weight.

Materials Used in the Examples

| Abbreviation | Description and Source |
|---|---|
| Azo | 1,1'-azodicarboxamide, a chemical blowing agent from Sigma Aldrich (St. Louis, MO). |
| Azo-10/90 | 1,1'-azodicarboxamide encapsulated in hydroxypropyl starch (LRS780), prepared as described in Preparative Example 5 (PE-5). Relative composition was 10% azodicarboxamide core and 90% hydroxypropyl starch shell. |
| Azo-30/70 | 1,1'-azodicarboxamide encapsulated in hydroxypropyl starch (LRS780), prepared as described in Preparative Example 2 (PE-2). Relative composition was 30% azodicarboxamide core and 70% hydroxypropyl starch shell. |
| Azo-50/50 | 1,1'-azodicarboxamide encapsulated in PVP, prepared as described in Preparative Example 3 (PE-3). Relative composition was 50% azodicarboxamide core and 50% PVP shell. |
| 5PT | 5-phenyltetrazole, a chemical blowing agent from TCI America (Portland, OR). |
| 5PT-5/95 | 5-phenyltetrazole encapsulated in hydroxypropyl starch (LRS780), prepared as described in Preparative Example 4 (PE-4). Relative composition was 5% 5-phenyltetrazole core and 95% hydroxypropyl starch shell. |

| Abbreviation | Description and Source |
|---|---|
| PTSC | p-toluene semicarbazide, a chemical blowing agent from Alfa Aesar (Ward Hill, MA). |
| LRS780 | LYCOAT RS780, hydroxypropyl starch, a shell material from Roquette Frères (Keokuk, IA). |
| PVP | Polyvinyl pyrrolidone k30, a shell material from TCI America (Portland, OR) with an average molecular weight of 40,000 |
| E58144 | A polyether-type thermoplastic polyurethane reported to have a glass transition temperature of −40° C. and a Vicat softening point of 102° C., obtained under the trade designation ESTANE 58144 from the Lubrizol Corporation (Brecksville, OH). |
| E58277 | A polyester-based thermoplastic polyurethane reported to have a melting transition temperature of 130° C., obtained under the trade designation ESTANE 58277 from the Lubrizol Corporation. |
| I101 | An engineering polyurethane thermoplastic resin reported to have a Vicat temperature of 89° C., obtained under the trade designation ISOPLAST 101 EPT from the Lubrizol Corporation. |
| P85A | An aromatic polyether-based thermoplastic polyurethane reported to haveh a glass transition temperature of −50° C. and a melting transition temperature of 135° C., obtained under the trade designation PELLETHANE 5862-85A from the Lubrizol Corporation. |
| EVA | An ethylene vinyl acetate copolymer, 28% vinyl acetate by weight reported to have a melting transition temperature of 75° C. and a Vicat temperature of 46° C., obtained under the trade designation ELVAX 260 from DuPont Company (Wilmington, DE). |
| D1340 | A styrene-isoprene-styrene (SIS) 5 to 8 arm star block copolymer obtained from Kraton (Houston, TX). |
| D1119 | A clear, linear triblock copolymer SIS with a styrene content of 22% obtained from Kraton. |
| I4032D PLA | Semicrystalline polylactic acid (PLA) (2 wt. % D-lactide; weight average molecular weight ≈200,000 g/mol); obtained under the trade designation INGEO 4032D obtained from Natureworks, LLC (Minnetonka, MN). |
| I4060 PLA | Amorphous polylactic acid (PLA) obtained under the trade designation INGEO 4060 obtained from Natureworks, LLC. |
| VK70 PVAc | Polyvinyl acetate (PVAc) ($T_g$ = 42° C.; weight average molecular weight ≈400,000 g/mol); obtained under the trade designation VINAVIL K70 from Vinavil (Milan, Italy). |
| CA4 Plasticizer | Acetyl tributyl citrate, a plasticizer obtained under the trade designation CITROFLEX A4 obtained from Vertellus Performance Materials (Bayonne, NJ). |
| ECO Nuc. Agent | Zinc phenylphosphonate, a crystallization nucleation agent obtained under the trade designation ECOPROMOTE obtained from Nissan Chemical Industrials, Ltd (Tokyo, Japan). |
| S511 | Slip/antiblock additive in PLA masterbatch obtained under the trade designation SUKANO S511 obtained from Sukano (Schindellegi, Switzerland). |
| DSSI | Dimethyl sodium sulfonate isophthalate, obtained from TCI America. |
| HMD | Hexamethylene diamine, obtained from Alfa Aesar (Tewksbury, MA) |
| Piperazine | Piperazine, obtained from Alfa Aesar (Tewksbury, MA) |
| ED | Ethylene diamine, obtained from Alfa Aesar (Tewksbury, MA) |
| SA | Sebacic acid, obtained from Alfa Aesar (Tewksbury, MA) |
| TMDP | 4,4'-Trimethylenedipiperidine, obtained from Sigma-Aldrich, St. Louis, MO |
| J4370 | An epoxidized styrene-acrylate copolymer, 6,800 g/mol, glass transition temperature of 54° C., epoxy equivalence weight of 285, a crosslinking agent obtained under the trade designation JONCRYL 4370-F from BASF (Ludwigshafen, Germany). |
| J4368 | An epoxidized styrene-acrylate copolymer, 6,800 g/mol, glass transition temperature of 54° C., epoxy equivalence weight of 285, a crosslinking agent obtained under the trade designation JONCRYL 4368-C from BASF. |
| DCP | Dicumyl peroxide, a crosslinking agent obtained from Sigma Aldrich. |
| DTMAB | Dodecyl trimethylammonium bromide, a crosslinking catalyst from TCI America. |
| TOAB | Tetraoctylammonium bromide, a crosslinking catalyst from Alfa Aesar. |
| TBAI | Tetrabutylammonium iodide, a crosslinking catalyst from Eastman Kodak (Rochester, NY). |
| P1013 | PRIPOL 1013, a dimer fatty acid blend from Croda, Inc (Edison, NJ). |
| J-ED2003 | A polyetherdiamine derived from a propylene oxide capped poly(ethylene glycol) with an approximate molecular weight of 2000 obtained under the trade designation JEFFAMINE ED-2003 from Huntsman Corp (The Woodlands, TX). |
| J-ED600 | A polyetherdiamine derived from a propylene oxide capped poly(ethylene glycol) with an approximate molecular weight of 600 obtained under the trade designation JEFFAMINE ED-600 from Huntsman Corp. |
| ZN | Zinc nitrate hexahydrate, a chemical blowing agent activator from J.T. Baker (Center Valley, PA). |
| ZS | Zinc sulfate heptahydrate, a chemical blowing agent activator from EMD Millipore (Burlington, MA). |
| ZC | Zinc chloride, anhydrous, a chemical blowing agent activator from Alfa Aesar. |
| PN | Lead nitrate, a chemical blowing agent activator from Sigma Aldrich. |
| SO | Tin oxalate, a chemical blowing agent activator from Sigma Aldrich. |
| CN | Cadmium nitrate tetrahydrate, a chemical blowing agent activator from Sigma Aldrich. |
| CA | Cadmium acetate, a chemical blowing agent activator from Fisher Scientific (Waltham, MA). |

Test Methods

Scanning Electron Microscropy (SEM)

The cell structure of the foams was imaged by SEM using a JEOL JSM-6010LA SEM (JEOL Ltd., Tokyo, JP). Samples were prepared by using a #10 scalpel to cut thin strips of the foamed article. If the sample was prepared by extrusion, a slice was taken in both the machine direction (MD) and transverse direction (TD) of the foamed sheet. The slice was mounted on a JEOL SEM stage and sputter coated with Au/Pd for 30 seconds in a Denton Vacuum Desk V coating system (Denton Vacuum, LLC, Moorestown, NJ). The images were analyzed using Image-Pro Premier 9.1 or Image-Pro Premier 9.3 image analysis software (Media Cybernetics, Inc., Rockfille, MD) to obtain cell diameter, cell density (cells/mm$^2$), cell aspect ratio, and thicknesses of layers. Image-Pro Premier defines the cell aspect ratio as the ratio of the major and minor axis of an ellipse equivalent to the cell. Cells were defined by hand using the polygon tool. Foam and/or skin thickness were reported based on image analysis of the TD, unless otherwise noted.

Light Microscopy (LM)

Foams were imaged using a Keyence VHX-2000 light microscope (Keyence Corp., Itasca, IL) fitted with a Keyence VH-Z100 (100×-1000×) lens. Samples were prepared by cutting the web with a razor blade along the TD or MD of the web. The images were analyzed using Image-Pro Premier 9.1 or Image-Pro Premier 9.3 image analysis software (Media Cybernetics, Inc., Rockfille, MD) to obtain cell diameter, cell density (cells/millimeter$^2$), cell aspect ratio, and thicknesses of layers. Image-Pro Premier defines the cell aspect ratio as the ratio of the major and minor axis of an ellipse equivalent to the cell. Cells were defined by hand using the polygon tool. Foam and/or skin thickness were reported based on image analysis of the TD, unless otherwise noted.

Amine and Acid Number Quantification

About 4 grams of polyamide were dissolved in 100 milliliter (mL) toluene and 50 mL isopropyl alcohol (IPA) mixture, followed by titration with 0.1N TBAOH in methanol for Acid Content or 0.15N HCl in IPA for Amine Content. The analyses were performed via a potentiometric auto-titration system. All values are reported in milliequivalents per gram units.

Rheology (to Get Room Temperature Modulus for Polyamides)

A sample of polyamide weighing 0.50 g was loaded on a DHR-3 rheometer fitted with a 20-mm stainless steel parallel plate geometry as well as an EHP (electrically heated plate) temperature control accessory, available from TA Instruments (New Castle, DE). The sample was heated to a sufficient temperature to melt it (approximately 170-190° C.). After the sample had melted, the parallel plate geometry gap was set to 1000 micrometers and the excess molten polyamide was trimmed away. The sample was then cooled back to 25° C. over a period of approximately 60 minutes with the Axial Force Control feature enabled. When the sample attained 25° C., the rheology test was started with the following parameters:

| | |
|---|---|
| Geometry | 20 millimeters stainless steel parallel plate geometry |
| Temperature ramp parameters | 3° C./min from 25-250° C. |
| Strain target | 0.1% |
| Oscillatory Frequency | 1 Hertz |
| Axial force control parameters | 0.0 ± 0.2 Newtons in compression mode |
| Autostrain control parameters | 5.0-40000.0 micronewton-meter and 0.001-10% strain |

The storage modulus (G') numbers reported in the Materials table were the values measured at 25.0±0.2° C. under the temperature ramp conditions reported in the table above.

Thermogravimetry Analysis (TGA)

Quantification of the core-shell ratio of encapsulated chemical blowing agents was performed on a TGA Q500 (TA Instruments, New Castle, DE). The temperature was ramped at 10° C./minute from room temperature to 600° C.

Spray Drying to Produce Encapsulated Chemical Blowing Agents

A slurry of polymer and chemical blowing agent was dried with a customized Model 48 mixed flow spray dryer fabricated by Spray Drying Systems, Inc. (headquartered in Eldersburg, MD). The spray dryer is 4 foot (ft) (1.2 meter) in diameter and has 8 ft (2.4 meter) straight sides. Room air (approximately 21° C. and 50% humidity) was provided as the bulk drying gas, which was then heated via an electric heater and carried through the drying chamber (entered through the top and exited through the bottom) and finally to a cyclone and a baghouse before being exhausted. The cyclone separated the product solids from the gas stream (down to 1 micron in diameter); the solids were discarded. The drying gas flow rate was unknown and changed with temperature and inlet humidity, though it was provided with a 1 HP AirTech Inc. (Rutherford, NJ) blower (3450 RPM, 60 Hz, 230/460 V, 2.8/1.4 A). The bulk drying gas temperature at the chamber inlet was 72-86° C., while the outlet temperature was 66-50° C. The slurry was provided at 17 (±3) grams per minute (g/min) via a dual-hose 505DU peristaltic pump (Watson Marlow, Wilmington, MA) using a MASTERFLEX (Vernon Hills, IL) 96420 Platinum-cured silicone tubing line. The slurry was atomized vertically upward utilizing internally mixed two-fluid pressure spray atomizing nozzles (available from Spraying Systems Co. (Wheaton, IL) under the trade designations "FLUID CAP 2850" and "AIR CAP 1891125"). The atomizing gas was nitrogen (20 psi) (137.9 kilopascals (kPa)), provided at 3.35 (±0.1) standard cubic feet per minute (SCFM) (approximately 94.9 standard liters per minute).

PREPARATORY EXAMPLES

Preparative Example 1 (PE-1)

5 grams (g) of PTSC were added to a solution of 50 g LRS780 in 300 g water to give a 15.5 wt. % solids suspension. The suspension was further mixed with a high shear mixer (T50 digital Ultra Turrax, IKA) at 4000 RPM for 2 minutes (min) and then filtered through a 150 micrometer (μm) sieve. The polymer mixture was then spray dried using a Buchi Mini-Probe B-190 (Buchi Corporation, New Castle, DE) at a pump rate of 20% and an inlet temperature set at 160° C. (outlet temperature measurement of 75-80° C.). A free-flowing powder was obtained (at 32.7% yield). The resulting particles contained 7.1 wt. % PTSC as determined by TGA.

Preparative Example 2 (PE-2)

750 g of AZO powders were added to a solution of 1750 g of LRS780 in 10 kilograms (kg) of water to give a 20 wt. % solid suspension. The suspension was further mixed with a high shear mixer (T50 digital Ultra Turrax, IKA) at 2000 RPM for 5 min. This polymer mixture was then spray dried (using the Spray drying method described above) to put a polymer shell around the particles. 1701 g of free-flowing powders were obtained (at 68.0% yield). The resulting composite particles contained 30 wt. % of AZO.

Preparative Example 3 (PE-3)

1500 g of AZO powders were added to a solution of 1500 g PVP in 9000 g of water to give a 25 wt. % solid suspension. The suspension was further mixed with a high shear mixer (T50 digital Ultra Turrax, IKA) at 2000 RPM for 5 min. This polymer mixture was then spray dried (using the Spray drying method described above) to put a polymer shell around the particles. A free-flowing powder was obtained (at 78.0% yield). The resulting composite particles contained 50 wt. % of AZO.

Preparative Example 4 (PE-4)

500 grams (g) of PT were suspended in a solution of 2000 g LRS780 in 14.17 kilograms water to give a 15 wt. % solids suspension. The suspension was further mixed with a high shear mixer (T50 digital Ultra Turrax, IKA) at 2000 rpm for 5 min. This polymer mixture was then spray dried (using the Spray drying method described above) to put a polymer shell around the particles. 1021 g of free-flowing powders were obtained (at 40.8% yield). The resulting capsule contained 5.1 wt. % of PT.

Preparative Example 5 (PE-5)

278 grams (g) of AZO powders were added to a solution of 2.5 kilogram (kg) of LRS780 in 11.1 kg of water to give a 20 wt. % solid suspension. This polymer mixture was then spray dried to put a polymer shell around the particles using a Niro Mobil Minor lab spray-dryer fabricated by GEA Group AG (headquartered in Dusseldorf, Germany). The suspension was sprayed in portions. Each portion was mixed with a high shear mixer for 1-2 minutes and passed through a 425 μm screen immediately before entering the spray dryer. The bulk drying gas temperature was maintained between 90-92° C. at the outlet. The slurry was atomized vertically upward utilizing internally mixed two-fluid pressure spray atomizing nozzles (available from Spraying Systems Co. (Wheaton, IL) under the trade designations "FLUID CAP 60100" and "AIR CAP 120"). 1476 g of free-flowing powders were obtained (at 37% yield). The resulting composite particles contained 10 wt. % of AZO.

Preparative Example 6 (PE-6)

15 g of AZO powders were added to a solution of 30 g PVP and 30 g ZN in 90 g of water to give a 45 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 135° C. (outlet temperature measurement of 77-84° C.) to put a polymer shell around the particles. A free-flowing powder was obtained (at 40.9% yield). The resulting capsule contained 34 wt. % AZO.

Preparative Example 7 (PE-7)

15 g of AZO powders were added to a solution of 30 g PVP and 45 g ZN in 90 g of water to give a 50 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 135° C. (outlet temperature measurement of 74-85° C.) to put a polymer shell around the particles. A free-flowing powder was obtained (at 38.4% yield). The resulting capsule contained 50 wt. % AZO.

Preparative Example 8 (PE-8)

10 g of AZO powders were added to a solution of 20 g LRS780 and 20 g ZN in 80 g of water to give a 38 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 79-83° C.) to put a polymer shell around the particles. A free-flowing powder was obtained (at 30.4% yield). The resulting capsule contained 21 wt. % AZO.

Preparative Example 9 (PE-9)

10 g of AZO powders were added to a solution of 20 g LRS780 and 20 g ZS in 80 g of water to give a 38 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 78-84° C.) to put a polymer shell around the particles. A free-flowing powder was obtained (at 30.4% yield). The resulting capsule contained 27 wt. % AZO.

Preparative Example 10 (PE-10)

10 g of AZO powders were added to a solution of 20 g PVP and 20 g ZS in 75 g of water to give a 40 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 139° C. (outlet temperature measurement of 83° C.) to put a polymer shell around the particles. A free-flowing powder was obtained (at 4.9% yield). The resulting capsule contained 24 wt. % AZO.

Preparative Example 11 (PE-11)

10 g of AZO powders were added to a solution of 20 g LRS780 and 20 g ZC in 80 g of water to give a 38 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 81-84° C.) to put a polymer shell around the particles. A free-flowing powder was obtained (at 31.4% yield). The resulting capsule contained 11 wt. % AZO.

Preparative Example 12 (PE-12)

10 g of AZO powders were added to a solution of 20 g LRS780 and 5 g ZC in 80 g of water to give a 30 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 81-85° C.) to put a polymer shell around the particles. A free-flowing powder was obtained (at 42.3% yield). The resulting capsule contained 21 wt. % AZO.

Preparative Example 13 (PE-13)

10 g of AZO powders were added to a solution of 20 g LRS780 and 20 g PN in 80 g of water to give a 38 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 81-84° C.) to put a polymer shell around the particles. A free-flowing powder was obtained (at 31% yield). The resulting capsule contained 17 wt. % AZO.

Preparative Example 14 (PE-14)

10 g of AZO powders were added to a solution of 20 g LRS780 and 20 g SO in 100 g of water to give a 33 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 81-84° C.) to put a polymer shell around the particles. A free-flowing powder was obtained (at 35% yield). The resulting capsule contained 25 wt. % AZO.

Preparative Example 15 (PE-15)

10 g of AZO powders were added to a solution of 20 g LRS780 and 20 g CN in 80 g of water to give a 38 wt. % solid suspension. The suspension was further mixed with a high shear mixer (T50 digital Ultra Turrax, IKA) at 2000 RPM for 5 min. The polymer mixture was then spray dried using a Buchi Mini-Probe B-190 (Buchi Corporation, New Castle, DE) at a flow rate of 15 rpm and an inlet temperature set at 130° C. (outlet temperature measurement of 81-84° C.) to put a polymer shell around the particles. A free-flowing powder was obtained (at 33% yield). The resulting capsule contained 17 wt. % AZO.

General Procedure for the Preparation of Polyamides

All monomers were placed in a 1 liter (L) resin flask fitted with a thermocouple, overhead stirrer and a distillation head. The distillation head was fitted with a 100 mL receiver flask. The reaction was heated using an electric mantle and a temperature controller. The distillation head condenser was cooled with ambient temperature water. The reaction was heated to 160° C. over a period of 1.5 hours and held at that temperature until the distillation rate slowed down. The reaction was then heated to 225° C. and held at that temperature until the distillation rate slowed down. A 20 mmHg vacuum was introduced in the flask over a period of 5 minutes. The reaction was held under vacuum for 1 hour when the vacuum was broken with nitrogen gas. The contents were then drained and collected. The below polyamide preparative examples were prepared according to the General Procedure, then analyzed by the Amine and acid number quantification and Rheology test methods.

Polyamide Preparative Examples (PA-1 to PA-7)

PA-1  A polyamide made from 64.5/11.4 parts by weight blend of P1013/sebacic acid and a 18.7/5.4 parts by weight blend of 4,4'-Trimethylenedipiperidine/ethylene diamine, and determined to have an amine number = 5.6 mg KOH/g.
PA-2  A polyamide made from a 92/8 parts by weight blend of P1013/sebacic acid and ethylene diamine, and determined to have an acid number = 9.9 mg KOH/g, and a storage modulus G'(25° C.) = 80.6 MPa.
PA-3  A polyamide made from a 68.2/14.7 parts by weight blend of P1013/sebacic acid and a 12.9/1.8/2.3 parts per weight blend of piperazine/ethylene diamine/hexamethylene diamine, and determined to have an amine number = 6.1 mg KOH/g, and a storage modulus G'(25° C.) = 2.0 MPa.
PA-4  A polyamide made from a 68.2/14.7 parts per weight blend of P1013/sebacic acid and a 12.9/0.6/4.6 parts per weight blend of piperazine/ethylene diamine/hexamethylene diamine, and determined to have an amine number = 7.4 mg KOH/g, and a storage modulus G'(25° C.) = 0.7 MPa.
PA-5  A polyamide made from a 68.3/8.6/2.5 parts per weight blend of P1013/sebacic acid/dimethyl sodium sulfonate isophthalate and a 7.6/3.1/9.8 parts per weight blend of piperazine/ethylene diamine/J-ED600, and determined to have an acid number = 19.6 mg KOH/g, and a storage modulus G'(25° C.) = 1.7 MPa.
PA-6  A polyamide made from 262/369 parts by weight blend of sebacic acid/P1013 and 201 parts by weight piperazine, and determined to have an amine number = 9.5 mg KOH/g, and a storage modulus G'(25° C.) = 480 MPa.
PA-7  A polyamide made from 401/115 parts by weight P1013/sebacic acid and 51/40/133 parts by weight piperazine/ethylene diamine/J-ED2003, and determined to have an amine number = 3.4 mg KOH/g, and a storage modulus G'(25° C.) = 33 MPa.

Crosslinking of Polyamide Resins

Polyamide resins were compounded in a Brabender twin-screw mixer (C.W. Brabender Instruments, Inc., South Hackensack, NJ, model ATR Plasti-Corder) at 100 revolutions per minute (RPM) at 200° C. by mixing polyamide resins with crosslinking agents and/or crosslinking catalysts to make foam compositions, except PA-5 which was mixed at 150° C.

TABLE 1

| Polymer | Crosslinker | | Catalyst | |
|---|---|---|---|---|
| | Type | wt. % | Type | wt. % |
| PA-1 | J4370 | 2.2 | — | — |
| PA-2 | J4370 | 4.3 | DTMAB | 1.0 |
| PA-3 | J4368 | 2.5 | — | — |
| PA-4 | J4368 | 2.9 | — | — |
| PA-5 | J4368 | 8.0 | TBAI | 4.0 |
| PA-6 | J4368 | 4.0 | — | — |
| PA-7 | J4368 | 2.0 | — | — |

Examples

Preparation of Polymer Prefoam Resins

Polymer resins were compounded in a Brabender twin-screw mixer (C.W. Brabender Instruments, Inc., South Hackensack, NJ, model ATR Plasti-Corder) at 100 revolutions per minute (RPM) at the indicated temperatures (according to Tables 2 and 3) by mixing polymer resins with crosslinking agents and/or chemical blowing agents and/or crosslinking catalysts.

Preparation of Polymer Prefoam Sheets

Compounded prefoam resins were pressed between two aluminum sheets with polytetrafluoroethylene liners and a 1.5 mm shim in a Carver press (Carver, Inc., Wabash, IN, model #2699). The Carver press was set at the indicated temperatures (according to Tables 2 and 3). The resin was softened for 1-3 minutes (min) and then pressed at 6 metric tons for 1 min.

In the tables that follow, Comparative Examples are indicated by Comp. Ex. and Examples are indicated by Ex.

TABLE 2

| Example | Azo, wt. % | Azo-30/70, wt. % | PA-1, wt. % | PA-2, wt. % | PA-3, wt. % | PA-4, wt. % | PA-6, wt. % | PA-7, wt. % | J4370, wt. % | J4368, wt. % | DTMAB, wt. % | Compounding temperature, °C. | Carver temperature, °C. |
|---|---|---|---|---|---|---|---|---|---|---|---|---|---|
| Comp. Ex. A | 2 | | 92.8 | | | | | | 4.2 | | 1.0 | 150 | 155 |
| Comp. Ex. B | | 6.3 | 89.7 | | | | | | 4.2 | | | 150 | 155 |
| Comp. Ex. C | 3 | | | 94.5 | | | | | | 2.5 | | 125 | 135 |
| Ex. 1 | | 6.3 | 88.7 | | | | | | 4 | | 1.0 | 150 | 155 |
| Ex. 2 | | 10 | | 87.8 | | | | | | 2.2 | | 125 | 110 |
| Ex. 3 | | 6.5 | 91.5 | | | | | | | 2 | | 110 | 135 |
| Ex. 4 | | 10 | | | | 87.4 | | | | 2.6 | | 110 | 135 |
| Ex. 5 | | 10 | | | | | 86.4 | | | 3.6 | | 155 | 155 |
| Ex. 6 | | 10 | | | | | | 88.2 | | 1.8 | | 166 | 166 |

TABLE 3

| Example | 5PT, wt. % | 5PT-5/95, wt. % | PTSC, wt. % | PE-1, wt. % | PA-2, wt. % | E58277, wt. % | J4370, wt. % | DTMAB, wt. % | Compounding temperature, °C. | Carver temperature, °C. |
|---|---|---|---|---|---|---|---|---|---|---|
| Comp. Ex. D | 2 | | | | 92.8 | | 4.2 | 1 | 150 | 160 |
| Comp. Ex. E | | | 2 | | | 98 | | | 160 | 180 |
| Ex. 7 | | 10 | | | 85.9 | | 3.9 | 1 | 150 | 160 |
| Ex. 8 | | | | 6 | | 94 | | | 160 | 180 |

Foaming in an Oven

A 0.7 inch (1.78 centimeters (cm)) by 0.06 inch (0.15 cm) disk of melt-pressed polymer prefoam sheet was placed on a Teflon liner and placed in an oven set between 210-270° C. Samples were foamed for 0-15 minutes. FIG. 2 shows SEM images of articles (Comp. Ex. A to Comp. Ex. E, Ex. 1, Ex. 2, Ex. 7, Ex. 8) that were foamed in an oven at different temperatures.

TABLE 4

Oven foaming temperatures.

| Sample | Foaming Temperature |
|---|---|
| Comp. Ex. A | 230° C. |
| Comp. Ex. B | 230° C. |
| Ex. 1 | 230° C. |
| Comp. Ex. C | 230° C. |
| Ex. 2 | 230° C. |
| Ex. 3 | 230° C. |
| Ex. 4 | 230° C. |
| Ex. 5 | 230° C. |
| Ex. 6 | 230° C. |
| Comp. Ex. D | 270° C. |
| Ex. 7 | 270° C. |
| Comp. Ex. E | 270° C. |
| Ex. 8 | 270° C. |

TABLE 5

Analysis of the final foam compositions

| Example | Foaming time, minutes | Average cell size, micrometers | Cell density, cells/square millimeter | Cell aspect ratio |
|---|---|---|---|---|
| Ex. 1 | 5 | 163 ± 126 | 21.5 | 1.4 |
| Comp. Ex. A | 5 | | Cells Merged | |
| Comp. Ex. B | 5 | | Cells Merged | |
| Ex. 2 | 3.9 | 151 ± 122 | 26.5 | 1.4 |
| Comp. Ex. C | 4 | | Cells merged | |
| Ex. 3 | 6 | 159 ± 156 | 26.9 | 1.4 |
| Ex. 4 | 3.5 | 198 ± 80 | 21.2 | 1.3 |
| Ex. 5 | 4 | 127 ± 57 | 48.6 | 1.5 |
| Ex. 6 | 5 | 146 ± 76 | 27.3 | 1.5 |
| Ex. 7 | 6.5 | 160 ± 221 | 7.1 | 1.4 |
| Comp. Ex. D | 6.5 | 624 ± 345 | 1.6 | 1.2 |
| Ex. 8 | 6.5 | 170 ± 91 | 14.6 | 1.3 |
| Comp. Ex. E | 5 | 323 ± 123 | 8.9 | 1.4 |

Foaming in an Extruder, General Information

Single layer films were produced using the twin screw extruder connected to a single layer die. Three-layer films were produced by using three extruders connected to a three-layer die. The equipment used is listed in Table 6 below.

TABLE 6

| EQUIPMENT | DESCRIPTION AND SOURCE |
|---|---|
| 25 mm twin screw extruder (TSE) | Twin screw extruder, type ZSK-25 manufactured by Krupp Werner & Pfleiderer, Ramsey, NJ, USA. |
| Two 1.25" (32 mm) single screw extruders (SSE) | 1.25" (32 mm) single screw extruder manufactured by Killion Extruders Inc., Cedar Grove NJ, USA |
| Two K-Tron feeders | Loss-in-weight solids feeders, model KCL-KT20, manufactured by K-Tron America, Pitman, NJ, USA |
| Casting station | 3-roll stack casting station, model KXE-512, manufactured by Davis Standard, Pawcatuck, CT, USA |
| Multi-layer extrusion die | 3-layer film extrusion die, 6" (15 cm) wide, manufactured by Premiere Dies Corp., Chippewa Falls, WI |
| Single layer extrusion die | Single layer film extrusion die, 6" (15 cm) wide, conventional coat-hanger design with flexible lip. |
| Heated hoses | Heated hoses manufactured by Diebolt & Co., Springfield, MA, USA. |

Foaming in an Extruder, Single Layer

Single layer foams were made using a TSE connected to a single layer die. Both K-tron feeders fed solids (powder and pellets) into the TSE. To ensure good mixing of the filler into the polymer the TSE screw speed was set to 125 revolutions per minute (RPM). The TSE was connected to the single layer die via a heated hose. The cast film was extruded out of the single layer die onto a cooling roll in the casting station. Cooling of the casting roll was achieved by plumbing city water through the chrome plated casting roll. The film was then wound into a roll. If blends of polymers were used, the pellets were mixed by hand and fed using the same K-tron feeder into the extruder. The TSE conditions used are listed in Table 7 below. The polymer and blowing agents used for single layer foams are shown in Table 8.

TABLE 7

| | |
|---|---|
| Polymer feed rate | 10 lb/hr (pounds/hour) |
| eCBA feed rate | 0.1-0.9 pounds per hour (lbs/hr) |
| Barrel temperature | 350° F. (all zones, 10 zones total) |
| Polymer added | Zone 1 |
| Blowing agent added | Zone 8 |
| Neck tube temperature | 360° F. |
| Roller temp | 55° F. |

TABLE 8

| Example | Azo, wt. % | Azo-10/90, wt. % | Azo-30/70, wt. % | Azo-50/50, wt. % | E55144, wt. % | E55277, wt. % | P85A, wt. % | PA-1, wt. % | J4370, wt. % |
|---|---|---|---|---|---|---|---|---|---|
| Comp. Ex. F | 0.8 | | | | 49.6 | 49.6 | | | |
| Ex. 9 | | 1 | | | 49.5 | 49.5 | | | |
| Ex. 10 | | 3 | | | 48.8 | 48.8 | | | |
| Ex. 11 | | 5 | | | 47.5 | 47.5 | | | |
| Ex. 12 | | 7.5 | | | 46.25 | 46.25 | | | |
| Ex. 13 | | 9 | | | 45.5 | 45.5 | | | |
| Ex. 14 | | 3 | | | | | 97 | | |
| Ex. 15 | | | 1 | | | | 99 | | |
| Ex. 16 | | | 3.6 | | | | 96 | 0.4 | |
| Ex. 17 | | | | 1.4 | | | | 98.1 | 0.5 |

TABLE 9

SEM analysis of Ex. 9 to Ex. 17

| Example | Orientation | Die temperature, ° C. | Average cell size, micrometer | Cell density, cells/square millimeter | Cell aspect ratio | Sheet thickness, millimeter |
|---|---|---|---|---|---|---|
| Ex. 9 | TD | 390 | 44 ± 20 | 28.6 | 1.7 | 0.22 |
| | MD | | 49 ± 20 | 4.5 | 2.7 | |
| Ex. 10 | TD | 475 | 56 ± 41 | 84.6 | 1.5 | 0.91 |
| | MD | 475 | 56 ± 39 | 89.8 | 1.4 | |
| Ex. 11 | TD | 430 | 30 ± 17 | 476 | 1.4 | 0.55 |
| | MD | | 32 ± 17 | 469 | 1.4 | |
| Ex. 12 | TD | 430 | 56 ± 35 | 106 | 1.3 | 1.03 |
| | MD | | 52 ± 30 | 139.2 | 1.4 | |
| Ex. 13 | TD | 430 | 52 ± 33 | 137 | 1.3 | 0.91 |
| | MD | | 66 ± 38 | 98.2 | 1.6 | |
| Ex. 14 | TD | 410 | 65 ± 46 | 51.8 | 1.6 | 0.90 |
| | MD | 410 | 64 ± 45 | 48.9 | 2.2 | |
| Ex. 15 | TD | 400 | 45 ± 36 | 153.2 | 1.5 | 0.83 |
| | MD | 400 | 54 ± 36 | 138.5 | 1.6 | |
| Ex. 16 | TD | 400 | 65 ± 34 | 58.9 | 2.2 | 0.74 |
| | MD | 400 | 64 ± 31 | 51.0 | 2.8 | |
| Ex. 17 | TD | 400 | 84 ± 49 | 24.2 | 1.4 | 2.49 |
| | MD | 400 | 104 ± 97 | 20.4 | 1.5 | |

Foaming in an Extruder, Multilayer

To make 3-layer film, two SSEs gravity fed polymer pellets into the outer skin layers of the multilayer construction. Both K-tron feeders fed solids (powder and pellets) into the 25 mm twin screw extruder. Polymer solids were added in Zone 1, blowing agent solids were added in Zone 6. To ensure good mixing of the filler into the polymer the TSE screw speed was set to 125 RPM. All extruders were connected to the 3-layer die via heated hoses. The twin screw extruder fed the core (center) layer of the 3-layer die. The 3-layers of polymer melt were joined inside the multilayer die and the 3-layer molten film was cast onto a cooling roll in the casting station. The resulting 3-layer film was wound into a roll. Cooling of the casting roll was achieved by plumbing city water through a chrome finished steel roll. The feed rate of the skin layers was either 5 lbs/hr or 2.5 lbs/hr for each skin layer. The line speed was 5 feet per minute. All TPU pellets used for the 3-layer films were P85A. The TSE conditions used are listed in Table 10 below. The polymer and blowing agents used for multilayer foams are shown in Tables 11, 12, 13, and 14.

TABLE 10

| TSE conditions | |
|---|---|
| Barrel temperature | 360° F. (182° C.) (all zones, 10 zones total) |
| Neck tube temperature | 360° F. (182° C.) |
| Die temp | 400° F. (204° C.) |
| Roller temp | 55° F. (13° C.) |

TABLE 11

Example 18 (Ex. 18)

| Extruder | Layer | Composition | Extrusion Rate |
|---|---|---|---|
| SSE | Top/bottom | P85A | 5 lbs/hr (2.27 kilogram per hour (kg/hr)) |
| TSE | Core | 99.5% P85A, 0.5% Azo-30/70 | 10 lbs/hr (4.54 kg/hr) |

TABLE 12

Example 19 (Ex. 19)

| Extruder | Layer | Composition | Extrusion Rate |
|---|---|---|---|
| SSE | Top/bottom | P85A | 5 lbs/hr (2.27 kg/hr) |
| TSE | Core | 99% P85A, 1% Azo-30/70 | 10 lbs/hr (4.54 kg/hr) |

TABLE 13

Example 20 (Ex. 20)

| Extruder | Layer | Composition | Extrusion Rate |
|---|---|---|---|
| SSE | Top/bottom | P85A | 2.5 lbs/hr (2.27 kg/hr) |
| TSE | Core | 99% P85A, 1% Azo-30/70 | 10 lbs/hr (4.54 kg/hr) |

TABLE 14

Example 21 (Ex. 21)

| Extruder | Layer | Composition | Extrusion Rate |
|---|---|---|---|
| SSE | Top/bottom | P85A | 2.5 lbs/hr (2.27 kg/hr) |
| TSE | Core | 99% P85A, 5% Azo-10/90 | 10 lbs/hr (4.54 kg/hr) |

TABLE 15

SEM analysis of Ex. 18 to Ex. 21

| Example | Orientation | Average cell size, micrometer | Cell density, cells/square millimeter | Cell aspect ratio | Total sheet thickness, millimeter | Skin thickness of 1 layer, micrometer |
|---|---|---|---|---|---|---|
| Ex. 18 | TD | 178 ± 64 | 9.1 | 1.8 | 0.74 | 131 |
| | MD | 232 ± 74 | 5.6 | 2.5 | 0.73 | 146 |
| Ex. 19 | TD | 121 ± 56 | 30.2 | 1.6 | 0.95 | 149 |
| | MD | 172 ± 60 | 21.0 | 2.4 | 0.96 | 150 |
| Ex. 20 | TD | 119 ± 63 | 27.6 | 1.6 | 0.75 | 122 |
| | MD | 138 ± 66 | 23.3 | 2.3 | 0.75 | 119 |
| Ex. 21 | TD | 124 ± 49 | 21.9 | 1.8 | 0.86 | 150 |
| | MD | 144 ± 66 | 16.0 | 2.7 | 0.83 | 162 |

Foaming in an Extruder with a Patterned Tool

FIG. 1 shows an exemplary apparatus for the method of making a patterned polymeric foam layer described herein. Referring to FIG. 1, apparatus 99 has rotating tool roll 110 with major circumferential surface 111 and extrusion die 112 with die lip 113 spaced in proximity of tool roll 110 to form gap 115 between tool roll 110 and extrusion die 112. Polymer 117 comprising a foaming agent is injected onto portion 120 of major circumferential surface 111 tool roll 110. Portion 120 of major circumferential surface 111 is in proximity of die lip 113. Polymer 117 foams to provide polymeric foam layer described herein 100.

To make a patterned foam sheet, an apparatus as generally shown in FIG. 1 was used. The extrusion die was 20.3 cm (8 inches) wide (obtained under the trade designation "MASTERFLEX" (Model LD-40) from Cloeren, Orange, TX) configured with the die positioned on the top of the tool roll at top dead center. The die was orientated such that the bottom of the die was on the trailing edge of the tooling roll. The bottom die lip had a 3.18 mm (0.125 inch) land. The extruder was a 40 mm (1.57 inches) twin screw extruder (obtained from (Model ZE 40×40D) Berstorff, Charlotte, NC). The twin screw extruder used screw elements to help disperse and mix the polymer. The extrusion temperature set points used are shown in Tables 16 and 17 (below) for resins E51844/E58277 and 1101, respectively.

TABLE 16

| Resin | E51844/E58277 |
|---|---|
| Extruder type | Twin-screw |
| Screw rpm | 100 |
| TPU feed rate | 10 lb/hr |
| Zone 1 | 135° C. |
| Zone 2-Zone 4 | 175° C. |
| Zone 5-Zone 6 | 190° C. |
| Zone 7-Zone 10 | 200° C. |
| Blowing agent added | Zone 1 |
| Neck tube temperature | 200° C. |
| tool temp | 100° F. |
| Gap between die lip and tool | 762 micrometers |

TABLE 17

| Resin | I101 |
|---|---|
| Extruder type | Twin-screw |
| Screw rpm | 100 |
| TPU feed rate | 10 lb/hr |
| Zone 1 | 135° C. |
| Zone 2 | 175° C. |
| Zone 3 | 180° C. |
| Zone 4 | 190° C. |
| Zone 5-Zone 6 | 210° C. |
| Zone 7-Zone 9 | 220° C. |

TABLE 17-continued

| | |
|---|---|
| Zone 10 | 200° C. |
| Blowing agent added | Zone 1 |
| Neck tube temperature | 220° C. |
| tool temp | 180° F. |
| Gap between die lip and tool | 508 micrometers |

A single tooling roll station was used with the die mounted at the top dead center of the roll. The die was mounted on linear slides to move in the up and down direction. The roll was nominally 30.5 cm (12 inch) in diameter with a 40.6 cm (16 inch) face width. The tooling roll had internal water cooling with spiral wound internal channels. A 37.5 cm (14.75 inch) outside diameter aluminum tooling shell was mounted onto the outer surface roll.

The linear motion of the die was controlled by linear actuators to move the die and to control the gap between the die lip and tooling roll.

The tooling roll shell had rectangular indentations machined into the surface of the aluminum shell. The rectangular indentations were 3.69 mm (0.145 inch) wide by 5.90 mm (0.232 inch) apart. The corners of the indentations had a 0.75 mm (0.030 inch) radius. The tooling roll was set with a cooling temperature set point of 37.8° C. (100° F.). The line speed was 0.24 meters (0.8 feet) per minute.

The polymers were feed using Ktron loss-in-weight solids feeders, model LIWT20 by K-Tron America, Pitman, NJ, USA, into the 40 mm twin screw extruder. If a blend of polymers were used, pellets were dry mixed and then feed using the same Ktron feeder.

Compositions used to make patterned foam sheets are shown in Table 18 below.

TABLE 18

| Example | Azo, wt. % | Azo- 10/90, wt. % | Azo- 30/70, wt. % | 5PT- 5/95, wt. % | E55144, wt. % | E55277, wt. % | I101, wt. % |
|---|---|---|---|---|---|---|---|
| Comp. Ex. G | 0.5 | | | | 49.75 | 49.75 | |
| Ex. 22 | | 2.3 | | | 48.85 | 48.85 | |
| Ex. 23 | | | 1.5 | | 49.25 | 49.25 | |
| Ex. 24 | | | | 2.5 | | | 97.5 |

TABLE 19

SEM analysis of Comp. Ex. G, Ex. 22, and Ex. 23

| Example | Smooth backside, Yes/No | Die Temperature, ° C. | Orientation | Average cell size, micrometer | Cell density, cells/square millimeter | Cell aspect ratio |
|---|---|---|---|---|---|---|
| Comp. Ex. G | No | 218 | TD | 35 ± 22 | 197.5 | 1.81 |
| | | | MD | 81 ± 77 | 37.7 | 3.89 |
| Comp. Ex. G | Yes | 246 | TD | 108 ± 89 | 15.2 | 2.10 |
| | | | MD | 67 ± 52 | 15.8 | 4.36 |

TABLE 19-continued

SEM analysis of Comp. Ex. G, Ex. 22, and Ex. 23

| Example | Smooth backside, Yes/No | Die Temperature, ° C. | Orientation | Average cell size, micrometer | Cell density, cells/square millimeter | Cell aspect ratio |
|---|---|---|---|---|---|---|
| Ex. 22 | No | 218 | TD | 47 ± 27 | 119.5 | 1.61 |
| | | | MD | 46 ± 27 | 115.2 | 2.11 |
| Ex. 23 | Yes | 229 | TD | 37 ± 18 | 76.3 | 1.52 |
| | | | MD | 48 ± 29 | 72.0 | 1.94 |
| Ex. 23 | Yes | 246 | TD | 36 ± 19 | 189.7 | 1.60 |
| | | | MD | 41 ± 19 | 130.6 | 1.93 |

FIGS. 5A-5D show SEM images of Comp. Ex. G and Ex. 23 extruded into a patterned tool, each at a die temperature of 246° C. Cross-sections were taken of protruding post structures. A comparison of FIG. 5A (i.e., Comp. Ex. G sliced in the transverse direction), and FIG. 5B (i.e., Comp. Ex. G sliced in the machine direction), illustrates a significant difference in the cell aspect ratio in the transverse direction versus the machine direction. In contrast, a comparison of FIG. 5C (i.e., Ex. 23 sliced in the transverse direction), and FIG. 5D (i.e., Ex. 23 sliced in the machine direction) illustrates a smaller difference in cell aspect ratio in the transverse direction versus the machine direction.

TABLE 20

LM analysis of Ex. 24

| Example | Die Temperature, ° C. | Orientation | Average cell size, micrometer | Cell density, cells/square millimeter | Cell aspect ratio |
|---|---|---|---|---|---|
| Ex. 24 | 285 | TD | 86 ± 44 | 37.8 | 2.01 |
| Ex. 24 | 302 | TD | 25 ± 11 | 115.2 | 1.71 |

FIG. 7A-7B show LM images of Ex. 24. The foam composition imaged in FIG. 7A was made using a die temperature of 285° C.; the foam composition imaged in FIG. 7B was made using a die temperature of 302° C.

Thermogravimetric Analysis (TGA) of Co-Encapsulated Composite Particles

The decomposition profiles of the composite particles were determined using a TGA Q500 (TA Instruments, New Castle, DE) using a temperature ramp rate of 10° C./min from 40 to 110° C., isothermal for 10 min, ramp rate of 10° C./min from 110 to 90° C., isothermal for 2 min, ramp rate of 10° C./min from 90 to 600° C. The run was tared by placing a standard aluminum differential scanning calorimetry (DSC) pan in a platinum TGA pan. Then, 5-10 mg of each sample was added to a tared pan for analysis. The $T_{start}$ (i.e., onset temperature of thermal decomposition) and $T_{max}$ (i.e., temperature at which thermal decomposition occurs at a maximum rate) were determined using TA Instruments Universal Analysis software. $T_{start}$ is defined as the first temperature above 100° C. during the final temperature ramp where the Derivative Weight (%/° C.) was 0.02%/° C. $T_{max}$ is defined as the first local maximum temperature above $T_{start}$.

TABLE 21

The effect of co-encapsulating blowing agent accelerators. Co-encapsulating AZO with ZN (PE-6, PE-7, PE-8), ZS (PE-9, PE-10), ZC (PE-11, PE-12), ZA (PE-13), PN (PE-14), SO (PE-15), CN (PE-16), or CA (PE-17), lowered the $T_{start}$ and $T_{max}$ of the particle as compared to encapsulating AZO alone (PE-2).

| Sample | $T_{start}$, °C. | $T_{max}$, °C. |
|---|---|---|
| PE-2 | 187 | 224 |
| PE-6 | 139 | 201 |
| PE-7 | 126 | 178 |
| PE-8 | 151 | 172 |
| PE-9 | 168 | 211 |
| PE-10 | 163 | 206 |
| PE-11 | 127 | 153 |
| PE-12 | 178 | 194 |
| PE-13 | 164 | 195 |
| PE-14 | 170 | 211 |
| PE-15 | 127 | 174 |

Preparative Example PLA (PE-PLA)

A twin screw extruder from APV Chemical Machinery (Saginaw, MI) (screw diameter: 30 mm; ratio of screw length to diameter: 30; extrusion throughput rate: 20 pounds per hour (9 kilograms/hour); Zone 1: 250° F. (121° C.); Zones 2 and 3: 390° F. (199° C.); Zones 4 and 5: 350° F. (177° C.)) and an underwater pelletizer from Gala Industries (Eagle Rock, VA) were used to prepare pre-compounded and free-flowing PLA pellets (formulation listed in Table 2). The PE-1 pre-compounded PLA pellets were used as the base resin to prepare foam samples.

TABLE 22

Formulation of PE-PLA

| Components | Composition, wt. % |
|---|---|
| I4060 PLA | 30 |
| I4032D PLA | 7.8 |
| VK70 PVAc | 35 |
| CA4 Plasticizer | 25 |
| ECO Nuc. Agent | 0.2 |
| S511 | 2 |

TABLE 24

| Example | Foaming time, minutes | Foaming temp, °C. | Average cell size, micrometers | Cell density, cells/square millimeter | Cell aspect ratio |
|---|---|---|---|---|---|
| Ex. 25 | 8 | 150 | 134 ± 72 | 32.4 | 1.3 |
| Comp. Ex. H | 8 | 150 | 207 ± 257 | 5.3 | 1.4 |
| Ex. 26 | 12 | 160 | 190 ± 97 | 20.6 | 1.7 |
| Ex. 27 | 6.5 | 150 | 256 ± 99 | 13.7 | 1.4 |
| Ex. 28 | 6.5 | 150 | 233 ± 77 | 15 | 1.4 |
| Ex. 29 | 9 | 150 | 323 ± 129 | 7.9 | 1.3 |
| Ex. 30 | 5 | 190 | 192 ± 56 | 10.4 | 1.2 |
| Ex. 31 | 12 | 150 | 152 ± 90 | 33.0 | 1.2 |
| Comp. Ex. I | 12 | 150 | 240 ± 208 | 8.1 | 1.2 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from

TABLE 23

| Example | Azo, wt. % | PE-6, wt. % | PE-8, wt. % | PE-11, wt. % | ZN, wt. % | PE-PLA, wt. % | EVA, wt. % | D1340, wt. % | D1119, wt. % | PA-5, wt. % | J4368, wt. % | TOAB, wt. % | TBAI, wt. % | DCP, wt. % | Compounding temperature °C. | Carver temperature °C. |
|---|---|---|---|---|---|---|---|---|---|---|---|---|---|---|---|---|
| Comp. Ex. H | 1.6 | | | | 4.8 | 93.2 | | | | | 0.6 | 0.2 | | | 100 | 100 |
| Comp. Ex. J | 1.5 | | | | 4.4 | | | | | 82.9 | 7.5 | | 3.7 | | 90 | 110 |
| Ex. 25 | | 10 | | | | 89.2 | | | | | 0.6 | 0.2 | | | 100 | 100 |
| Ex. 26 | | | 10 | | | 89.2 | | | | | 0.6 | 0.2 | | | 100 | 100 |
| Ex. 27 | | 10 | | | | 90 | | | | | | | | | 90 | 90 |
| Ex. 28 | | 10 | | | | 88.5 | | | | | | | | 1.5 | 90 | 90 |
| Ex. 29 | | | | 10 | | 90 | | | | | | | | | 90 | 90 |
| Ex. 30 | | | 10 | | | | 9 | 81 | | | | | | | 110 | 110 |
| Ex. 31 | | 9.9 | | | | | | | | 79.9 | 7.1 | | 3.1 | | 90 | 110 | the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A composition comprising:
an uncrosslinked thermoplastic nitrogen-containing matrix material, and
a plurality of composite particles distributed in the uncrosslinked thermoplastic nitrogen-containing matrix material,
wherein the composition exhibits an elastic modulus of 0.5 megaPascals (MPa) or greater,
wherein the uncrosslinked thermoplastic nitrogen-containing matrix material comprises a polyamide, a polyurethane, a polyetherimine, a polyethyleneimine, a polyimide, a polyurea, a polyoxazoline, a polyiminothioether, a polyaminoamide, a polysulfonamide, a polyetherimide, a poly(amide imide), a poly(ester amide), or combinations thereof,
wherein the plurality of composite particles is present in an amount of 0.1 to 20 wt. %, inclusive, of the total weight of the composition, and
wherein the plurality of composite particles each comprises:
a core-shell particle comprising a core which is free of liquid hydrocarbon physical blowing agents, the core comprising at least one solid chemical blowing agent particle, the core encapsulated within a shell comprising an uncrosslinked thermoplastic material,
wherein the uncrosslinked thermoplastic material exhibits a complex viscosity of 3,700 Pa·s or greater at a decomposition temperature of the chemical blowing agent particle, and
wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

2. The composition of claim 1, wherein the uncrosslinked thermoplastic nitrogen-containing matrix material comprises a polyurethane.

3. The composition of claim 1, wherein the uncrosslinked thermoplastic nitrogen-containing matrix material comprises an acid-terminated polyamide or an amine-terminated polyamide.

4. The composition of claim 1, further comprising a crosslinking agent, a crosslink catalyst, or both.

5. The composition of claim 1, wherein the plurality of composite particles is present in an amount of 0.5 to 15 wt. %, 0.5 to 10 wt. %, 1 to 8 wt. %, or 10 to 17 wt. %, inclusive, of the total weight of the composition.

6. The composition of claim 1, wherein the chemical blowing agent is 1,1-azodicarboxamide, 5H-phenyltetrazole, isatoic anhydride, p-toluenesulfonyl semicarbazide, or p-toluenesulfonylhydrazine.

7. A foam composition comprising:
a closed cell foam material obtained from a composition comprising an uncrosslinked thermoplastic nitrogen-containing matrix material, and a plurality of composite particles distributed in the uncrosslinked thermoplastic nitrogen-containing matrix material,
wherein the uncrosslinked thermoplastic nitrogen-containing matrix material comprises a polyamide, a polyurethane, a polyetherimine, a polyethyleneimine, a polyimide, a polyurea, a polyoxazoline, a polyiminothioether, a polyaminoamide, a polysulfonamide, a polyetherimide, a poly(amide imide), a poly(ester amide), or combinations thereof,
wherein the plurality of composite particles is present in an amount of 0.1 to 20 wt. %, inclusive, of the total weight of the composition,
wherein the plurality of composite particles each comprises:
a core-shell particle comprising a core which is free of liquid hydrocarbon physical blowing agents, the core comprising at least one solid chemical blowing agent particle, the core encapsulated within a shell comprising an uncrosslinked thermoplastic material,
wherein the uncrosslinked thermoplastic material exhibits a complex viscosity of 3,700 Pa·s or greater at a decomposition temperature of the chemical blowing agent particle, and
wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

8. The foam composition of claim 7, wherein the foam composition comprises a smooth major surface and an opposing major surface comprising replicated features.

9. The foam composition of claim 7, having an average cell size of 250 micrometers or less, 150 micrometers or less, 120 micrometers or less, 100 micrometers or less, 80 micrometers or less, or 60 micrometers or less.

10. The foam composition of claim 7, wherein the uncrosslinked thermoplastic nitrogen-containing matrix material comprises a polyamide, a polyurethane, a polyimide, a polyurea, a polyetherimide, a poly(amide imide), or combinations thereof.

11. The foam composition of claim 7, wherein the foam composition has a cell density of 1 to 1,000 cells per square millimeter (cells/mm$^2$) or 4 to 500 cells/mm$^2$.

12. An article comprising the foam composition of claim 7 attached to a substrate.

13. The article of claim 12, wherein the article is a multilayer article and the foam composition is a layer of foam disposed in between a layer of a second material and a layer of a third material.

14. A polishing pad comprising a foam composition of claim 7.

15. A polishing system comprising the polishing pad of claim 14 and a polishing solution.

16. A method of making a foam composition of claim 7, the method comprising:
a) compressing a mixture comprising: an uncrosslinked thermoplastic nitrogen-containing matrix material and a plurality of composite particles distributed in the uncrosslinked thermoplastic nitrogen-containing matrix material to form a composition, wherein the composition exhibits an elastic modulus of 0.5 megaPascals (MPa) or greater,
wherein the uncrosslinked thermoplastic nitrogen-containing matrix material comprises a polyamide, a polyurethane, a polyetherimine, a polyethyleneimine, a polyimide, a polyurea, a polyoxazoline, a polyiminothioether, a polyaminoamide, a polysulfonamide, a polyetherimide, a poly(amide imide), a poly(ester amide), or combinations thereof, wherein the plurality of composite particles is present in an amount of 0.1 to 20 wt. %, inclusive, of the total weight of the composition, and wherein the plurality of composite particles each comprises:

a core-shell particle comprising a core which is free of liquid hydrocarbon physical blowing agents, the core comprising at least one solid chemical blowing agent particle, the core encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle, and wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof; and b) heating the compressed mixture, thereby forming the foam composition.

17. The method of claim 16, wherein the mixture is compressed, heated, or both in a multilayer extruder.

18. The method of claim 16, further comprising casting the mixture into a replication mold while the heated mixture is forming the foam composition, thereby imparting a plurality of replicated features on a major surface of the foam composition.

\* \* \* \* \*